US00RE49637E

(19) United States
(12) Reissued Patent
Kinnune et al.

(10) Patent Number: US RE49,637 E
(45) Date of Reissued Patent: Aug. 29, 2023

(54) SYSTEMS AND METHODS FOR HIGH OUTPUT, HIGH COLOR QUALITY LIGHT

(71) Applicant: IDEAL INDUSTRIES LIGHTING LLC, Durham, NC (US)

(72) Inventors: Brian Kinnune, Racine, WI (US); David Goelz, Milwaukee, WI (US); Don Miletich, Franklin, WI (US); Alan Ruud, Racine, WI (US); Kurt Wilcox, Libertyville, IL (US); Yuequan Hu, Morrisville, NC (US); Liqin Ni, Cary, NC (US); Nicholas William Medendorp, Jr., Raleigh, NC (US); Boris Karpichev, Libertyville, IL (US)

(73) Assignee: IDEAL Industries Lighting LLC, Sycamore, IL (US)

(21) Appl. No.: 16/986,968

(22) Filed: Aug. 6, 2020

Related U.S. Patent Documents

Reissue of:
(64) Patent No.: 10,045,418
Issued: Aug. 7, 2018
Appl. No.: 15/421,999
Filed: Feb. 1, 2017

U.S. Applications:
(63) Continuation of application No. 14/188,184, filed on Feb. 24, 2014, now Pat. No. 9,593,837, which is a
(Continued)

(51) Int. Cl.
*H05B 33/00* (2006.01)
*H05B 33/08* (2020.01)
(Continued)

(52) U.S. Cl.
CPC ..... *H05B 45/3725* (2020.01); *F21K 9/00* (2013.01); *F21S 8/086* (2013.01); *F21V 23/007* (2013.01);
(Continued)

(58) Field of Classification Search
CPC ..... F21V 29/74
See application file for complete search history.

(56) References Cited

U.S. PATENT DOCUMENTS 4,228,489 A 10/1980 Martin
4,931,917 A 6/1990 Scherf et al.
(Continued)

FOREIGN PATENT DOCUMENTS

CN 101093073 A 12/2007
CN 101101102 A 1/2008
(Continued)

OTHER PUBLICATIONS

Cree Brochure, ARE-EHO-AF-AA, Cree Edge™ High Output Area Luminaire—Automotive FrontlineOptic™ Technology—Adjustable Arm Mount, Sep. 19, 2013, 1 page.
(Continued)

*Primary Examiner* — Angela M Lie
(74) *Attorney, Agent, or Firm* — Withrow & Terranova, P.L.L.C.

(57) ABSTRACT

Systems and methods for a high output, high color quality light are disclosed. In some embodiments, such a light may include a light fixture including one or more LEDs configured to output a cumulative light output; wherein the cumulative light output comprises an intensity of greater than or equal to 10,000 lumens; and wherein the cumulative light output comprises a CRI of at least 90.

67 Claims, 39 Drawing Sheets

Related U.S. Application Data continuation-in-part of application No. 14/083,070, filed on Nov. 18, 2013, now Pat. No. 10,743,384, and a continuation-in-part of application No. 13/839,922, filed on Mar. 15, 2013, now Pat. No. 9,441,824, which is a continuation-in-part of application No. 13/333,198, filed on Dec. 21, 2011, now Pat. No. 8,313,222, which is a continuation of application No. 12/418,364, filed on Apr. 3, 2009, now Pat. No. 8,092,049, said application No. 14/188,184 is a continuation-in-part of application No. 13/787,579, filed on Mar. 6, 2013, now Pat. No. 9,182,096.

(60) Provisional application No. 61/042,690, filed on Apr. 4, 2008.

(51) Int. Cl.

| | |
|---|---|
| ***H05B 45/3725*** | (2020.01) |
| ***F21V 29/74*** | (2015.01) |
| ***F21V 29/83*** | (2015.01) |
| ***H05B 45/46*** | (2020.01) |
| ***H05B 45/24*** | (2020.01) |
| ***F21K 9/00*** | (2016.01) |
| ***F21S 8/08*** | (2006.01) |
| ***F21V 23/00*** | (2015.01) |
| *F21Y 113/13* | (2016.01) |
| *F21Y 103/10* | (2016.01) |
| *F21Y 115/10* | (2016.01) |
| *H05B 45/38* | (2020.01) |
| *H05B 45/375* | (2020.01) |
| *F21W 131/103* | (2006.01) |

(52) U.S. Cl.

CPC ..... *F21V 29/74* (2015.01); *F21V 29/83* (2015.01); *H05B 45/24* (2020.01); *H05B 45/46* (2020.01); *F21W 2131/103* (2013.01); *F21Y 2103/10* (2016.08); *F21Y 2113/13* (2016.08); *F21Y 2115/10* (2016.08); *H05B 45/375* (2020.01); *H05B 45/38* (2020.01)

(56) References Cited

U.S. PATENT DOCUMENTS

D319,702 S 9/1991 Kane
D354,558 S 1/1995 Marvin et al.
D355,722 S 2/1995 Roos et al.
5,398,177 A 3/1995 Harwood
5,803,579 A * 9/1998 Turnbull ..... B60L 3/0023 362/800
5,918,842 A 7/1999 Garfinkle
6,158,882 A 12/2000 Bischoff, Jr.
6,565,238 B1 5/2003 Pyrtle
6,657,862 B2 12/2003 Crocker et al.
6,679,461 B1 1/2004 Hawkins
6,776,504 B2 8/2004 Sloan et al.
6,882,111 B2 4/2005 Kan et al.
D505,220 S 5/2005 Stekelenburg
6,942,361 B1 9/2005 Kishimura et al.
7,063,451 B2 6/2006 Shen
7,163,328 B2 1/2007 Chang et al.
D536,817 S 2/2007 Mier-Langner et al.
D537,972 S 3/2007 Mier-Langner et al.
D537,973 S 3/2007 Mier-Langner et al.
D538,961 S 3/2007 Mier-Langner et al.
D539,460 S 3/2007 Mier-Langner et al.
D539,956 S 4/2007 Rose et al.
D543,657 S 5/2007 Lehman
D550,885 S 9/2007 Crosby
D551,379 S 9/2007 Maxik
D563,013 S 2/2008 Levine
D563,580 S 3/2008 Prazoff
D563,582 S 3/2008 Levine
D564,117 S 3/2008 Lippert
D571,032 S 6/2008 Chen
D580,082 S 11/2008 Zemar
D581,080 S 11/2008 Mier-Langner
7,513,639 B2 4/2009 Wang
7,559,672 B1 7/2009 Parkyn et al.
D599,494 S 9/2009 Levine
D600,400 S 9/2009 Friedman
7,665,699 B2 2/2010 Oddsen, Jr. et al.
7,686,469 B2 3/2010 Ruud et al.
D619,291 S 7/2010 Thevenot
7,798,670 B2 9/2010 Kinnune
D626,264 S 10/2010 Liu
7,878,232 B2 2/2011 Arik et al.
D638,566 S 5/2011 Goelz et al.
8,092,049 B2 1/2012 Kinnune et al.
8,313,222 B2 11/2012 Kinnune et al.
8,322,881 B1 12/2012 Wassel
2002/0176251 A1 11/2002 Plank et al.
2003/0048608 A1 3/2003 Crocker et al.
2005/0099319 A1* 5/2005 Hutchison ..... G08G 1/095 340/908
2005/0128752 A1 6/2005 Ewington et al.
2005/0258446 A1 11/2005 Raos et al.
2006/0193139 A1 8/2006 Sun et al.
2006/0237636 A1* 10/2006 Lyons ..... F21S 10/02 250/228
2007/0086196 A1 4/2007 Wong
2007/0115666 A1 5/2007 Thomas et al.
2007/0228999 A1* 10/2007 Kit ..... H05B 45/10 315/291
2008/0037239 A1 2/2008 Thomas et al.
2008/0043479 A1 2/2008 Wang
2008/0054815 A1 3/2008 Kotikalapoodi et al.
2008/0062691 A1* 3/2008 Villard ..... F21V 19/02 362/249.16
2008/0080162 A1 4/2008 Wilcox et al.
2008/0080189 A1 4/2008 Wang
2008/0080196 A1 4/2008 Ruud et al.
2008/0130288 A1* 6/2008 Catalano ..... H05B 45/10 315/246
2009/0050908 A1* 2/2009 Yuan ..... H05B 45/20 257/E33.045
2009/0251898 A1 10/2009 Kinnune et al.
2009/0268477 A1 10/2009 Zheng et al.
2009/0290348 A1 11/2009 Van Laanen et al.
2009/0296403 A1 12/2009 Zhang et al.
2010/0026158 A1 2/2010 Wu
2010/0046223 A1 2/2010 Li et al.
2010/0195326 A1 8/2010 Boxler et al.
2011/0157865 A1 6/2011 Takahashi
2011/0273079 A1* 11/2011 Pickard ..... H01L 33/504 313/483
2012/0087118 A1 4/2012 Bailey et al.
2012/0162990 A1 6/2012 Crandell et al.
2012/0262921 A1 10/2012 Boomgaarden et al.
2012/0268021 A1 10/2012 Lee et al.
2013/0083522 A1 4/2013 Bowers et al.
2013/0279179 A1 10/2013 Pearson et al.
2013/0301274 A1 11/2013 Anderson ..... F21V 29/505 362/294
2013/0322068 A1 12/2013 Clark et al.
2013/0322070 A1 12/2013 Clark et al.
2014/0049965 A1 2/2014 Aanegola et al.
2014/0063792 A1 3/2014 Spencer et al.
2014/0085861 A1 3/2014 Nicolai et al.
2014/0126198 A1 5/2014 Dorney
2014/0268870 A1 9/2014 Boomgaarden et al. ..... G02B 6/0038 362/607
2014/0321126 A1 10/2014 Narag et al.
2015/0228868 A1 8/2015 Ouderkirck

(56) References Cited

U.S. PATENT DOCUMENTS

| | | | |
|---|---|---|---|
| 2015/0228869 | A1 | 8/2015 | Yoo |
| 2015/0276137 | A1 | 10/2015 | Demuynck et al. |

FOREIGN PATENT DOCUMENTS

| | | | | | |
|---|---|---|---|---|---|
| CN | 101101103 | A | | 1/2008 | |
| CN | 101101104 | A | | 1/2008 | |
| CN | 101101106 | A | | 1/2008 | |
| CN | 101101107 | A | | 1/2008 | |
| CN | 101105268 | A | | 1/2008 | |
| CN | 101105278 | A | | 1/2008 | |
| EP | 1431653 | A2 | | 6/2004 | |
| EP | 1760393 | A1 | | 3/2007 | |
| EP | 1906081 | A1 | | 4/2008 | |
| JP | 2004253309 | A | * | 9/2004 | |
| WO | 0216826 | A1 | | 2/2002 | |
| WO | 2006060905 | A1 | | 6/2006 | |
| WO | WO-2008091319 | A2 | * | 7/2008 | ..... H01L 33/44 |
| WO | 2013078180 | A1 | | 5/2013 | |

OTHER PUBLICATIONS

Cree Brochure, ARE-EHO-AF-AA, Cree Edge™ High Output Area Luminaire—Automotive FrontlineOptic™ Technology—Adjustable Arm Mount, Sep. 6, 2013, 2 pages.
Cree Brochure, ARE-EHO-AF-DM, Cree Edge™ High Output Area Luminaire—Automotive FrontlineOptic™ Technology—Direct/Surface Mount, Sep. 19, 2013, 1 page.
Notice of Allowance for U.S. Appl. No. 12/418,364, dated Sep. 12, 2011, 7 pages.
Non-Final Office Action for U.S. Appl. No. 13/787,579, dated May 12, 2014, 22 pages.
Non-Final Office Action for U.S. Appl. No. 13/787,579, dated Dec. 24, 2014, 14 pages.
Notice of Allowance for U.S. Appl. No. 13/787,579, dated Jun. 26, 2015, 9 pages.
Non-Final Office Action for U.S. Appl. No. 13/839,922, dated Mar. 18, 2015, 12 pages.
Final Office Action for U.S. Appl. No. 13/839,922, dated Nov. 24, 2015, 10 pages.
Notice of Allowance for U.S. Appl. No. 13/839,922, dated May 4, 2016, 9 pages.
Non-Final Office Action for U.S. Appl. No. 14/083,070, dated Feb. 2, 2016, 10 pages.
Final Office Action for U.S. Appl. No. 14/083,070, dated Oct. 4, 2016, 12 pages.
Advisory Action for U.S. Appl. No. 14/083,070, dated Dec. 30, 2016, 3 pages.
Applicant-Initiated Interview Summary for U.S. Appl. No. 14/083,070, mailed Feb. 22, 2017, 3 pages.
Final Office Action for U.S. Appl. No. 14/083,070, dated May 31, 2018, 31 pages.
Examiner's Answer to the Appeal Brief for U.S. Appl. No. 14/083,070, mailed Jan. 2, 2019, 14 pages.
Decision on Appeal for U.S. Appl. No. 14/083,070, mailed Feb. 20, 2019, 9 pages.
Notice of Allowance for U.S. Appl. No. 14/083,070, dated Apr. 2, 2020, 9 pages.
Non-Final Office Action for U.S. Appl. No. 14/188,184, dated Jul. 10, 2015, 13 pages.
Final Office Action for U.S. Appl. No. 14/188,184, dated Feb. 1, 2016, 17 pages.
Non-Final Office Action for U.S. Appl. No. 14/188,184, dated Jun. 7, 2016, 18 pages.
Notice of Allowance for U.S. Appl. No. 14/188,184, dated Nov. 2, 2016, 8 pages.
Notice of Allowance for U.S. Appl. No. 15/421,999, dated Apr. 4, 2018, 7 pages.
U.S. Appl. No. 14/083,070, Non-Final Office Action dated Aug. 9, 2017, 29 pages.

* cited by examiner

FIG. 13
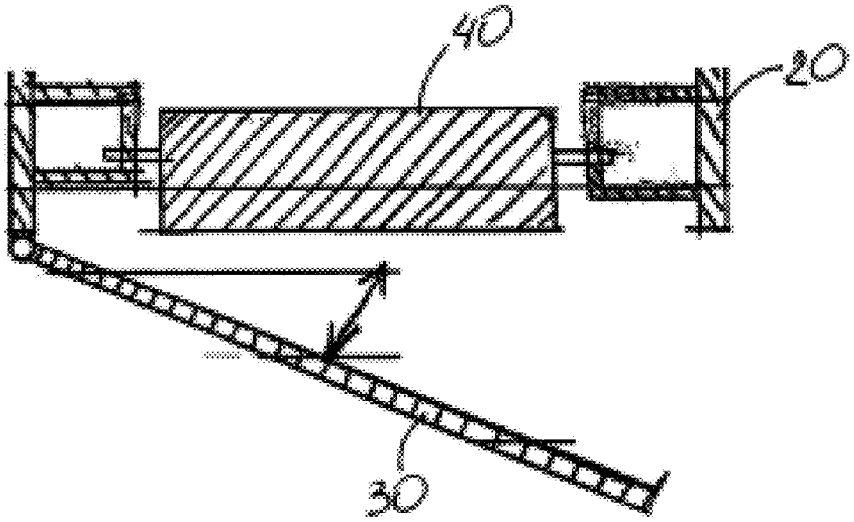
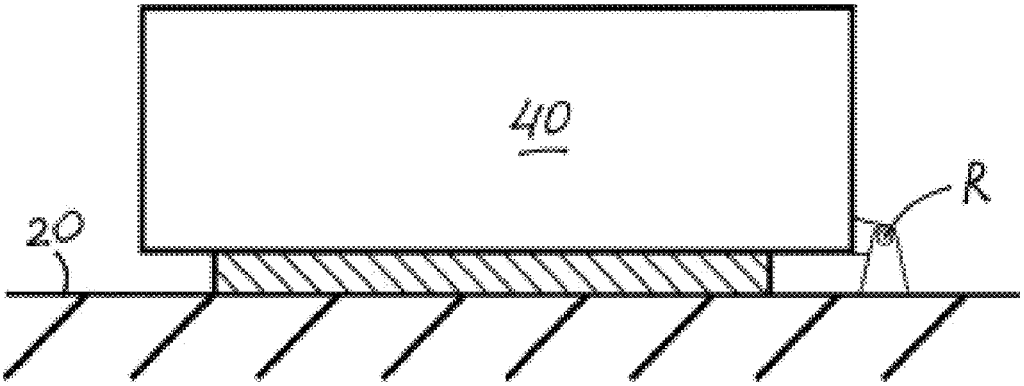
FIG. 14

FIG. 22
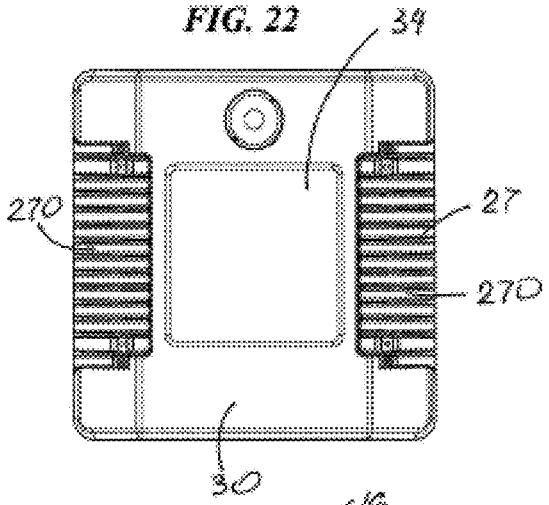
FIG. 23
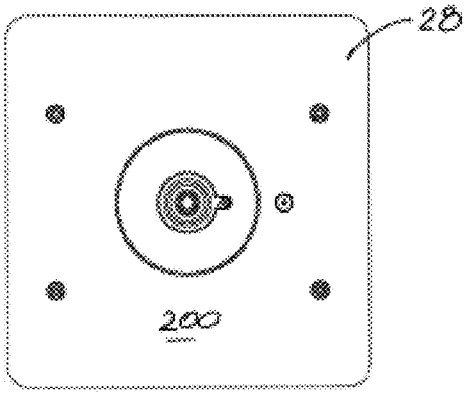
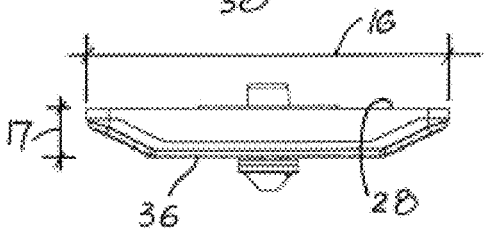
FIG. 24
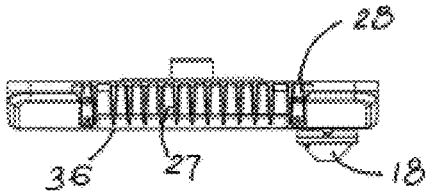
FIG. 25

SYSTEMS AND METHODS FOR HIGH OUTPUT, HIGH COLOR QUALITY LIGHT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

The present application claims priority to, and is a continuation of U.S. patent application Ser. No. 14/188,184 filed on Feb. 24, 2014, *now U.S. Pat. No. 9,593,837,* and entitled "Systems and Methods for High Output, High Color Quality Light," which is a continuation-in-part of U.S. patent application Ser. No. 14/083,070 filed on Nov. 18, 2013, *now U.S. Pat. No. 10,743,384,* and entitled "Systems and Methods for a Current Sharing Driver for Light Emitting Diodes," application Ser. No. 14/188,184 also claims priority to, and is a continuation-in-part of U.S. patent application Ser. No. 13/787,579 filed on Mar. 6, 2013, *now U.S. Pat. No. 9,182,096,* and entitled "Led Light Fixture," application Ser. No. 14/188,184 also claims priority to, and is a continuation-in-part of U.S. patent application Ser. No. 13/839,922 filed on Mar. 15, 2013, *now U.S. Pat. No. 9,441,824,* and entitled "High-Output LED Light Fixture," which claims priority to U.S. Provisional Application Ser. No. 61/624,211, filed Apr. 13, 2012 and is a continuation-in-part of patent application Ser. No. 13/333,198, filed Dec. 21, 2011, now U.S. Pat. No. 8,313,222, issued Nov. 20, 2012, which is a continuation of patent application Ser. No. 12/418,364, filed Apr. 3, 2009, now U.S. Pat. No. 8,092,049, issued Jan. 10, 2012, which claims priority to U.S. Provisional Application Ser. No. 61/042,690, filed Apr. 4, 2008. The entirety of all of the aforementioned applications are incorporated by reference herein.

FIELD OF THE INVENTION

This invention relates to light fixtures and, more particularly, to LED light fixtures.

BACKGROUND

As a result of continuous technological advances that have brought about remarkable performance improvements, light-emitting diodes (LEDs) are increasingly finding applications in traffic lights, automobiles, general-purpose lighting, and liquid-crystal-display (LCD) backlighting. LED lighting is poised to replace existing lighting sources such as incandescent and fluorescent lamps since LEDs do not contain mercury, exhibit fast turn-on and dimmability, long life-time, and require low maintenance. Compared to fluorescent lamps, LEDs can be more easily dimmed either by linear dimming or PWM (pulse-width modulated) dimming. Indeed, lighting applications which previously had typically been served by fixtures using what are known as high-intensity discharge (HID) lamps are now being served by LED light fixtures.

LED light fixtures present problems which relate to size and configuration, ease of installation, servicing and configurational efficiency. Achieving improvements in such characteristics while also delivering excellent heat dissipation from light fixture components can be problematic. It is desired to achieve compactness in LED light fixtures, ease of installation and ease of servicing while still allowing excellent light output and operational efficiency.

SUMMARY

The present disclosure relates to improved LED light fixtures. The LED light fixture may comprise a plurality of heat-sink-mounted LED-array modules, each module engaging an LED-adjacent surface of a heat-sink base for transfer of heat from the module. Heat-sink heat-dissipating surfaces may extend away from the modules. In some embodiments, the LED light fixture comprises at least one venting aperture through the heat-sink base to provide air ingress to the heat-dissipating surfaces adjacent to the aperture.

Additional embodiments of the present disclosure comprise circuits for balancing the current between two or more strings of LEDs in parallel or series. Embodiments may comprise a plurality of LED strings to form a light output, e.g., as a replacement for a traditional incandescent or florescent light source. In some embodiments, the voltage of each of the plurality of strings may be measured and compared, and based on the comparison; the current provided to each of the plurality of strings may be increased or decreased. In some embodiments, this may substantially balance the current between the strings. Alternatively, in some embodiments, the ratio between the current flowing through each of the plurality of strings may be set to a predetermined level to properly blend the brightness of each string. In some embodiments, this current balancing may be used for color or light output optimization.

Embodiments of the present disclosure may enable an LED to comprise advantageous light output characteristics. For example, in some embodiments, the cumulative light output of embodiments of the present disclosure may comprise an intensity of greater than or equal to 10,000 lumens. Further, in some embodiments, the cumulative light output may comprise a color temperature of greater than or equal to 4000° K. In some embodiments, the cumulative light output may comprise a Color Rendering Index ("CRI") of at least 90. In some embodiments, the CRI may be 94 or greater. In some embodiments, the above characteristics may be achieved with a drive current of at least 700 mA. In some embodiments, the drive current may comprise 1,000 mA. In some embodiments, the cumulative light output comprises an intensity of greater than or equal to 13,000 lumens. In some embodiments, the chromaticity comprises within 0.2-0.225 u' and 0.49-0.51 v'. Further in some embodiments, the total radiant flux is within the range of 30,900-41,600 mW.

Embodiments of the present disclosure may enable an LED to comprise advantageous light output characteristics. For example, in some embodiments, the cumulative light output of embodiments of the present disclosure may comprise an intensity of at least 10,000 lumens and a lumen efficiency of at least 100 lumens per watt. Further in some embodiments, the cumulative light output may comprise a color temperature of greater than or equal to 4000° K and a Color Rendering Index ("CRI") of at least 70. In some embodiments, the cumulative light output comprising a color temperature of greater than or equal to 5000° K and a CRI of at least 90. In some embodiments, the drive current comprises at least 1000 mA and the cumulative light output comprises an intensity of greater than or equal to 13,000 lumens. In other embodiments, the cumulative light output comprises an intensity of greater than or equal to 25,000 lumens. In other embodiments, the LED light fixture is configured to operate based on a drive current comprises at least 700 mA and the cumulative light output comprises an intensity of greater than or equal to 20,000 lumens In one embodiment, a system of the present disclosure may comprise: a light fixture comprising one or more LEDs configured to output a cumulative light output; wherein the cumulative light output comprises an intensity of greater than or equal to 10,000 lumens; and wherein the cumulative light output comprises a CRI of at least 90.

In another embodiment, a system of the present disclosure may comprise: a light fixture comprising one or more LEDs configured to output a cumulative light output at an efficiency; wherein the cumulative light output comprises at least 10,000 lumens; and wherein the efficiency comprises at least 100 lumens per watt.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

FIG. 13 is a schematic illustration of an alternative embodiment for allowed movement of the LED power-circuitry unit with respect to the base.

FIG. 14 is another schematic illustration of an alternative embodiment for allowed movement of the LED power-circuitry unit with respect to the base.

FIG. 22 is a bottom plan view of the LED light fixture of FIG. 1.

FIG. 23 is a top plan view of the LED light fixture of FIG. 1.

FIG. 24 is a front elevation of the LED light fixture of FIG. 1.

FIG. 25 is a side elevation of the LED light fixture of FIG. 1.

DETAILED DESCRIPTION

Figure 1:
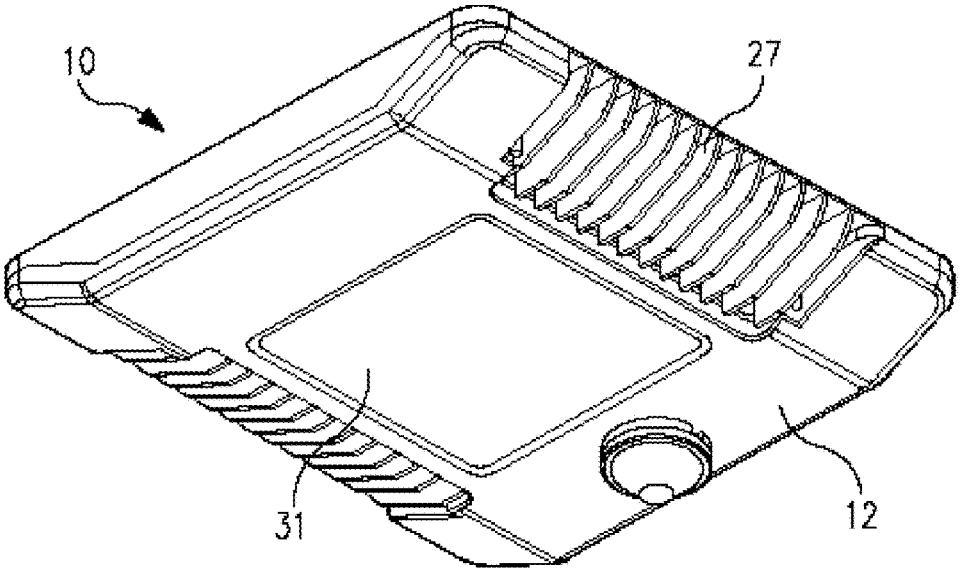
FIG. 1 is a perspective view of one embodiment of an LED light fixture according to the present disclosure.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure comprise modifications and variations as come within the scope of the appended claims and their equivalents.

Illustrative System for High Output, High Color Quality Light

One embodiment of the present disclosure comprises a plurality of LED strings used to form a light source, e.g., a replacement for a traditional incandescent bulb, florescent tube, compact florescent, or halogen bulb. Each LED string comprises one or more LEDs, and may comprise a plurality of LEDs in series. In some embodiments, the LEDs may all be of the same color, e.g., white, blue, red, etc. Alternatively, in some embodiments, one or more of the LEDs in a string may comprise a different color. Further, in some embodiments, each string of LEDs may be made up of different color LEDs.

In some embodiments, the LED light fixture may comprise a plurality of heat-sink-mounted LED-array modules, each module engaging an LED-adjacent surface of a heat-sink base for transfer of heat from the module. Heat-sink heat-dissipating surfaces may extend away from the modules. Further, in some embodiments, the LED light fixture comprises a plurality of heat sinks, each heat sink with its own heat-dissipating surfaces and heat-sink base. Each heat-sink base may have one of the LED-array modules engaged thereon. Further, the heat-sink base may be wider than the module such that the heat-sink base comprises a region beyond the module.

In some embodiments, the LED light fixture comprises at least one venting aperture through the heat-sink base to provide air ingress to the heat-dissipating surfaces adjacent to the aperture. The at least one venting aperture may comprise at least one venting aperture through the beyond-module portion of the heat-sink base. In some embodiments, the at least one venting aperture along the beyond-module portion of the heat-sink base comprises at least two venting apertures along the beyond-module portion. In some embodiments, the heat sinks may be made by extrusion.

In some embodiments, the LED light fixture comprises or is coupled to a mounting assembly that comprises a bar having a gripping region and a gripper grips the gripping region such that the light fixture is held with respect to the static structure. In some embodiments, the bar has a first end secured with respect to one or both of the static structures and a main body portion of the light fixture.

In some embodiments the mounting assembly is not adjustable. In such an embodiment, the bar may have a cross-sectional shape which is gripped by the gripper such that the fixture is held in one orientation. In such an embodiment, the cross-sectional shape of the bar may comprise rectangular shapes such as square. In other embodiments, the mounting assembly facilitates adjustment of the light fixture to a selected one of a plurality of possible orientations during installation. In some embodiments, the gripper grips the gripping region such that the light fixture is held in a selected one of the plurality of possible orientations.

In another embodiment of the present disclosure, the LED light fixture may comprise a circuit board comprising an LED-populated area (the circuit-board region within the closed boundary minimally circumscribing the LED light sources and a non-LED-populated area (the circuit-board region outside the LED-populated area). The LED light fixture may further comprise an optical aperture (the light-fixture opening of smallest cross-sectional area through which aperture the light from the LED-populated area passes). In some embodiments, the circuit board of the LED light fixture may comprise a substantially isothermal circuit board, in which temperature variation across the circuit board is no more than 5° C.

In some embodiments, at least 50% of the non-LED-populated area extends beyond the optical aperture. In some embodiments, substantially the entirety of the non-LED-populated area extends beyond the optical aperture. In some embodiments, at least 50% of the area of the circuit board extends beyond the optical aperture. The non-LED-populated area of the circuit board may extend beyond the optical aperture by, e.g., more than 0.5 inches on every side of the circuit board, or in some cases by at least about 1.0 inch on every side there-around. In some embodiments, the non-LED-populated area of the circuit board is greater than the LED-populated area.

As mentioned above, in some embodiments, during operation, the circuit board is substantially isothermal. In such an embodiment, the circuit board's non-LED-populated area extending beyond the optical aperture is very close in temperature to the temperature of its LED-populated area, and this facilitates heat dissipation. That is, the circuit board, which comprises a good thermally-conductive material, such as copper or aluminum, spreads the heat laterally away from the LED-populated area and allows rapid heat transfer to the heat-sink body from across the entire circuit board—even in such "hidden" positions as are beyond the boundary of the optical aperture. In some embodiments, the circuit board can be proximate heat-dissipating surfaces of the heat sink to provide a better thermal path to the heat dissipating surfaces of the heat sink. Embodiments of the present disclosure take advantage of the anisotropic nature of heat conduction—the fact that heat conduction laterally within the circuit board is greater than heat conduction from the circuit board to the heat-sink body. As such, the heat will tend to spread laterally away from the LED-populated area thus facilitating removal of heat from the LED-populated area to the non-LED-populated area and to the heat sink, which increases the optical efficiency of the LEDs. The spacing between adjacent LED light sources of the LED-populated area may be no more than about the cross-dimension of each of the LED light sources.

In some embodiments, the heat-sink body forms a base of the fixture. Some embodiments comprise a cover secured with respect to the base, the cover defining a light-transmissive opening over the LED-populated area.

In some embodiments, the opening in the cover defines the optical aperture. In other embodiments, a reflector or other optical element or lens defines the optical aperture. Depending on the embodiment, the optical elements defining the optical aperture can be integral with or mounted to the cover and/or LED assembly. In some embodiments, the aperture member is a reflector which extends from a first end adjacent to and surrounding the LED-populated area to a second end which is substantially aligned with the cover opening. The reflector enhances light output. In some embodiments, the LED-populated area is substantially rectangular in shape and the reflector is frusto-pyramidal in shape. Other embodiments are possible where the LED populated area is circular or rectangular and comprises an open space for mounting or electrical connections. In other embodiments, the cover serves as the aperture member and the light-transmissive opening is the optical aperture.

In some embodiments, a light-transmissive member is positioned in the cover opening. The light-transmissive member may comprise a phosphorescent material such that at least some of the light emitted by the fixture has a different wavelength than light as first emitted from the LED-populated area. For example the LEDs can be blue LEDs where the blue light excites the phosphorescent material, such as yttrium aluminum garnet ("YAG"), to produce a secondary emission of light where the blue light and the secondary emission produce white light. In other embodiments, different color LEDs can be used together with individual white LEDs (blue LEDs plus phosphor) or with blue LEDs in a remote phosphor configuration where the light-transmissive element is coated and/or impregnated with the phosphorescent material.

In some embodiments, the LED light fixture according to the present disclosure may comprise a low-profile LED light fixture. In such an embodiment, the low-profile LED light fixture comprises a base plate, an LED circuit board secured to a front surface of the base plate and at least one LED power-circuitry unit secured with respect to the front surface of the base plate in a position adjacent to the circuit board. In some embodiments, heat-dissipating surfaces extend from the front surface of the base plate, the LED circuit board being in position adjacent to the heat-dissipating surfaces. In some embodiments, the base plate has a substantially planar back surface from which no portion of the light fixture extends other than parts necessary for electrical connection, e.g., for surface mounting on a gasoline-station canopy.

In some embodiments, the heat-dissipating surfaces extend substantially orthogonally from the front surface of the base plate, and in some embodiments a cover is movably secured with respect to the base plate. Such cover may extend over the LED power-circuitry unit(s) while leaving uncovered the heat-dissipating surfaces and defining the aforementioned light-emitting opening over the LED circuit board.

In some embodiments, the base plate defines a pair of cavities along the front surface thereof, one on either side of the LED circuit board in positions along the other two opposite lateral sides of the base plate. Depending on the embodiment, the LED power-circuitry unit may be positioned within one of the two cavities. In some embodiments, light-fixture control circuitry, sensor and/or communication circuitry may be positioned within the other of the two cavities. Depending on the embodiment, a cover can extend over one or both cavities. In some embodiments, the light-emitting opening in the cover is bounded by portions of the cover over the LED power-circuitry and the control circuitry.

In some embodiments, the cross-section of the fixture in a plane orthogonal to the base plate and located between the back surface of the base plate and a forwardmost surface of the cover is such that the aspect ratio of such cross-section is greater than about 6:1. The aspect ratio may be greater than about 7.5:1. In some embodiments, the thickness of the cross-section is no more than about 3 inches, and may be no more than about 2 inches for a fixture of very low profile.

In some embodiments, the LED power-circuitry unit is in thermal communication with the cover, such that during operation primary heat transfer from the power-circuitry unit(s) is to the cover and primary heat transfer from the LED circuit board is to the base plate. In some embodiments, the power-circuitry unit may be directionally biased toward the cover to facilitate thermal contact between the power-circuitry unit and the cover.

The low-profile LED light fixture of the present disclosure may be a surface-mount fixture for mounting on a surface of a structure such that, when the fixture is installed, the back surface of the base plate is substantially against the structure surface—with no portion of the light fixture other than parts necessary for electrical connection being behind the structure surface. This allows mounting to gasoline-station canopies and the like with a minimal-size opening in the canopy. Such surface mounting also facilitates any needed servicing of such canopy light fixture.

In one embodiment, in order to increase the total number of LEDs in the light source, each of the plurality of strings of LEDs is placed in parallel. As is known in the art, the current flowing through two circuits in parallel is the input current multiplied by the ratio of the impedance of each circuit to the total impedance of the circuit. Thus, in the some embodiments, the current flowing through each of the strings of LEDs may be different. Thus, each string may have a different brightness. The present disclosure describes in detail multiple example circuits that solve this problem by controlling the current flowing through each string of LEDs. Controlling the current between each string of LEDs may guarantee a uniform brightness between each string. Further, controlling the current may enable higher quality light by controlling the current flowing through various color strings, for example, to set a level of warmth of the overall light output.

One system for solving this problem comprises placing two transistors, such as JFETs, with a common base in series with the two strings of LEDs and two current sensing resistors (one resistor associated with each string of LEDs). In such an embodiment, the common base may be connected to the collector of one of the transistors. In such an embodiment, if the two transistors are ideally matching, the voltages across the two current sensing resistors will be equal. Thus, the current shared by the two LED strings will be the ratio of the two sensing resistors. Thus, in an embodiment with two LED strings LED1 and LED2 and two resistors R1 and R2, the current across each LED string will be:

$$ILED1=I*R2/(R1+R2)$$

$$ILED2=I*R1/(R1+R2)$$

Where:

ILED1=the current through the first string of LEDs, LED1;

ILED2=the current through the second string of LEDs, LED2; and

I=the total current shared by the two LED strings.

One drawback for a current sharing circuit according to this embodiment is that the voltage of the first string of LEDs (VLED1) needs to be no less than the string voltage of the second string of LEDS (VLED2). If this is not the case, then one of the transistors may enter saturation. When in saturation, the transistors may not control the current flowing through each string to the level set by the resistors, i.e., the current flowing through each string of LEDs may be different than the levels determined using the formulas above.

Another embodiment may comprise a third string of LEDs with a transistor connected in series with the third string and a common base with the other two transistors. Such an embodiment may further comprise a third sensing resistor in series with the third string of LEDs. In such an embodiment, the string voltage of the first string of LEDs (the string for which the transistor's base is connected to the collector) needs to be the highest among all the LED string voltages to ensure all the LED currents match the values set by the current sensing resistors.

In the embodiments described above, the constraint of maintaining the voltage drop across the first string of LEDs higher than the voltage drop across the other strings complicates the selection of LEDs. For example, the forward voltage drops of LED strings may vary with temperature and driving current. Thus, in one embodiment, desired operation may be ensured by selecting LEDs such that the minimum voltage of the first string of LEDs is no less than the maximum voltage of the other strings of LEDs. However, in some embodiments, this may increase power loss for the circuit. For example, in one embodiment, in a lighting fixture, if the voltage difference between the voltage of LED1 and the voltage of the other strings is 10V and the driving current is 0.35 A, the power loss will be 3.5 W. This may decrease the overall efficiency of the lighting fixture and also increase the thermal stress to the transistor and LEDs, thus shortening the operational life of the device.

Another embodiment may comprise using linear regulators to regulate the current to all but one of the strings of LEDs. However, such an embodiment may again suffer from the same deficiencies as the circuit described above.

Yet another embodiment for solving the problem discussed above may comprise current balancing transformers to equalize currents flowing through each of the LED strings. In one such embodiment, a magnetic balancer may be used to balance the current flowing through three strings of LEDs. In such an embodiment, two transformers with an equal number of turns of their primary and secondary windings may be connected between the output rectifier and the filter capacitor in three isolated outputs of a switch-mode power supply. Further, in such an embodiment, the current feedback from one output is used to set and regulate the current of the corresponding LED string. The 1:1 turn ratio of the transformer windings maintains the current flowing through each winding of the transformer at substantially the same value provided that the magnetizing current of the transformer is small compared to the winding current.

A deficiency of this embodiment is that it requires a switch-mode power supply. Thus, such an embodiment cannot be used independently, and lacks the flexibility to operate with an arbitrary DC source, for example, a DC current source. Furthermore, the addition of transformers for magnetic balancing into a switch-mode power supply increases the complexity and cost of the circuit. Furthermore, in some embodiments, separate output circuits may be detrimental if a large number of parallel LED strings are required. Furthermore, such an embodiment lacks the capability to individually change or tune the current flowing through each LED string once the turns-ratio of the transformer has been set. Thus, such an embodiment may not be effective for color mixing or control.

Another system for compensating for this problem without the above discussed deficiencies comprises a current control device such as a JFET or MOSFET in series with each string of LEDs. In this, embodiment, each current control device is controlled by a control device, such as a comparator and/or op-amp circuit. Each control device measures the voltage drop before and/or after the current control device, and based on this measurement, varies the impedance of the current control device, e.g., by varying a voltage to the base of the JFET, to increase or decrease the current flowing through each LED string. In some embodiments, the current measurement and control devices may be able to substantially balance the current flowing through each LED string in order to cause each LED string to have substantially the same light output.

Some embodiments may comprise sensing resistors placed in series with each LED string after the control circuit. Choosing resistors with different values may vary the voltage drop measured by each measurement device. Appropriate selection of the value of these sensing resistors enables the designer to vary the brightness of each string of LEDs to provide the desired light output. For example, the designer may comprise multiple strings of white LEDs kept at a substantially high brightness, but further comprise one string of red LEDs to provide a warmer light output. In such an embodiment, the designer may select sensing resistors configured to cause the string of red LEDs to receive a lower current, and therefore be dimmer than the string of white LEDs. In such an embodiment, the brightness of the red LEDs may be set to provide the desired warmth of the total light output.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

Illustrative System for High Output, High Color Quality Light

Figure 2:
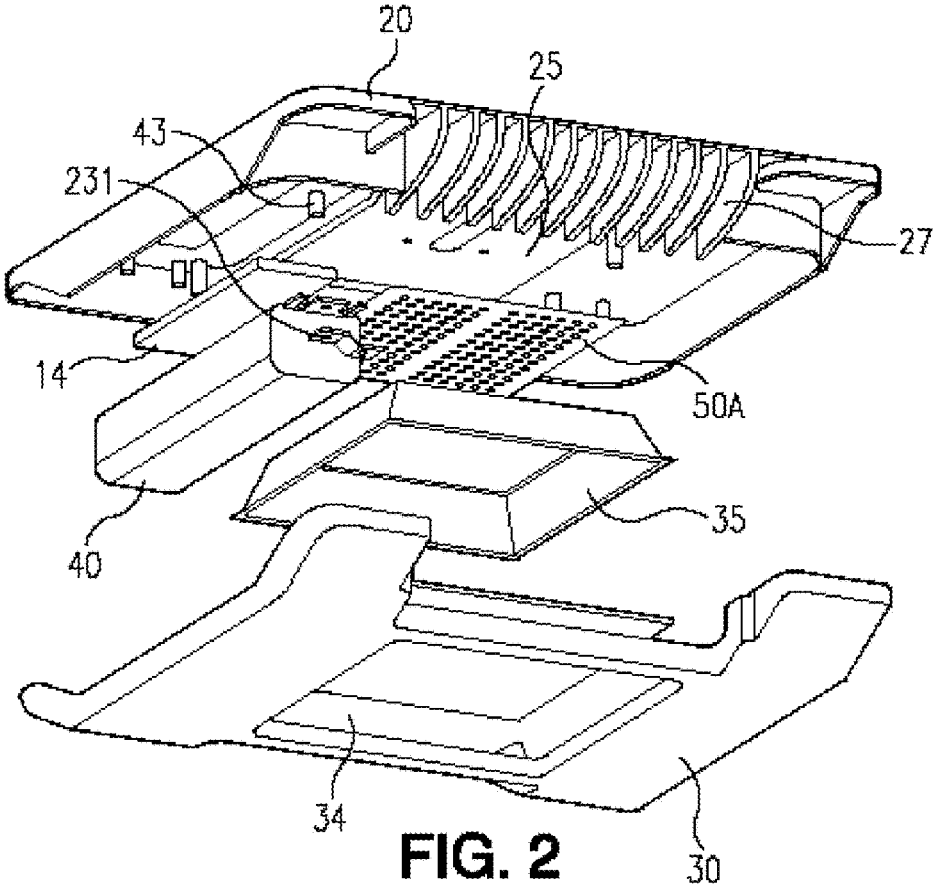
FIG. 2 is an exploded perspective view of the LED light fixture shown in FIG. 1.
Figure 52:
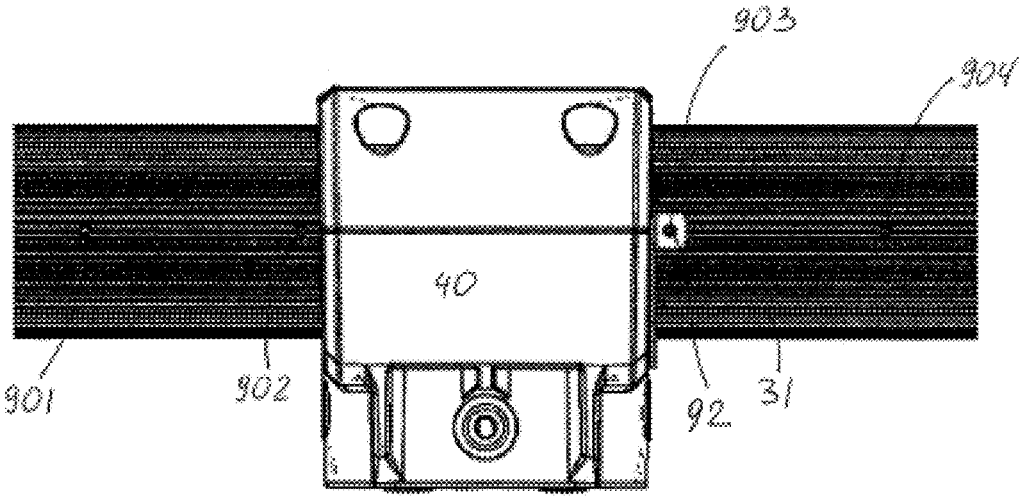
FIG. 52 is an enlarged portion of FIG. 51 showing details of the bar according to one embodiment.

Turning now to the Figures, FIGS. 1-52 illustrate exemplary embodiments of LED light fixtures according to the present disclosure. As shown in FIGS. 1, 2 and 6, light fixture 10 comprises a housing 12 defining an enclosure 11 formed by a base 20 and a cover 30 movably secured with respect to base 20. FIGS. 3-7 show a power-circuitry unit 40 secured with respect to base 20 such that, when the cover 30 is closed, power-circuitry unit 40 is in thermal communication with cover 30.

Figure 3:
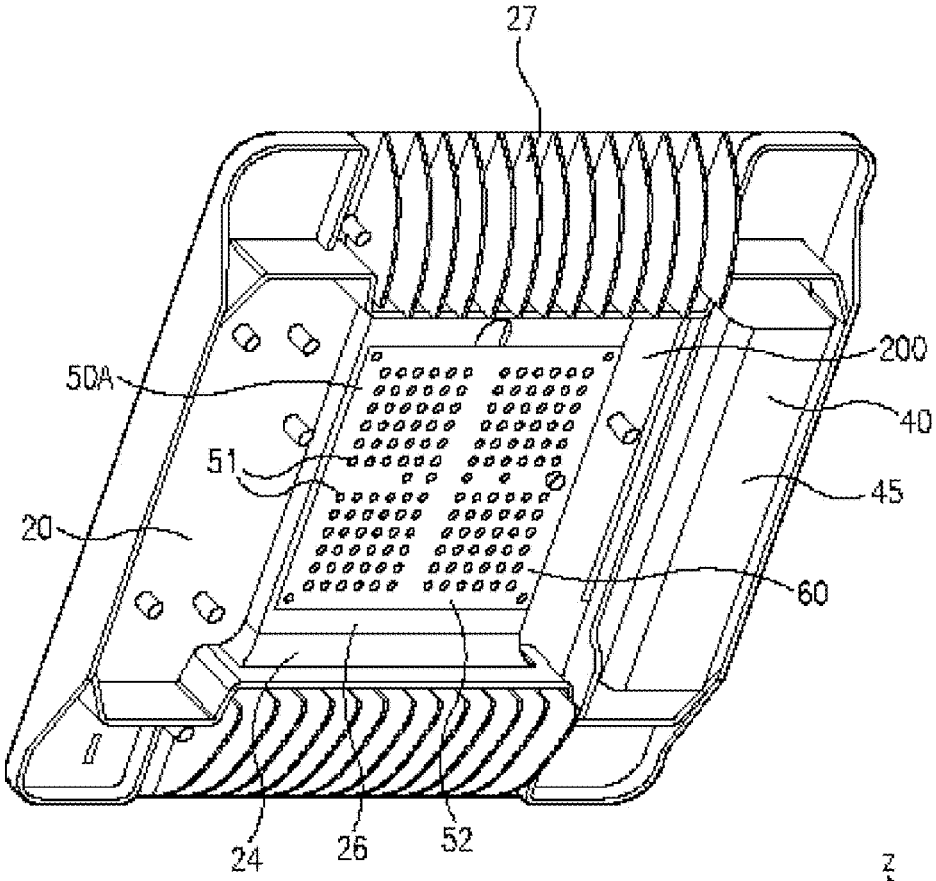
FIG. 3 is a perspective view of the LED light fixture of FIG. 1 with its cover removed.
Figure 5:
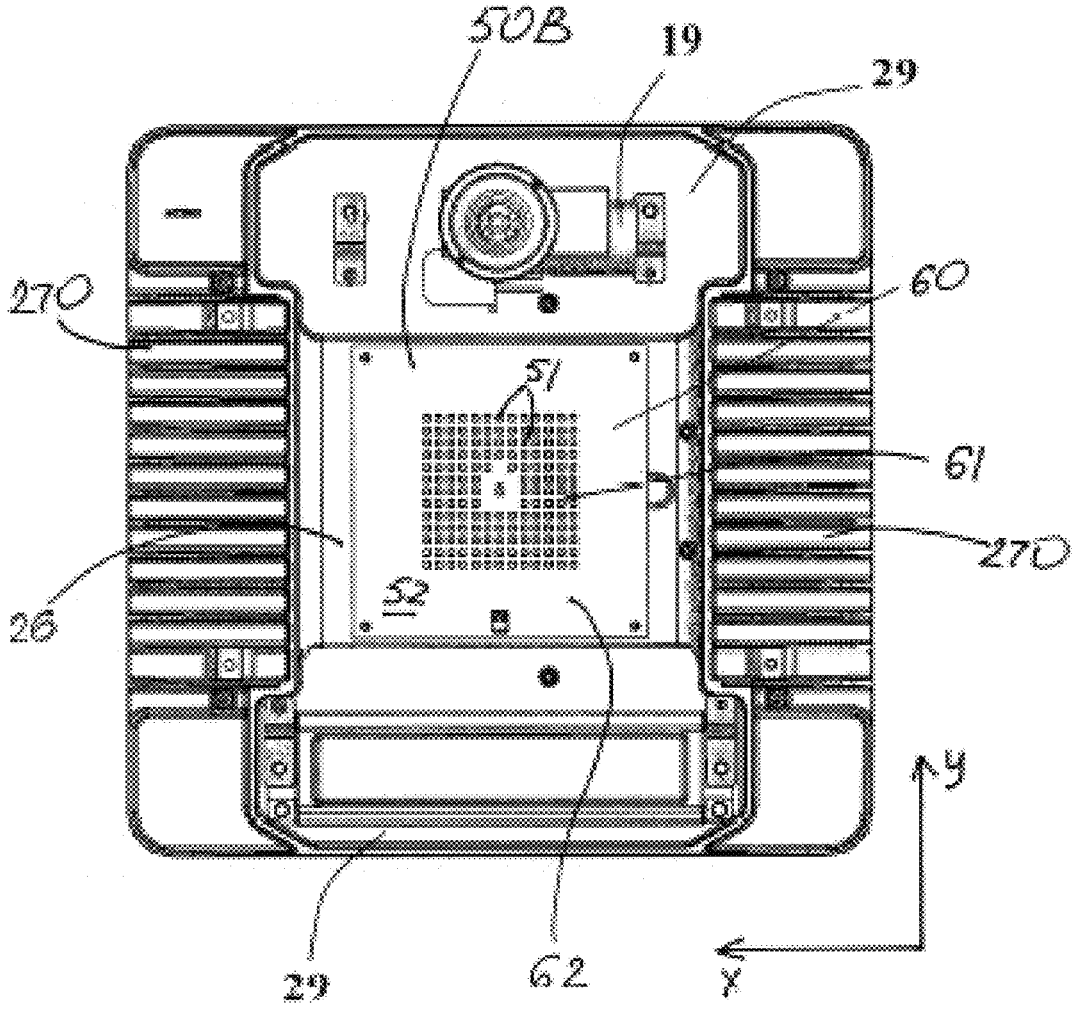
FIG. 5 is a plan view of another embodiment of the LED light fixture according to the present disclosure.
Figure 6:
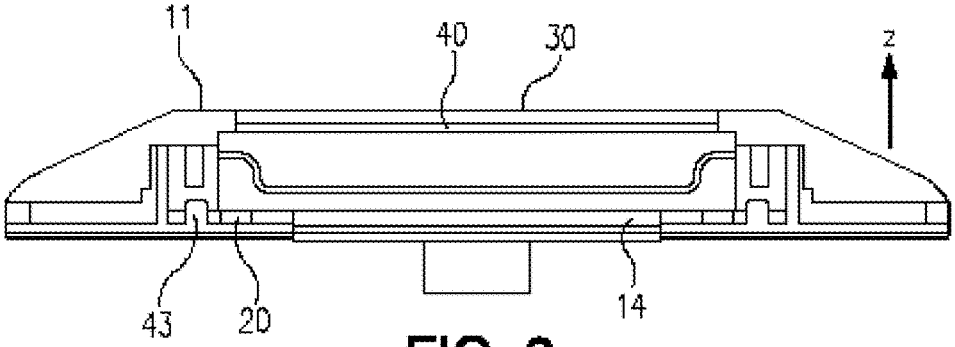
FIG. 6 is a cross-sectional view of the LED light fixture of FIG. 5.

As illustrated in FIGS. 2, 3 and 5, a light emitter, such as an LED, may be secured with respect to housing 12 within enclosure 11. FIGS. 3 and 5 show two alternative light emitters 50A and 50B, each of which comprises LED sources 51 on an LED-circuit board 52 which is secured with respect to base 20. As shown in FIGS. 3, 5 and 15-17, which illustrate alternative embodiments, the light emitter is in thermal communication with base 20. Base 20, as shown in FIGS. 2 and 3, is a single-piece metal casting. Cover 30, as shown in FIGS. 2 and 3, may comprise a metal casting supporting a light-transmitting lens member 31 over the light emitter.

In some embodiments, configurations in which the light sources are in thermal communication with base 20 while power-circuitry unit 40 is in thermal communication with cover 30, may be advantageous. In such embodiments, during operation of the light fixtures this arrangement provides primary heat transfer from the power-circuitry unit and primary heat transfer from the LED emitter(s) to separate major enclosure members, each of which serves as a heat sink.

As shown in FIG. 2, housing 12 has first and second housing members, base 20 being the first housing member and cover 30 being the second housing member and being movably secured with respect to base 20 between use and non-use positions. FIGS. 3-7 show power-circuitry unit 40 secured with respect to base 20. In some embodiments, which are not illustrated, the power-circuitry unit may be secured to the cover. Further, as shown in FIG. 2, some embodiments may comprise a cover 30, which is fully removable for access within enclosure 11.

As shown in FIGS. 6, 7, and 10-14, power-circuitry unit 40 may be constrained such that when cover 30 is in its use position, power-circuitry unit 40 is in thermal communication with cover 30. Power-circuitry unit 40 may be in a fully-fixed position for such primary thermal communication with cover 30, or it may be configured to be pressed against cover 30 when cover 30 is in its use position.

Figure 7:
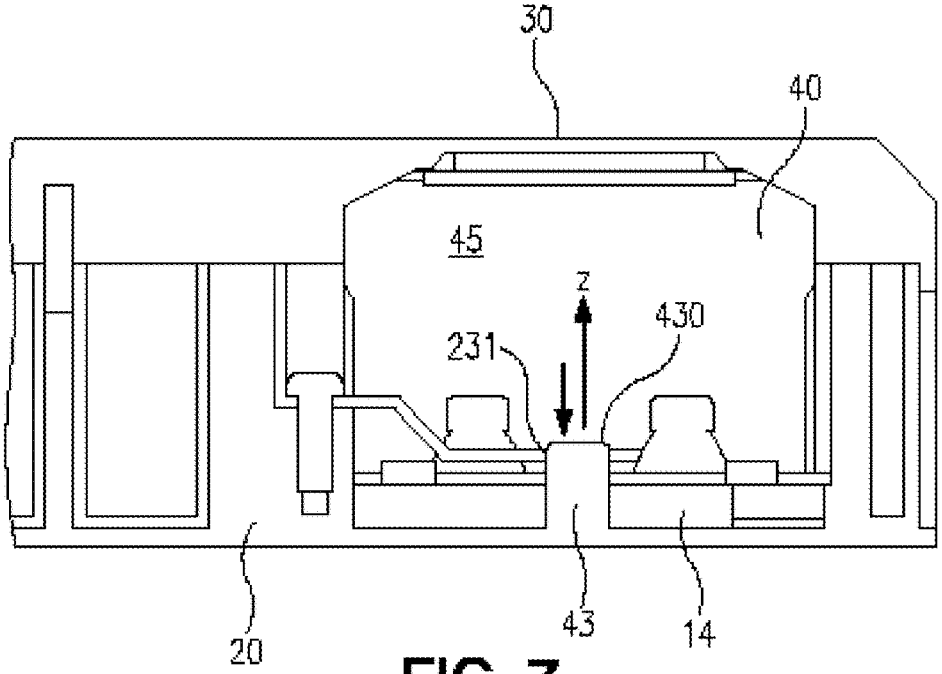
FIG. 7 is a fragmentary cross-sectional view of the LED light fixture of FIG. 5.

FIGS. 6 and 7 illustrate power-circuitry unit 40 in fixed orientation with respect to base 20 along a plane which comprises X and Y isometric axes of base 20. In the embodiments shown in FIGS. 6 and 7, power-circuitry unit 40 is movable along axis Z which is orthogonal to axes X and Y. In other embodiments, the power circuitry unit may have only one degree-of-freedom of movement with respect to base 20. In some embodiments, this degree-of-freedom of movement may comprise a linear freedom of movement.

FIG. 14 schematically illustrates an alternative embodiment in which the degree-of-freedom of movement is rotational about an axis R that is fixed with respect to base 20. In such an embodiment, power-circuitry unit 40 may be directionally biased toward cover 30 to facilitate thermal contact between power-circuitry unit 40 and cover 30.

As shown in FIGS. 2, 6, and 7, fixture 10 comprises a resilient member in the form of a compressible pad 14 situated between power-circuitry unit 40 and base 20. As shown in FIGS. 6 and 7, compressible pad 14 may be configured and positioned such that, when cover 30 is closed, pad 14 pushes power-circuitry unit 40 against cover 30. As shown in FIG. 2, pad 14 is sized to approximate the footprint of power-circuitry unit 40 on base 20, thereby to facilitate thermal isolation between power-circuitry unit 40 and base 20, and thus facilitate primary heat transfer from power-circuitry unit 40 to cover 30.

Figure 11:
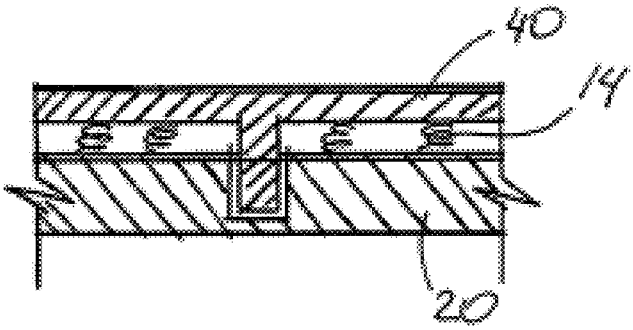
FIG. 11 is another schematic illustration of an alternative embodiment for positioning the LED power-circuitry unit with respect to the base.

In FIG. 11, one embodiment of a resilient member is shown. In the embodiment shown in FIG. 11, the resilient member comprises springs 15. In some embodiments, springs 15 may comprise coil springs positioned between power-circuitry unit 40 and base 20 and serving to bias power-circuitry unit away from base 20 along axis Z into firm contact with cover 30 in its use position.

Figure 4:
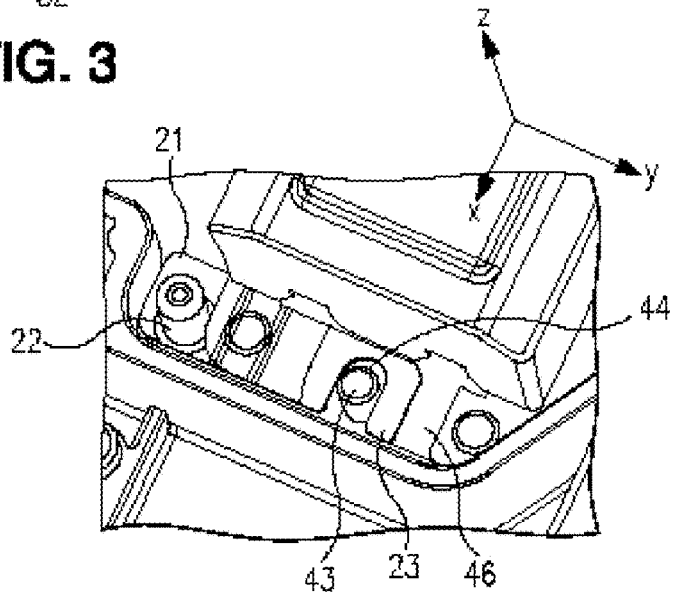
FIG. 4 is a fragmentary perspective view showing securement of the LED power-circuitry unit with respect to the base of the LED light fixture of FIG. 1.

As shown in FIGS. 4, 6, and 7, light fixture 10 may comprise a first locator in the form of a post 43 and a second locator in the form of a hollow 44 defined by power-circuitry unit 40, such inter-engaged first and second locators serving to constrain power-circuitry unit 40 along the aforementioned X and Y axes. As shown in FIGS. 6 and 7, post 43 may extend onto the hollow 44 such that power-circuitry unit 40 is slidable on post 43 along axis Z to facilitate thermal contact between power-circuitry unit 40 and cover 30. The embodiment shown in FIG. 5 comprises two posts 43 and corresponding hollows 44, the post/hollow pairs being spaced from one another along the facing surfaces of base 20 and power-circuitry unit 40.

FIGS. 10-13 illustrate alternative embodiments of the first and second locators which allow back-and-forth movement of the power-circuitry unit along a direction substantially orthogonal to the aforementioned X-Y plane. In the embodiment shown in FIG. 10, the power-circuitry unit and the base define aligned hollows with a fastener such as a self-tapping screw being inserted through both hollows to secure the power-circuitry unit along the base while allowing back-and-forth movement of the power-circuitry unit orthogonally thereto. In the embodiment shown in FIG. 11, the power-circuitry unit has a post which extends into a hollow defined in the base, with springs 15 being positioned between the base and the power-circuitry unit. In the embodiment shown in FIG. 12, the power-circuitry unit is shown to comprise a protruding female portion defining a cavity which receives a post extending from the base. The embodiment shown in FIG. 13 illustrates an embodiment in which the power-circuitry unit is secured at a fixed distance from the base and is slidable along the base.

In the embodiments shown in FIGS. 1-7, power-circuitry unit 40 is shown to comprise a heat-conductive casing 45 which is in thermal contact with cover 45. As shown in FIGS. 4-6, casing 45 may comprise a flange portion 46 which defines hollow 44. In the embodiments shown in FIGS. 6 and 7, casing 45 is directionally biased toward cover 30 to facilitate thermal contact between casing 45 and cover 30.

Figure 8:
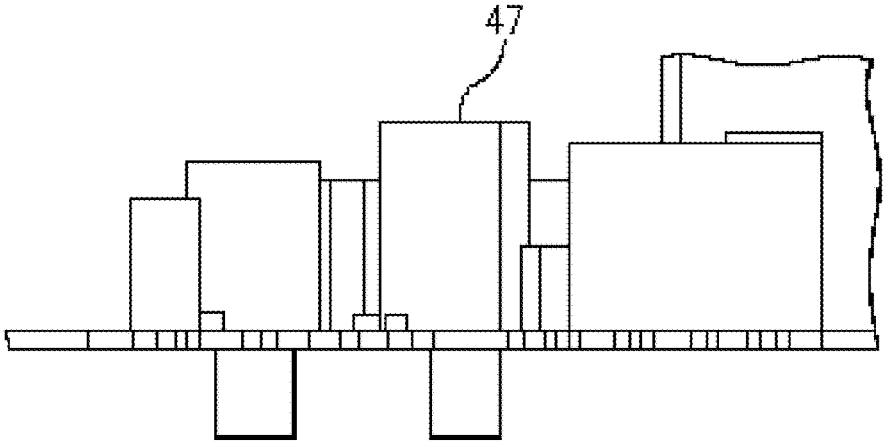
FIG. 8 is a side elevation and a perspective view of an example of a caseless LED power-circuitry unit.
Figure 9:
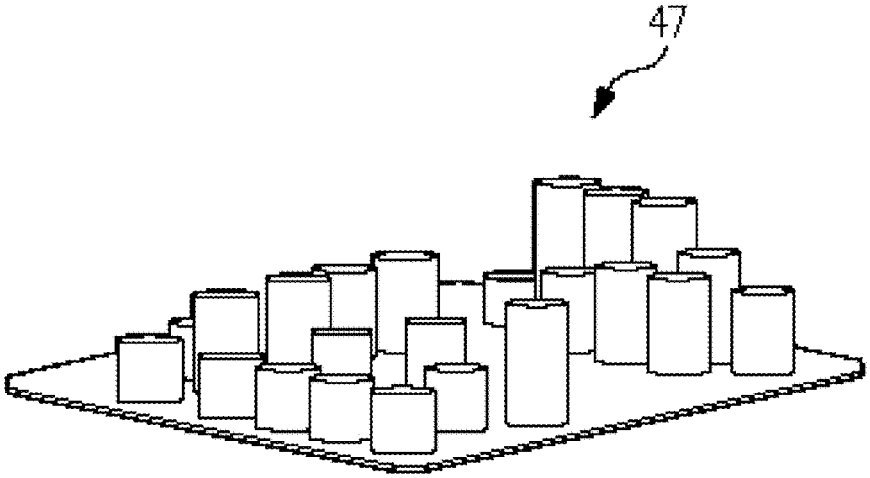
FIG. 9 is another side elevation and a perspective view of an example of a caseless LED power-circuitry unit.
Figure 10:
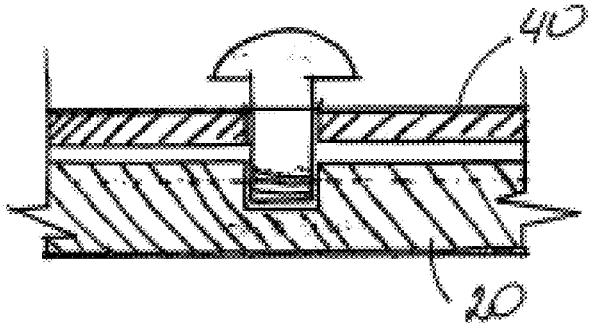
FIG. 10 is a schematic illustration of an alternative embodiment for positioning the LED power-circuitry unit with respect to the base.

The embodiments shown in FIGS. 8 and 9 illustrate the power-circuitry unit as a caseless LED driver 47. In some embodiments, such a caseless LED driver 47 can be removably secured with respect to base 20. In some embodiments, the power-circuitry components of caseless LED driver 47 are encapsulated (potted) in a protective polymeric material on a driver board prior to installation in the fixture such that driver 47 is readily replaceable and does not have any potting applied during or after installation in the fixture. Suitable examples of such protective polymeric encapsulating material comprise thermoplastic materials such as low-pressure injection-molded nylon, which amply protect caseless driver 47 from electrostatic discharge while conducting heat to facilitate cooling of the driver during operation.

In the embodiments shown in FIGS. 2-5, light fixture 10 comprises brackets 21 secured with respect to base 20 and holding power-circuitry unit 40 with respect to base 20 when enclosure 11 is open. As shown in FIGS. 4 and 7, each bracket 21 has an affixed end 22 secured with respect to base 20 and a free end 23 positioned to engage flange portion 46 of casing 45 of power-circuitry unit 40. FIG. 4 shows free end 23 defining an aperture 231 which receives distal post-end 430 with flange portion 46 of casing 45 being between base 20 and free end 23 of bracket 21.

The embodiments shown in FIGS. 2, 3, 5, 15-17, and 26 illustrate a heat-sink body 24 forming base 20 and having a circuit-board mounting surface 25. As shown in FIGS. 1, 2, 15-17, and 26, an aperture member may be supported over circuit-board mounting surface 25. In some embodiments, an LED circuit board 60 is affixed in thermal-contact relationship to circuit-board mounting surface 25. The LED circuit board, as later described herein, may be a metal-core board or other type of circuit board providing heat dissipation from LED emitters during operations.

In the embodiment shown in FIG. 5, circuit board 60 has an LED-populated area 61 with LED sources 51 concentrated in the middle region of the circuit board which has a non-LED-populated area 62 surrounding LED-populated area 61. FIG. 5 also shows that non-LED-populated area 62 is greater than LED-populated area 61.

The large non-LED-populated area surrounding the LED-populated area provides advantages, such as anisotropic heat conduction during operation. In particular, heat generated by the LED light sources on the LED-populated area spreads in lateral directions across the entire circuit board more than in directions orthogonal to the circuit board into the heat-sink body. That is, the circuit board, which comprises a good thermally-conductive material, such as copper or aluminum, spreads the heat laterally away from the LED-populated area and allows rapid heat transfer to the heat-sink body from across the entire circuit board—even in such "hidden" positions as are beyond the boundary of the optical aperture.

Figure 15:
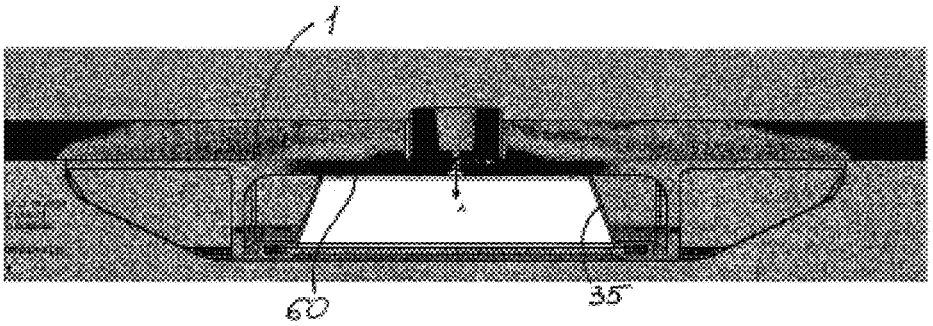
FIG. 15 is a partially-schematic cross-sectional view of one embodiment of the LED light fixture of FIG. 1.
Figure 16:
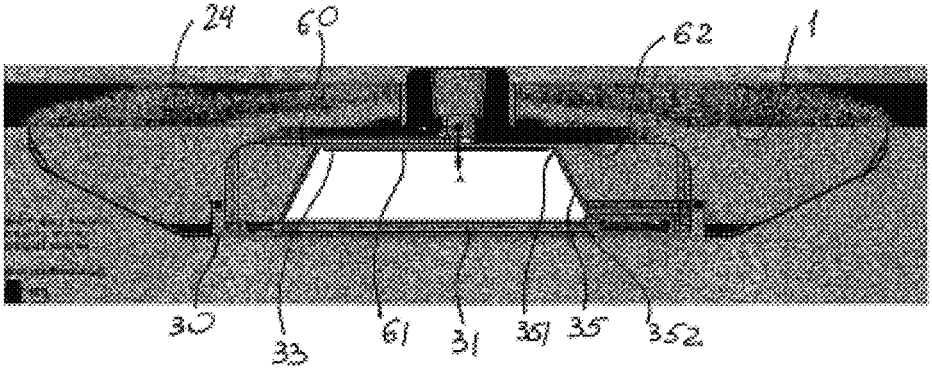
FIG. 16 is a partially-schematic cross-sectional view of another embodiment of an LED light fixture according to the present disclosure.
Figure 17:
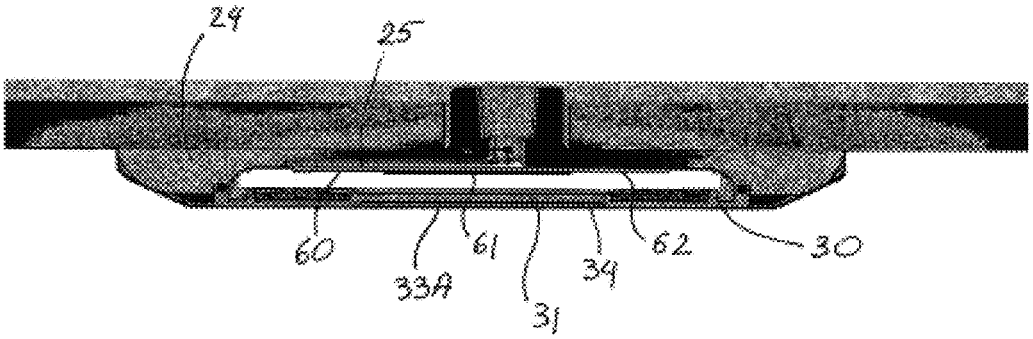
FIG. 17 is a partially-schematic cross-sectional view of still another embodiment of an LED light fixture according to the present disclosure.

The embodiments shown in FIGS. 15-17 comprise circuit board 60 in thermal contact with circuit-board mounting surface 25 of heat-sink body 24 such that heat from the entire area of the circuit board is conducted to heat sink body 24 for heat dissipation. FIGS. 15-17 schematically illustrate that heat conduction laterally within circuit board 60 is greater than heat conduction from circuit board 60 to heat-sink body 24. This spreading of heat to non-LED-populated area 62 facilitates removal of heat from circuit board 60 and thus facilitates heat removal from LED-populated area 61 which increases the optical efficiency of the LEDs. The circuit board can be proximate heat-dissipating surfaces of the heat sink to provide a better thermal path to the heat dissipating surfaces of the heat sink.

As also schematically shown in FIGS. 15-17, the entire area of the circuit board, including the LED-populated and non-LED-populated areas, may approach being isothermal, i.e., with temperatures during operation being substantially isothermal thereacross. As such, the heat will tend to spread laterally away from the LED-populated area thus facilitating removal of heat from the LED-populated area to the non-LED-populated area and to the heat sink, which increases the optical efficiency of the LEDs.

In the embodiment shown in FIG. 5 the spacing between adjacent LED light sources 51 of LED-populated area 61 may comprise no more than approximately the cross-dimension of each of LED light sources 51. In some embodiments, tight spacing of the LED light sources on the LED-populated area tends to improve the substantially isothermal characteristic of the circuit board.

As shown in FIGS. 15-17, in some embodiments, LED circuit board 60 is in position between mounting surface 25 and the aperture member. The aperture member is shown to form a single optical aperture 33. Aspects of this disclosure are based on the recognition that the optical aperture need not be coextensive with the circuit board, but instead may be substantially coextensive with the LED-populated area—or at least be of a size such that it leaves much or substantially all of the non-LED-populated area beyond the boundary of the optical aperture.

The embodiments shown in FIGS. 16 and 17 schematically illustrate that the majority of non-LED-populated area 62 may extend beyond optical aperture 33. In the embodiments shown in both FIGS. 16 and 17, optical aperture 33 exposes all of LED-populated area 61. In some embodiments, at least 50% of the area of circuit board 60 extends beyond optical aperture 33.

Illustrative Heat Sink Structure for High Output, High Color Quality Light

The present disclosure provides efficient ways for addressing thermal challenges and extracting increased amounts of light from the LEDs of LED light fixtures. One such way, as described above, is increasing the surface area of the printed circuit board without changing the configuration of the LED array thereon. This takes advantage of the extra circuit-board material for heat-transfer purposes.

In some embodiments, the material used for the LED circuit board should be selected with particular regard to its thermal conductivity. In some embodiments, a simple metal-core circuit board is comprised of a solder mask, a copper circuit layer, a thermally-conducting thin dielectric layer, and a much thicker metal-core base layer. Such layers are laminated and bonded together, providing a path for heat dissipation from the LEDs. In some embodiments, the base layer is by far the thickest layer of the circuit board and may be aluminum, or in some cases copper, a copper alloy or another highly thermally-conductive alloy. A highly-conductive base layer facilitates lateral conduction of heat in the board from beneath the LED-populated area to and across the non-LED-populated area. And since board temperatures remain high even across the non-LED-populated area, the total area of substantial thermal transfer from the circuit board to the heat sink is beneficially large—substantially larger than just the LED-populated area.

In some embodiments, instead of sizing the circuit board to closely match the size of the LED array, the circuit board may be enlarged to have a non-LED-populated area around an LED-populated area such that the non-LED-populated area extends beyond the optical aperture. In one example, such circuit-board enlargement decreases the temperature of the LEDs by 2° C. without adding manufacturing costs allowing for an increase on total lumen output. Larger decrease in temperature and larger increase in total lumen output are possible depending on non-LED-populated area of such a circuit board.

The present disclosure provides a further way for addressing thermal challenges in LED light fixtures. In some embodiments, the thermal load of the driver (power-circuitry unit) is substantially removed from the fixture member (e.g., the base member), which is in primary thermal communication with the LED circuit board. In such an embodiment, the thermal load of the driver may instead be transferred to a separate fixture member such as the light-fixture cover. In one example, such thermal "repositioning" of the driver provides a decrease in the LED temperature of about 2° C. and the thermal separation of the driver from the LED circuit board also lowers the driver temp by 2° C. This permits drive current to be increased while still maintaining a 100,000 hour driver life rating and allowing an increase on total lumen output.

In some examples of light fixtures of this disclosure, enlargement of the non-LED-populated area is combined with separation of the primary thermal paths of the LEDs and the LED driver. In one example, this combination of thermal advantages decreases the LED temperature by 4° C. and allows a 15% increase in the drive current which resulted in 13% increase in total lumen output.

In the embodiments shown in FIGS. 15 and 16, the aperture member is a reflector 35 which extends from a first end 351 adjacent to and surrounding LED-populated area 61 to a second end 352 substantially aligned with cover opening 34. FIG. 2 shows LED-populated area 61 being substantially rectangular in shape and reflector 35 being frusto-pyramidal in shape. FIG. 17 shows cover 30 itself serving as the aperture member; cover opening 34 forms optical aperture 33A. In some embodiments, the opening in the cover defines the optical aperture. In other embodiments, a reflector or other optical element or lens defines the optical aperture. In some embodiments, the optical elements defining the optical aperture can be integral with or mounted to the cover and/or LED assembly.

In the embodiments shown in FIGS. 1 and 15-17, a light-transmissive member 31 is positioned in cover opening 34. Light-transmissive member 31 may comprise a phosphorescent material such that at least some of the light emitted by the fixture has a different wavelength than light emitted from the LED-populated area. For example, the LED-populated area may comprise LED sources of the type emitting light with wavelength of a blue color, and in order to achieve a customary white-color light, a so-called "remote phosphor" technique is used. The remote-phosphor technique typically utilizes blue LED(s). The phosphor that generates the white light is comprised on a lens or diffuser such as light-transmissive member 31 by coating or otherwise. In some embodiments, such "remote phosphor" technique delivers better efficacy than do phosphor-converted LEDs, since the phosphors are more efficient in conversion when operating at the lower phosphor temperatures made possible by such remote configurations. For example the LEDs can be blue LEDs where the blue light excites the phosphorescent material, such as yttrium aluminum garnet ("YAG"), to produce a secondary emission of light where the blue light and the secondary emission produce white light. In other embodiments, different color LEDs can be used together with individual white LEDs (blue LEDs plus phosphor) or with blue LEDs in a remote phosphor configuration where the light-transmissive element is coated and/or impregnated with the phosphorescent material.

Illustrative Low Profile LED Light Fixture for High Output, High Color Quality Light The embodiments shown in FIGS. 1, 6, 15-21, 24 and 25 illustrate another aspect of the present disclosure, namely, LED light fixture 10 may comprise a low-profile LED light fixture with advantages, including, e.g., its serving as a surface-mount canopy light.

In the embodiments shown in FIGS. 3 and 5, light fixture 10 comprises a base plate 200 with LED circuit board 60 secured to a front surface 26 thereof and with LED power-circuitry unit 40 secured with respect to front surface 26 in a position adjacent to circuit board 60. In the embodiments shown in FIGS. 1-3 the heat-dissipating surfaces 27 extend from front surface 26 of base plate 200 with LED circuit board 60 being in position adjacent to heat-dissipating surfaces 27. In the embodiments shown in FIGS. 23-25, base plate 200 has a substantially planar back surface 28. In the embodiments shown in FIGS. 3, 6 and 15-17, LED power-circuitry unit 40, LED circuit board 60, and heat-dissipating surfaces positioned entirely in front of base plate 200, with no portion of the light fixture other than electrical connections extending behind back surface 28.

In some embodiments, heat-dissipating surfaces 27 extend substantially orthogonally to front surface 26 of base plate 200. In the embodiments shown in FIGS. 5 and 22, the base plate is rectangular and heat-dissipating surfaces 27 are in two regions 270 positioned beside LED circuit board 60 only on two opposite sides thereof.

In the embodiments shown in FIGS. 1, 2 and 22, cover 30 extends over LED power-circuitry unit 40 while leaving uncovered heat-dissipating surfaces 27. Cover 30 defines light-emitting opening 34 over LED circuit board 60.

In the embodiments shown in FIG. 5, base plate 200 comprises a rectangular base plate with heat-dissipating surfaces 27 being in two regions 270 positioned beside LED circuit board 60 only on two opposite lateral sides thereof. Regions 270 of heat-dissipating surfaces 27 are on two of the four lateral sides of base plate 200. As further shown in FIG. 5, in some embodiments, base plate 200 defines a pair of cavities 29 along front surface 26 thereof, one on either side of LED circuit board 60 in positions along the other two opposite lateral sides of base plate 200. In the embodiment shown in FIG. 5, LED power-circuitry unit 40 is positioned within one of two cavities 29. Light-fixture control circuitry 19 is shown positioned within the other of two cavities 29.

In some embodiments, control circuitry 19, sensor 18 and/or communication circuitry may be positioned within cavities 29.

In the embodiments shown in FIGS. 15-21, 24 and 25, the cross-section of fixture 10 orthogonal to base plate 200 is such that the aspect ratio of such cross-section is greater than about 6. As used herein, the term "aspect ratio" means the ratio of a plan-view cross-dimension 16 of the base plate to the cross-dimension 17 of the fixture between back surface 28 of base plate 200 and a forwardmost surface 36 of cover 30. In some embodiments, the aspect ratio may be greater than about 7.5.

In the embodiments shown in FIGS. 15 and 16, thickness 17 of the cross-section between back surface 28 of base plate 200 and a forwardmost surface 36 of cover 30 may be no more than about 3 inches. In other embodiments, such as the fixture shown in FIG. 17.

Figure 21:
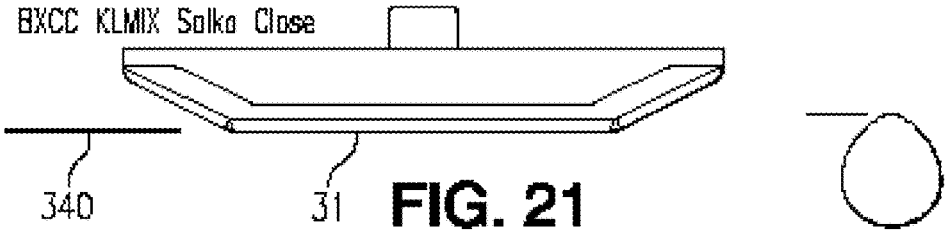
FIG. 21 is yet another side elevation of an alternative embodiment according to the present disclosure.
Figure 26:
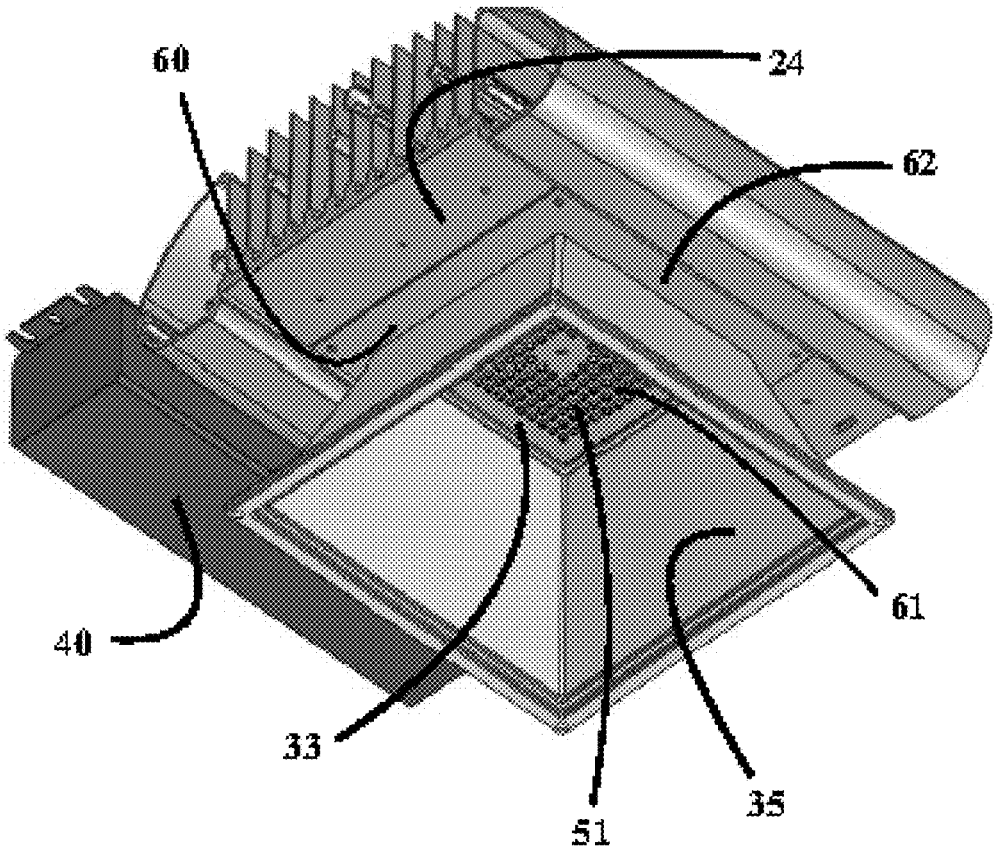
FIG. 26 is a partially-assembled perspective view of a yet another embodiment of an LED light fixture according to the present disclosure.
Figure 27:
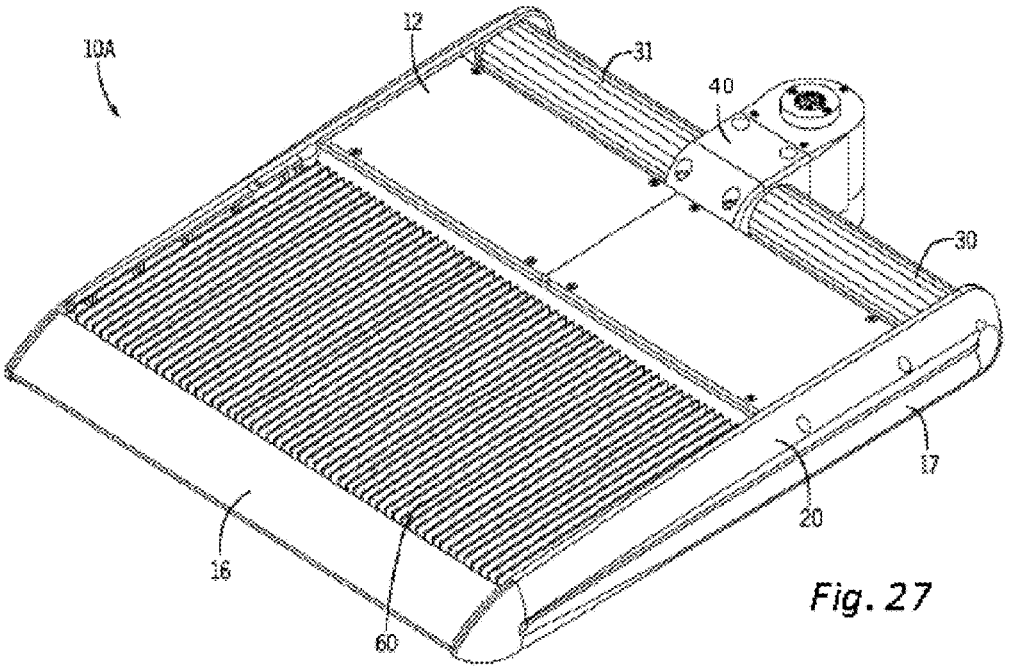
FIG. 27 is a top perspective view of another embodiment of an LED light fixture according to the present disclosure.

In the embodiment shown in FIG. 21, light-emitting opening 34 in cover 30 defines a plane 340. In the embodiment shown in FIG. 21, lens 31 is substantially planar, in plane 340. In the embodiments shown in FIGS. 19 and 20 the lens comprises a drop-out lens 31A and 31B, which extends beyond plane 340 of opening 34. In some embodiments, this facilitates a portion of the light being directed laterally, which is useful for curb-side appeal.

In the embodiment shown in FIGS. 15-17, the LED light fixture is shown as a surface-mount LED light fixture for mounting on a surface 1 of a structure such that, when the fixture is installed, back surface 28 of base plate 200 is substantially against structure surface 1.

Figure 18:
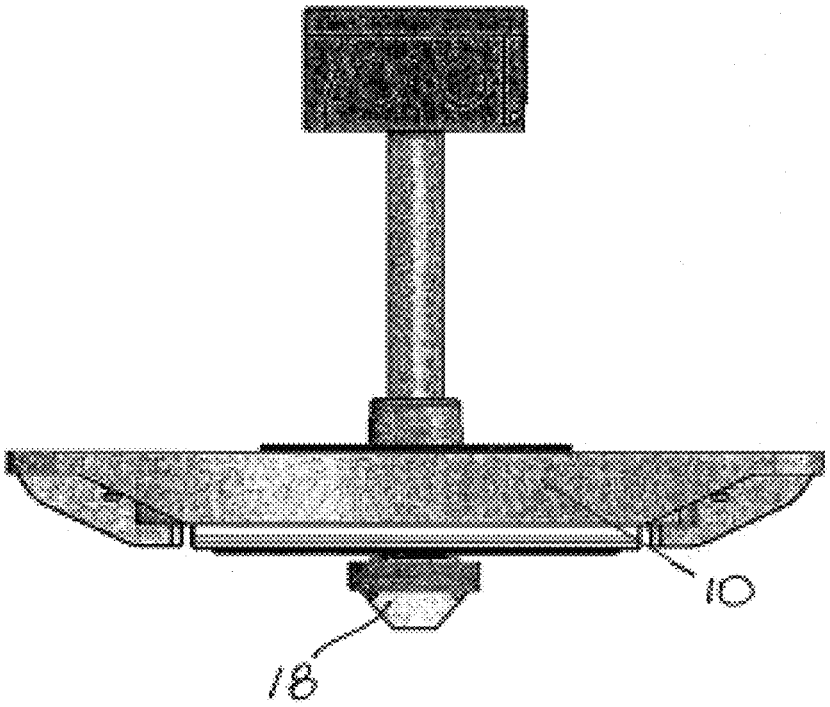
FIG. 18 is a side elevation of a further embodiment of a light fixture according to the present disclosure in the form of a pendant light fixture.
Figure 19:
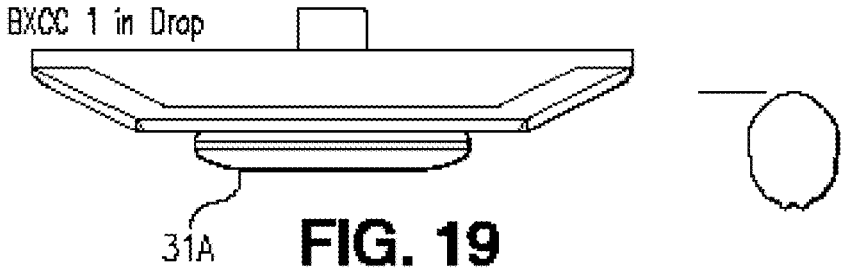
FIG. 19 is a side elevation of an alternative embodiment according to the present disclosure.
Figure 20:
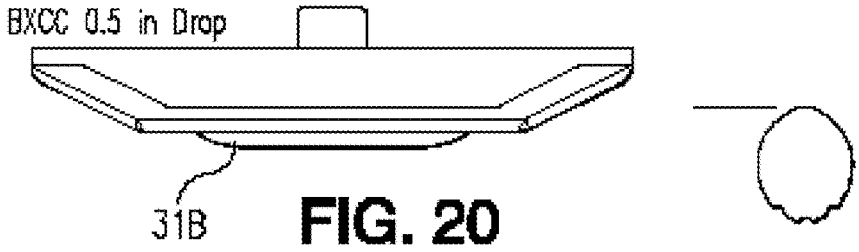
FIG. 20 is another side elevation of an alternative embodiment according to the present disclosure.

In the embodiment shown in FIG. 18, the LED fixture comprises a pendant light. The embodiments shown in FIGS. 1, 18, 24, and 25 also comprise an example of a sensor 18 at the exterior of enclosure 11 for control of the fixture. Sensor 18 is shown to extend forwardly from forwardmost surface 36 of cover 30. In some embodiments, the sensor 18 may have a non-metallic casing of various shapes, including a substantially flat configuration. In some embodiments, control of the fixture may require receipt of a wireless signal. In such embodiments, an antenna for receiving such wireless signal may be disposed within the non-metallic casing of the sensor and outside enclosure 11.

Illustrative System for High Output, High Color Quality Light

FIGS. 27-37 illustrate embodiments of LED light fixtures 10A and 10B according to the present disclosure. The embodiments shown in FIGS. 27-30 show that light fixture 10 comprises an LED assembly 60 which is open to air/water flow thereover. In the embodiments shown in FIGS. 28 and 30, LED assembly 60 has a plurality of LED-array modules 61 each secured to an individual LED heat sink 62 which has first and second heat-sink ends 63 and 64.

Figure 28:
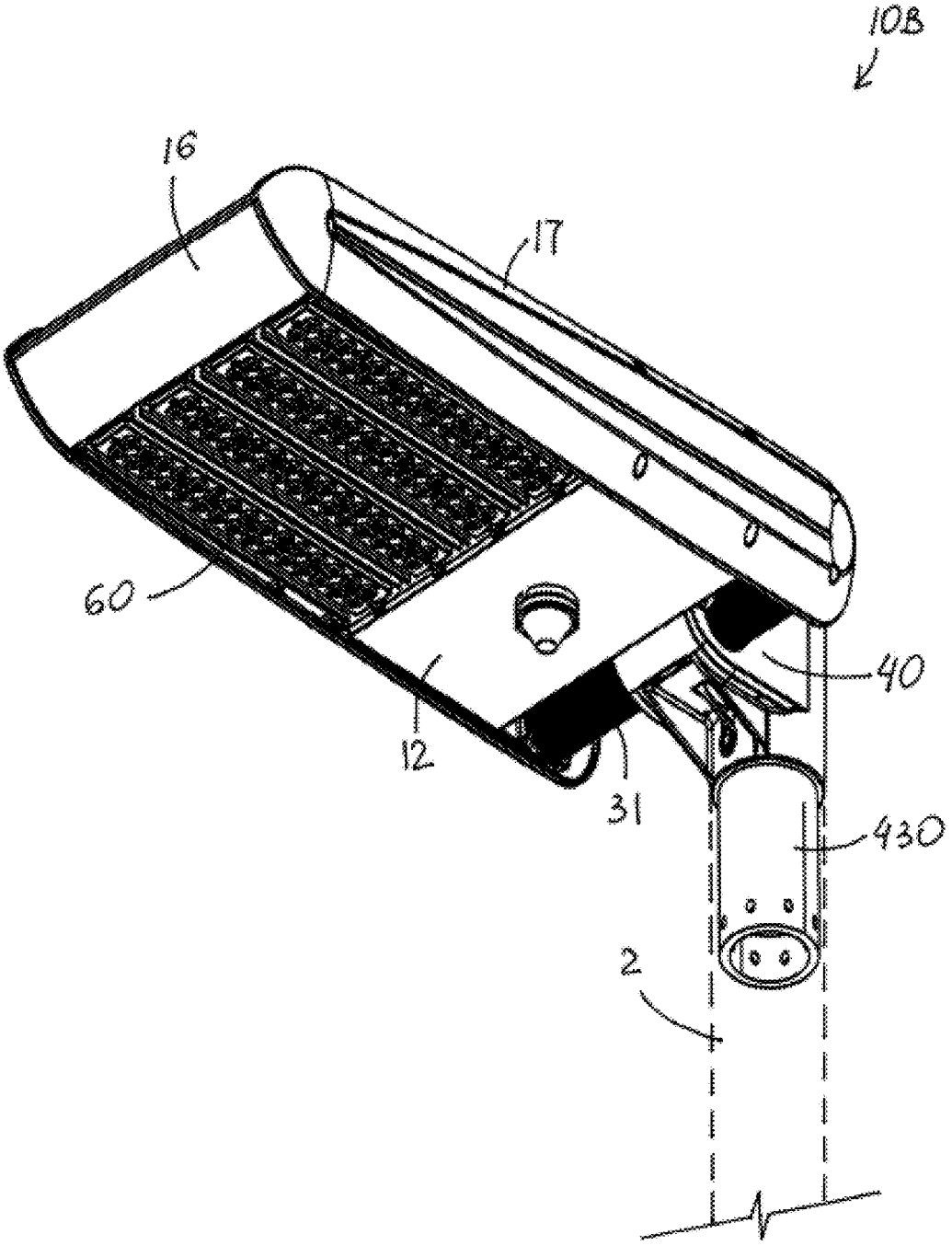
FIG. 28 is a bottom perspective view of another embodiment of an LED light fixture according to the present disclosure.
Figure 30:
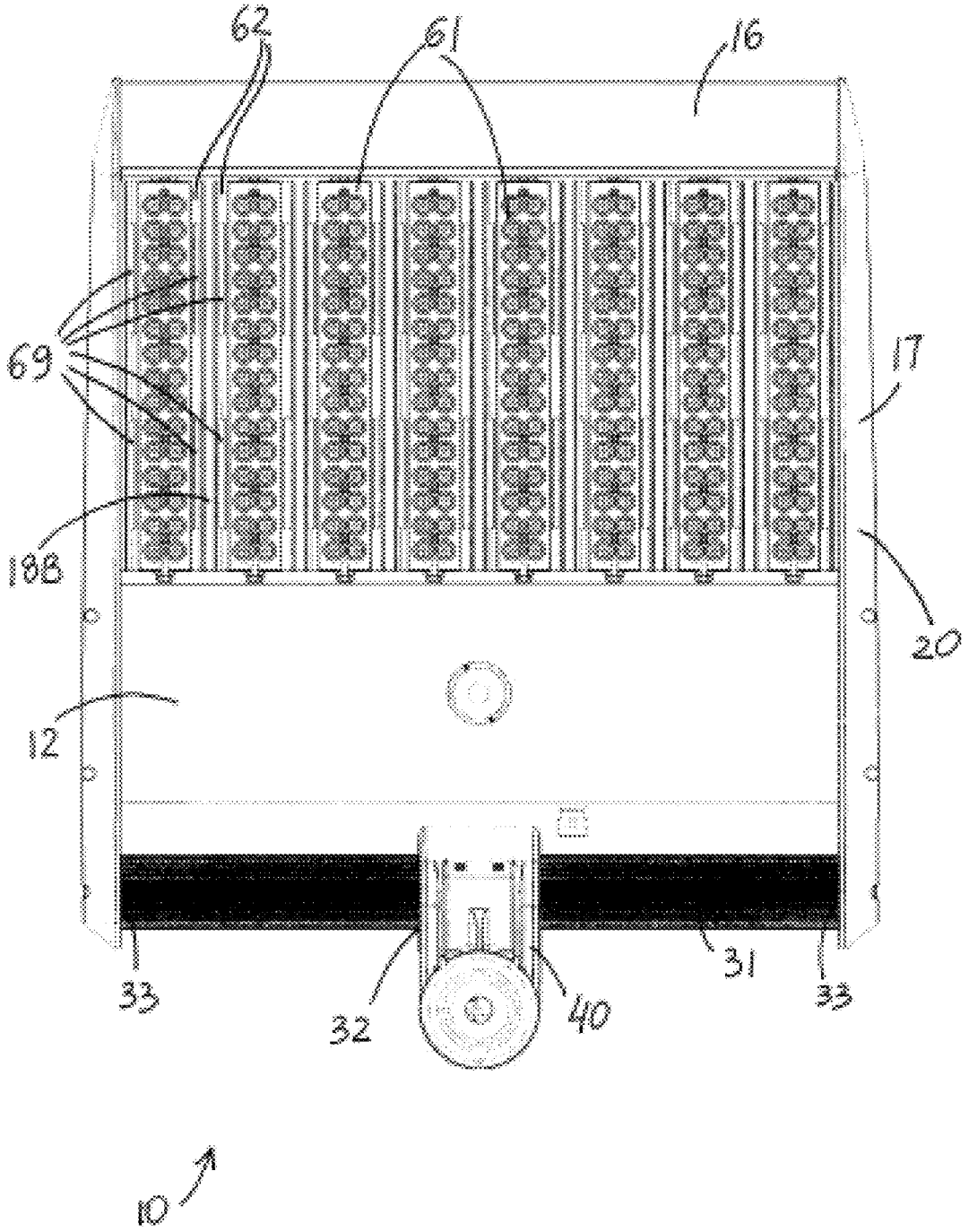
FIG. 30 is a bottom plan view of the LED light fixture of FIG. 27.
Figure 39:
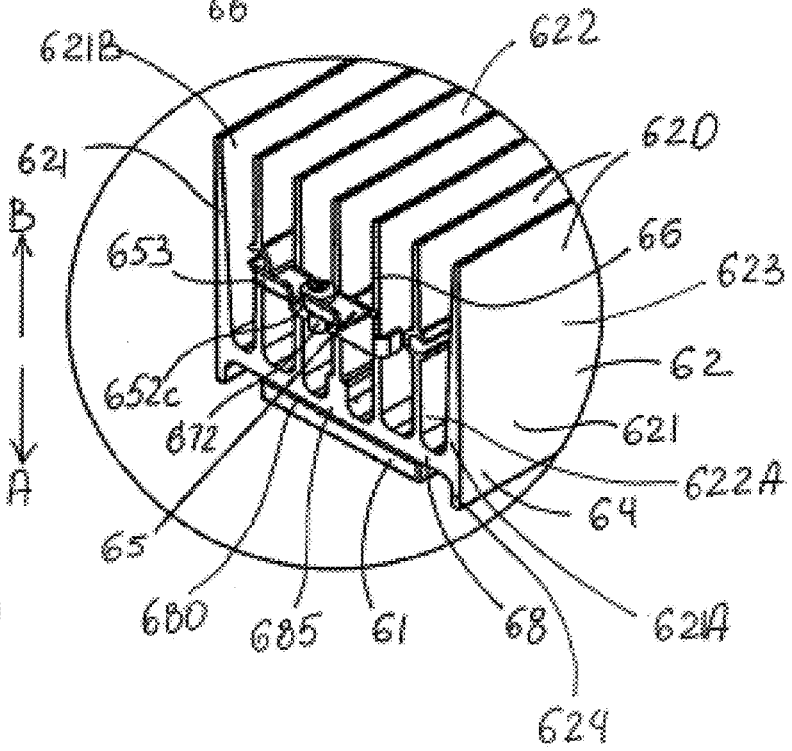
FIG. 39 is a fragmentary perspective view of one LED heat sink illustrating a mounting clip according to one embodiment.

In the embodiments shown in FIGS. 28 and 30, LED light fixture 10 comprises a plurality of heat-sink-mounted LED-array modules 61. Each module 61 engages an LED-adjacent surface 680 of heat-sink base 68 for transfer of heat from module 61. The heat-sinks comprise fins 620 which extend away from modules 61, as shown in FIG. 39. Each heat-sink base 68 is wider than module 61 thereon such that heat-sink base 68 comprises a beyond-module portion 681.

Figure 33:
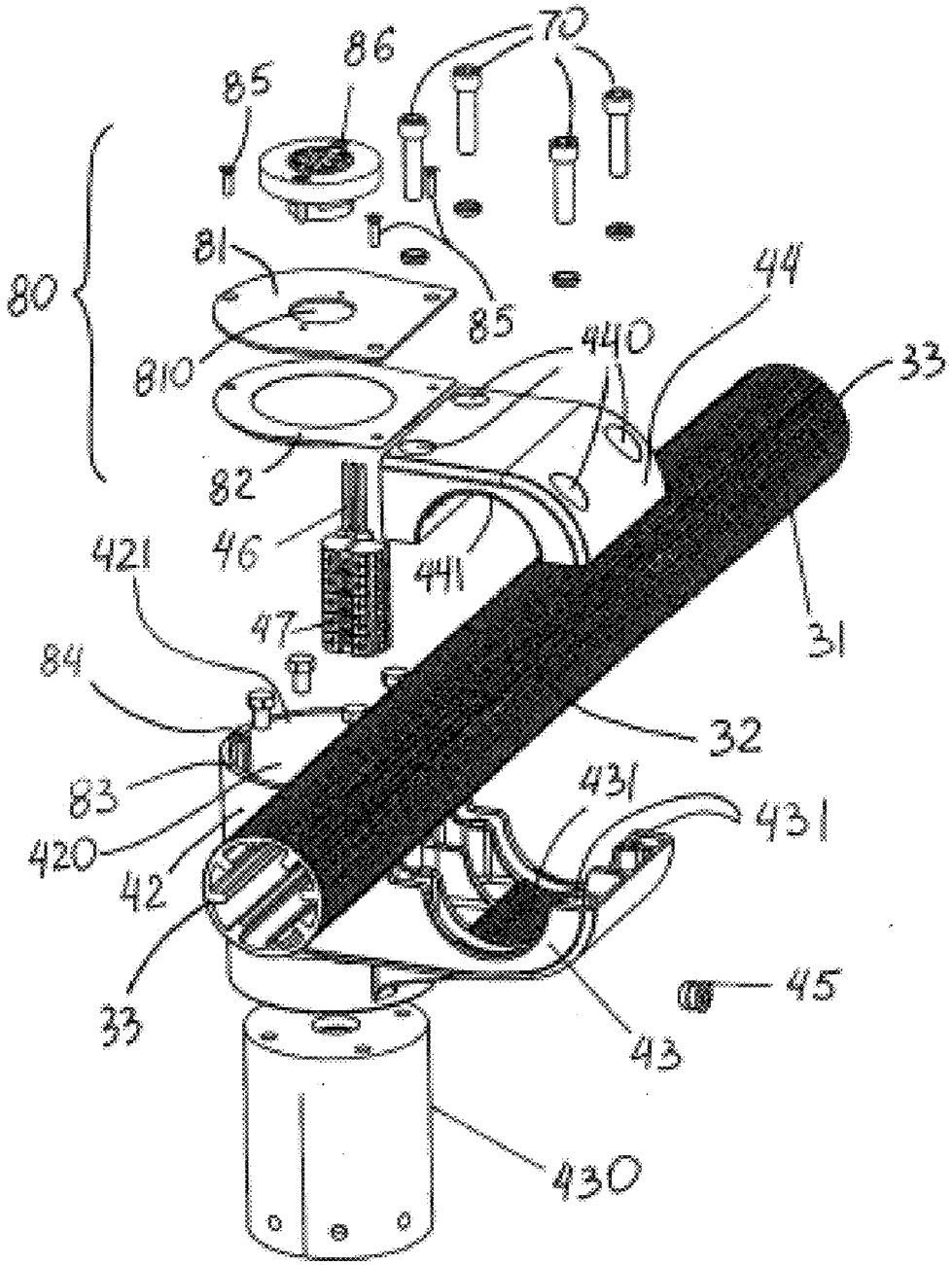
FIG. 33 is an exploded perspective view of the mounting assembly according to one embodiment.

In the embodiment shown in FIG. 33 each heat sink 62 has venting apertures 69 formed through heat-sink base 68 to provide cool-air ingress to and along heat-dissipating fins 620 by upward flow of heated air therefrom. FIGS. 30 and 33 also show venting apertures 69 through beyond-module portion 681 of heat-sink base 68.

Figure 43:
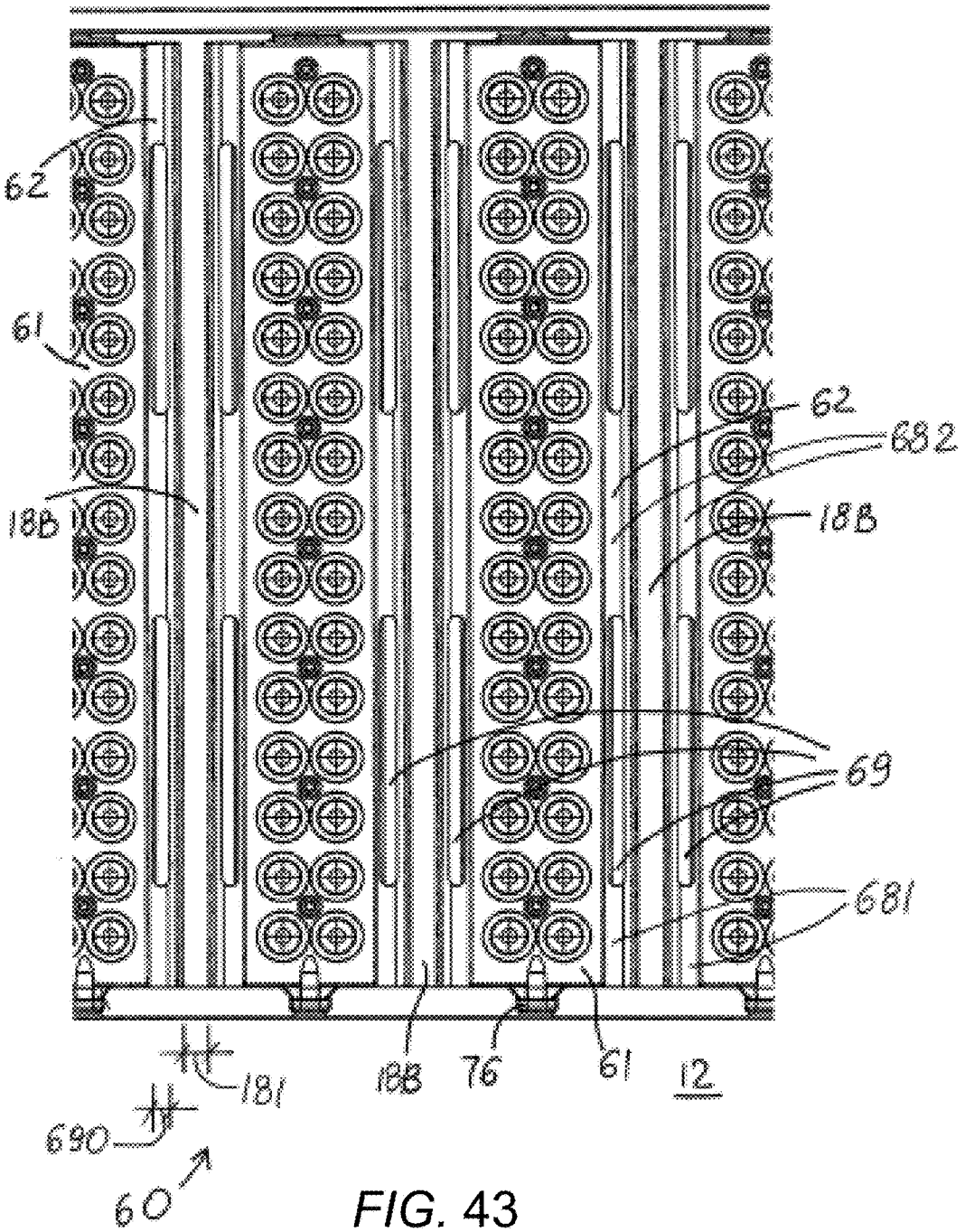
FIG. 43 is a fragmentary bottom plan view of the LED assembly shown in FIG. 30 and illustrating air-flow channels facilitating heat dissipation from LEDs.

In some embodiments, the heat-dissipating surfaces comprise the surfaces of edge-adjacent fins 621 extending transversely from beyond-module portion 681 of heat-sink base 68 at a position beyond venting apertures 69 therealong. As shown in FIG. 43, venting apertures 69 along beyond-module portion 681 are spaced along heat sink 62, which may be an extrusion. Beyond-module portion 681 of heat-sink base 68 has a non-apertured portion 682 extending thereacross to allow heat flow across beyond-module portion 681 toward edge-adjacent fin 621 extending therefrom.

In the embodiments shown in FIGS. 30 and 43, two venting apertures 69 along beyond-module portion 681 extending along heat sink 62 in spaced substantially end-to-end relationship. In such an embodiment, non-apertured portion 682 comprises a non-apertured portion which is between two elongated apertures 69 and is located substantially centrally along the length of heat sink 62. The combined length of apertures 69 along beyond-module portion 681 constitutes a majority of the length of heat sink 62, as shown in FIG. 43.

In some embodiments, heat-sink base 68 comprises a module-engaging portion 685 between beyond-module portions 681. Heat-sink heat-dissipating surfaces comprise the surfaces of a plurality of middle fins 622 extending transversely from module-engaging portion 685 of heat-sink base 68, as shown in FIG. 39.

In the embodiment shown in FIG. 39, edge-adjacent fins 621 extending from each one of beyond-module portions 681 of heat-sink base 68 are each a single edge-adjacent fin. Such two edge-adjacent fins 621 form opposite lateral sides 623 of heat sink 62. Heat-sink base 68 has a thickness at positions adjacent to edge-adjacent fins 621 that is greater than the thickness of base 68 at positions adjacent to some of middle fins 622, thereby to facilitate conduction of heat laterally away from module 61.

In the embodiment shown in FIG. 39, edge-adjacent fins 621 have a base-adjacent proximal portion 621A integrally joined to heat-sink base 68 and a distal edge 621B remote therefrom. Proximal portions 621A of edge-adjacent fins 621 are thicker than proximal portions 622A of at least some of middle fins 622, thereby to facilitate conduction of heat away from module 61. Fins 621 and 622 extend away from heat-sink base 68 in a first direction B. Edge-adjacent fins 621 also extend from heat-sink base 68 in a second direction A opposite to first direction B to provide additional heat-dissipating surface 624. Edge-adjacent fins 621 and heat-sink base 68 are shown to form an H-shaped structure shown in FIG. 39.

Figure 29:
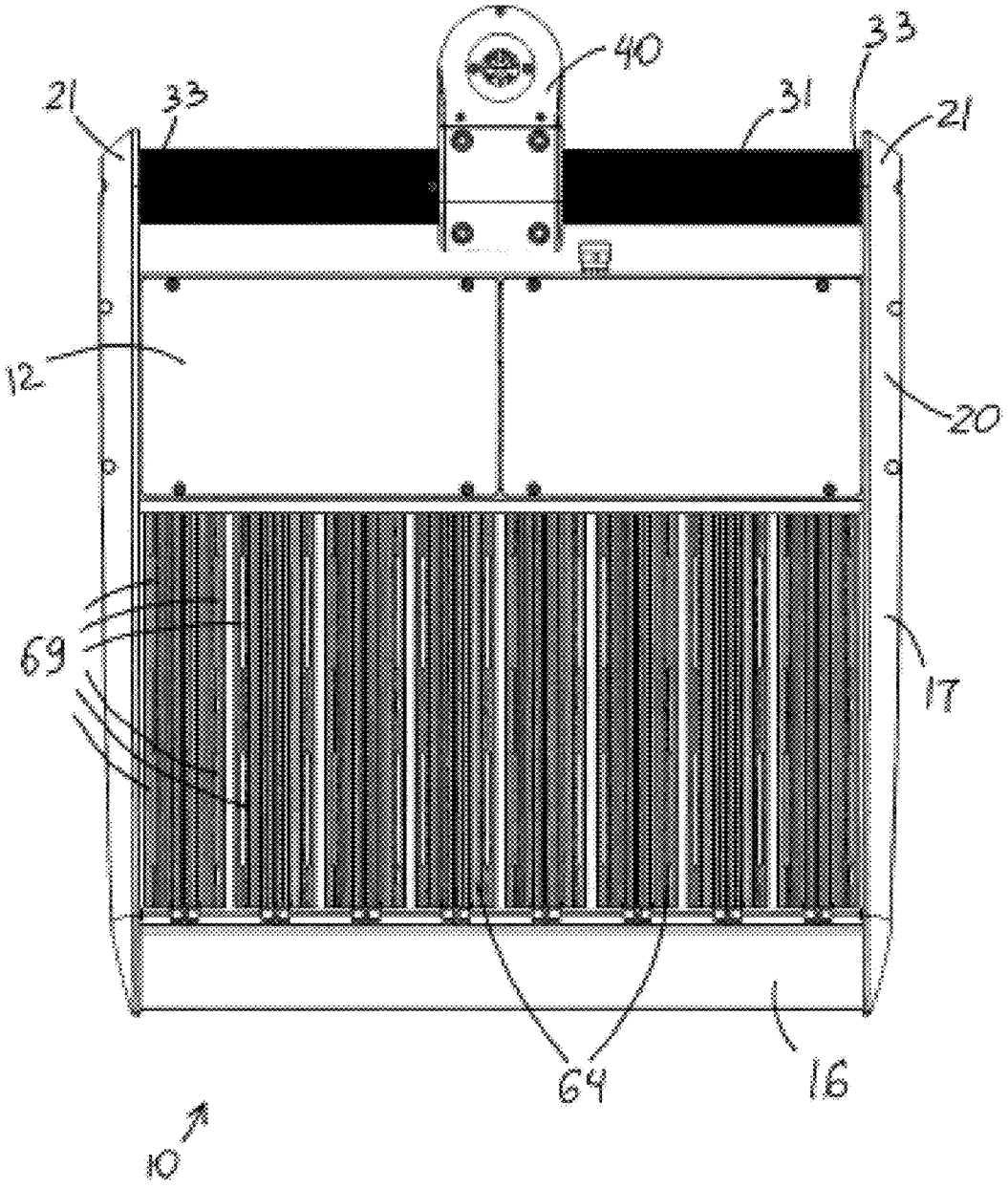
FIG. 29 is a top plan view of the LED light fixture of FIG. 27.
Figure 44:
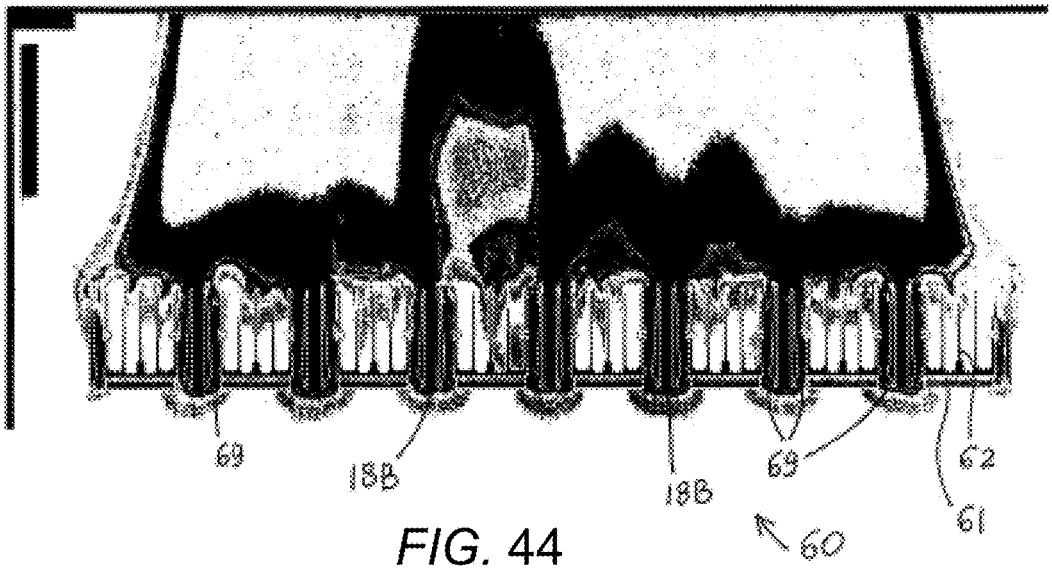
FIG. 44 is a fragmentary sectional view across the LED assembly illustrating simulated air-flow velocity through the channels according to one embodiment.

In the embodiments shown in FIGS. 29, 30, and 43 fixture 10 also has air gaps 18B defined between adjacent pairs of heat sinks 62 to provide heat removal along the entire length of each heat sink 62 by cool air drawn from below LED assembly 60 through air gaps 18B by rising heated air. FIGS. 29, 30, 43, and 44 show the plurality of heat sinks 62 beside one another in positions such that beyond-module portion 681 of each of heat sinks 62 is adjacent to but spaced from beyond-module portion 681 of another of heat sinks 62. As illustrated in FIG. 44, such arrangement further facilitates flow of cool air to the heat-dissipating surfaces of heat sinks 62 and thermal isolation of the heat sinks 62 from one another.

Figure 40:
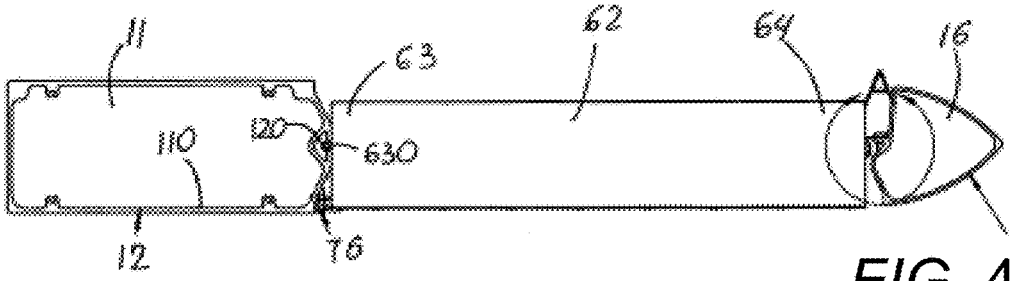
FIG. 40 is a sectional side view of the mounting of LED heat sinks according to one embodiment.
Figure 41:
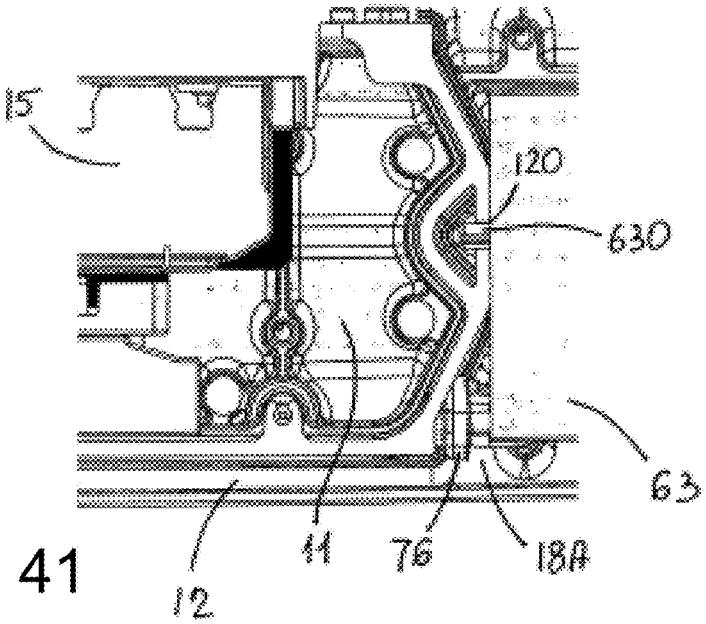
FIG. 41 is a fragmentary sectional side view of the mounting engagement of the other end of the LED heat sinks according to one embodiment.

As shown in FIG. 43, in some embodiments, the spacing 181 between heat sinks 62 is at least as great as widths 690 of venting apertures 69 in beyond-module portions 681 of heat-sink bases 68. In some embodiments, light fixture 10 comprises a housing 23 with LED assembly 60 secured with respect thereto such that LED assembly 60 and housing 23 form a venting gap 18A therebetween to provide air ingress along heat-sink base 68 to the heat-dissipating surfaces. In the embodiments shown in FIGS. 37 and 40, air gaps 18A are along first and second heat sink ends 63 and 64 permitting air/water-flow to and from heat sinks 62 through heat sink ends 63 and 64.

FIG. 44 shows simulated velocity of air flow along LED assembly 60 according to one embodiment. The darker areas between heat sinks 62 and through venting apertures 69 illustrates increased air flow which facilitates heat removal from LED assembly 60. Modules 61 are shown as substantially rectangular elongated LED-array modules with a plurality of LEDs positioned on a circuit board which is secured to the heat sink.

Additional examples of LED-array modules are disclosed in co-pending U.S. patent application Ser. No. 11/774,422, *now U.S. Pat. No. 7,938,558,* the contents of which are incorporated herein by reference. In fixtures utilizing a plurality of emitters, a plurality of LEDs or LED arrays may be disposed directly on a common submount in spaced relationship between the LEDs or LED arrays. These types of LED emitters are sometimes referred to as chip-on-board LEDs.

The above-described thermal management of the LED light fixture including venting gaps 18A, 18B and through heat sink venting apertures 69 allows maximization of the power density of LEDs on the printed circuit board. In some embodiments, this may be maximized to 4.9 W per square inch or greater. This is in contrast to prior fixtures, which may be limited to less than 3.2 W per square inch. In some embodiments, the LED junction temperature and resulting lifetime of the LEDs is improved even at the higher power density which results in a 50,000 hour lumen maintenance factor of a minimum of 86% at 15° C.

Furthermore, the thermal management of the LED light fixture allows each heat sink to function in thermal isolation from neighboring heat sinks which minimizes thermal compromise with increasing the number of heat sinks in the modular LED light fixture. In some embodiments, a number lumens delivered per unit area of the modular LED assembly (sometimes referred to as "light engine") is increased from previously possible 95 lumens per square inch to over 162 lumens per square inch. This is allowed by the thermal management of the LED light fixture. This is in contrast with prior modular fixtures in which due to the thermal interference between adjacent heat sinks, an increase the number of light engine heat sinks resulted in a decrease in lumen flux to as low as 56 lumens per square inch.

In the embodiments shown in FIGS. 27-30, LED assembly 60 is bordered by driver housing 12 and a nose structure 16 each along one of opposite heat-sink ends 63 and 64, and that driver housing 12 and nose structure 16 are secured with respect to one another by a frame portion 17 extending alongside LED assembly 60.

Figure 12:
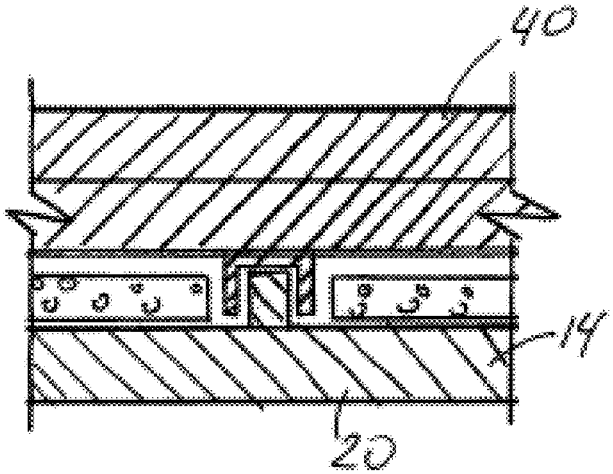
FIG. 12 is yet another schematic illustration of an alternative embodiment for positioning the LED power-circuitry unit with respect to the base.
Figure 38:
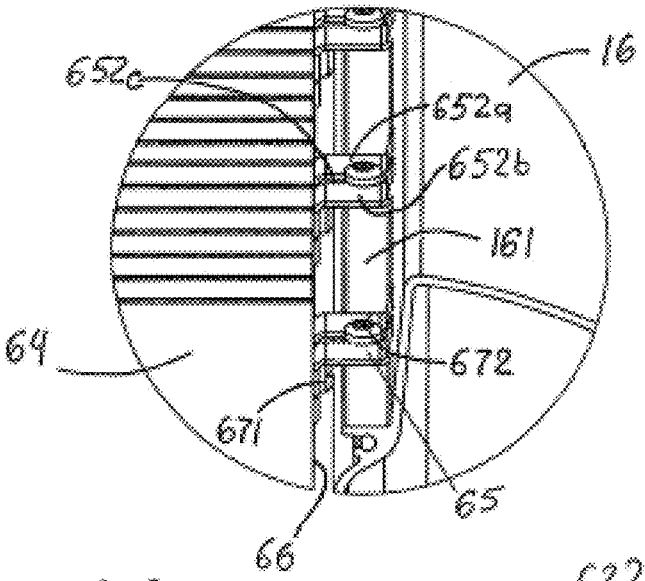
FIG. 38 is a fragmentary perspective view of the mounting engagement of one end of the LED heat sinks according to one embodiment.
Figure 42:
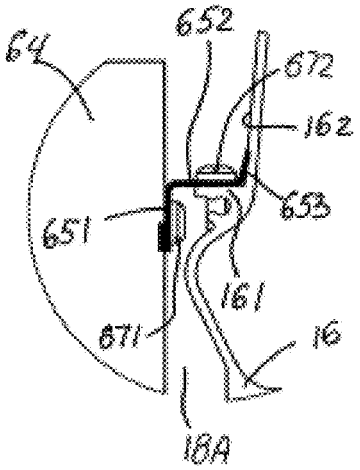
FIG. 42 is a fragmentary sectional side view of the mounting clip holding the end of the LED heat sink according to one embodiment.

FIGS. 37-42 illustrate an embodiment of the engagement of first heat-sink end 63 with driver housing 12 and a securement of second heat-sink end 64 to nose structure 16. In the embodiments shown in FIGS. 40 and 41 the first heat-sink end 63 comprises a pin 630 extending therefrom and inserted into a slot 120 formed along driver housing 12. FIGS. 37-40 and 42 show second heat-sink end 64 secured with respect to nose structure 16 with a spring clip 65. FIGS. 38, 39 and 42 show clip 65 formed from a sheet metal bent into first, second and third clip portions 651, 652 and 653. First clip portion 651 is attached to a substantially vertical fin edge 66 of second heat-sink end 64 with a fastener 671. Second clip portion 652 is substantially orthogonal to first clip portion 651 and has two subportions 652a and 652b with an opening 652c therebetween. Second clip portion 652 is attached to a substantially horizontal shelf 161 formed along nose structure 16 with a fastener 672 extending through opening 652c and pressing second clip subportions 652a and 652b against shelf 161. Third clip portion 653 extends from second clip portion 652 toward a surface 162 of nose structure 16 and extending transversely to shelf 161. Third clip portion 653 presses against surface 162 and by its spring action pushes pin 630 of first heat-sink end 63 into slot 102 for secure holding of heat sink 62 within fixture 10 and provides a positive seal on a light-module grommet 760. FIGS. 11 and 12 further show that each of the plurality of heat sinks 62 is individually secured with respect to driver housing 12 and nose structure 16 in the above-described manner.

In some embodiments, light fixture 10 comprises a main body portion 20 and a mounting assembly 30 for adjustable securement to a static structure. An example static structure is shown in FIG. 28 as a pole 12 atop which fixture 10 may be installed. It should be understood, of course, that the light fixture 10 may be mounted with respect to other static structures such as walls, ceilings, along-ground mounts, free-standing advertising frames and the like.

Mounting assembly 30 illustrated in FIGS. 27-36 comprises a bar 31 having a gripping region 32 and a gripper 40 attachable to pole 12. As shown in FIGS. 32-33, gripper 40 grips gripping region 32 such that light fixture 10 is held in a selected one of a plurality of orientations. In the illustrated embodiment, bar 31 has first and second opposite ends 33 secured with respect to main body portion 20 of light fixture 10. In the embodiments shown in FIGS. 29 and 30 gripping region 32 is positioned between first and second ends 33 and spaced from main body portion 20.

Figure 36:
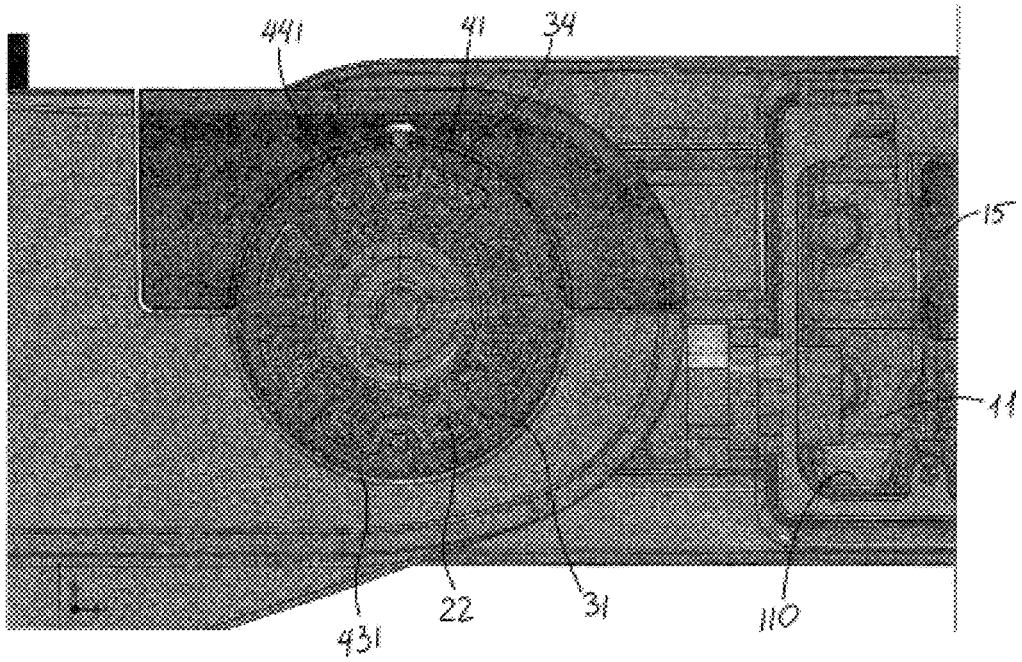
FIG. 36 is a fragmentary sectional view showing the bar-support portion inside the bar interior and illustrating their engagement preventing relative rotation according to one embodiment.
Figure 37:
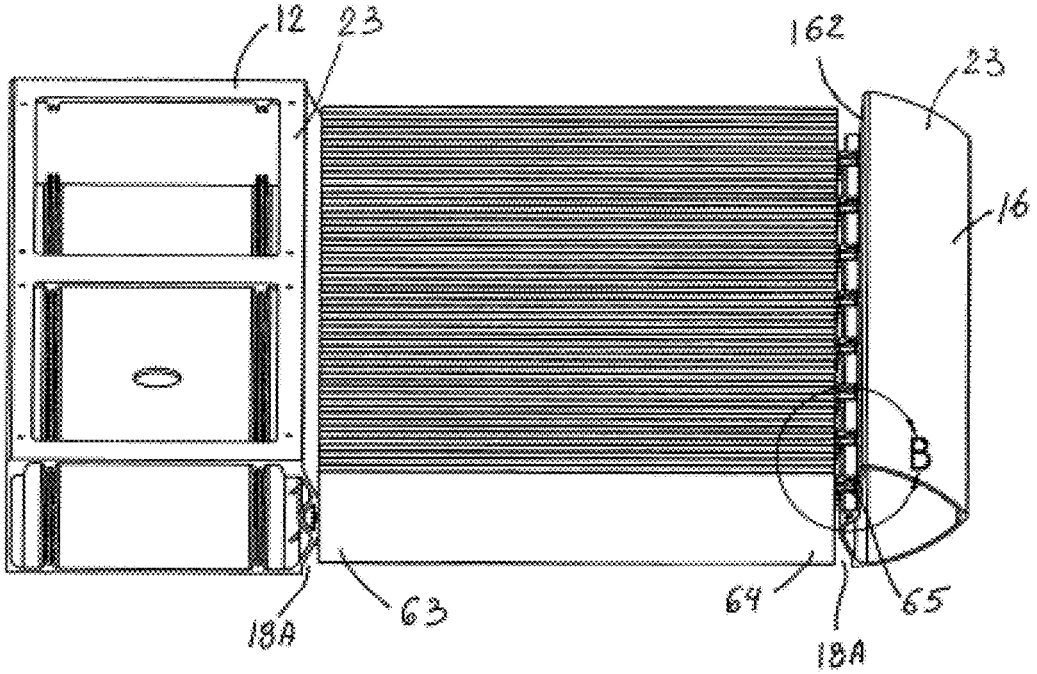
FIG. 37 is a fragmentary sectional perspective view illustrating mounting of LED heat sinks of the LED assembly according to one embodiment.

In FIGS. 27-31, a pair of bar supports 21 are shown projecting from main body portion 20. FIGS. 29 and 30 illustrate that, in some embodiments, ends 33 of bar 31 are each supported by one of the bar supports 21 such that gripping region 32 is along and spaced from main body portion 20. FIGS. 31 and 34-36 show each bar support 21 including a bar-support portion 22 engaged with end 33 of bar 31, in some embodiments. As shown in FIGS. 31-34, in some embodiments, bar 31 is hollow. FIG. 36 illustrates bar-support portion 22 inserted into end 33 of bar 31. As further shown in FIGS. 34-36, bar interior 36 and bar-support portion 22 are each shaped to prevent relative rotation.

Figure 32A:
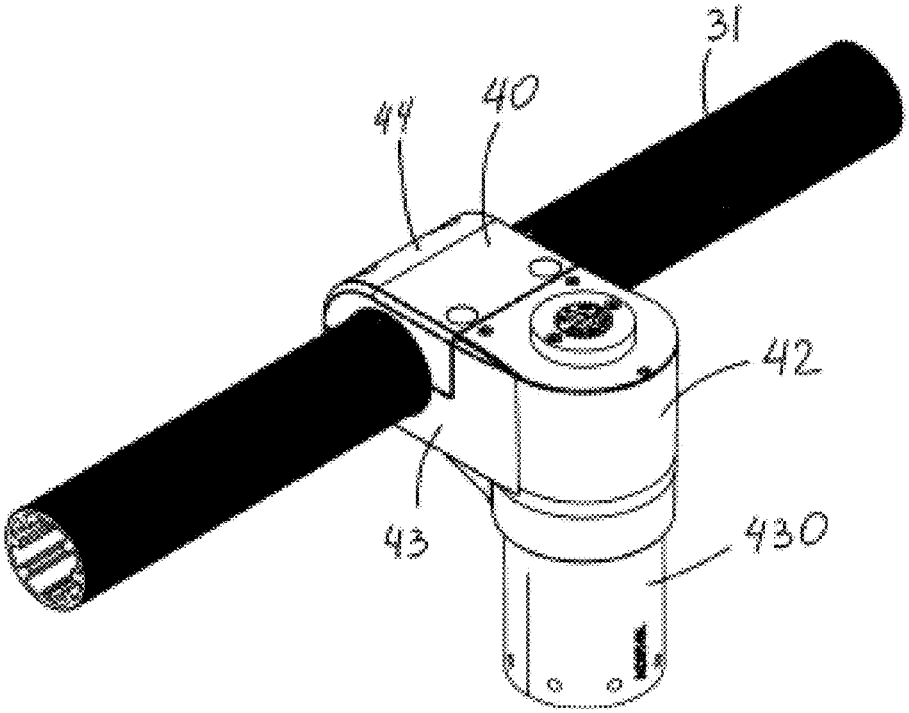
FIG. 32A is a top perspective view of a mounting assembly according to one embodiment of the present disclosure.
Figure 32B:
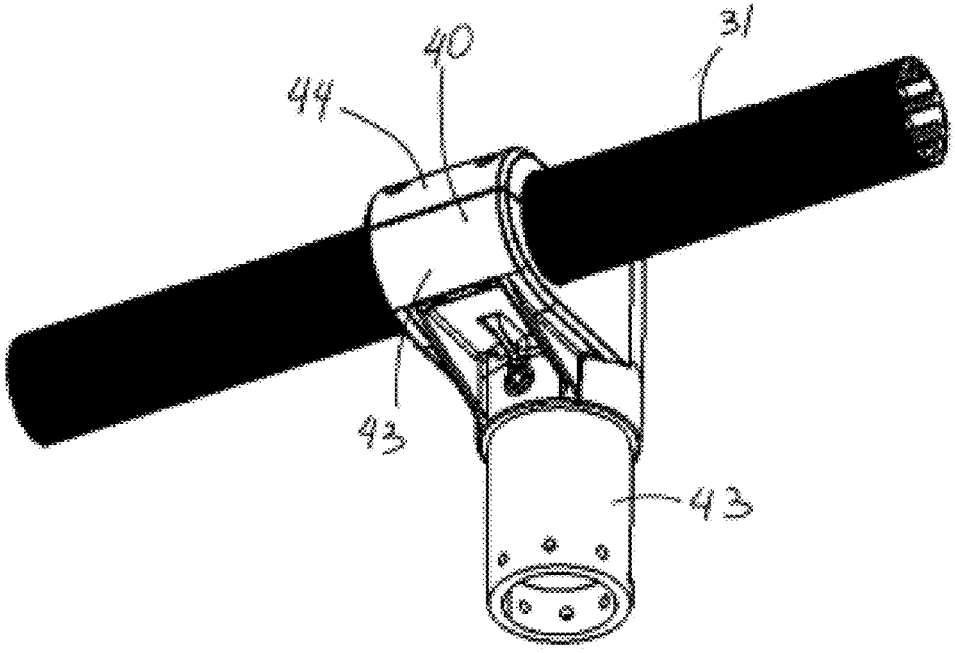
FIG. 32B is a bottom perspective view of the mounting assembly according to one embodiment.
Figure 34:
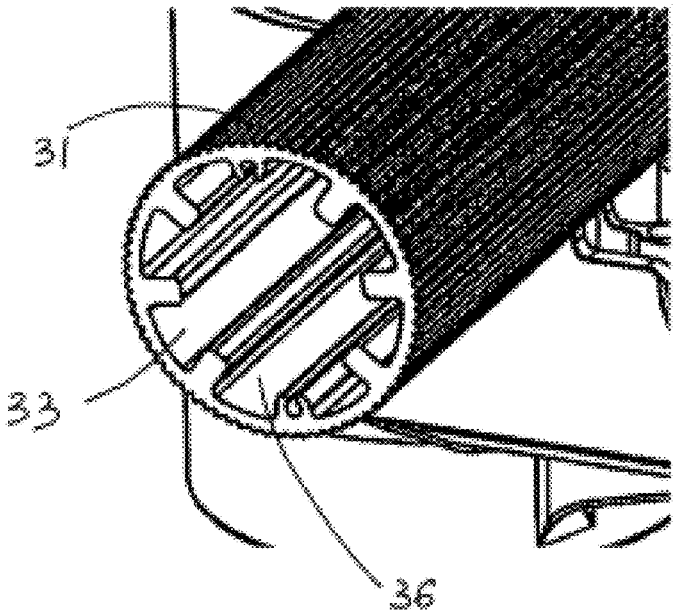
FIG. 34 is a fragmentary view of a bar and illustrating the bar interior according to one embodiment.
Figure 35:
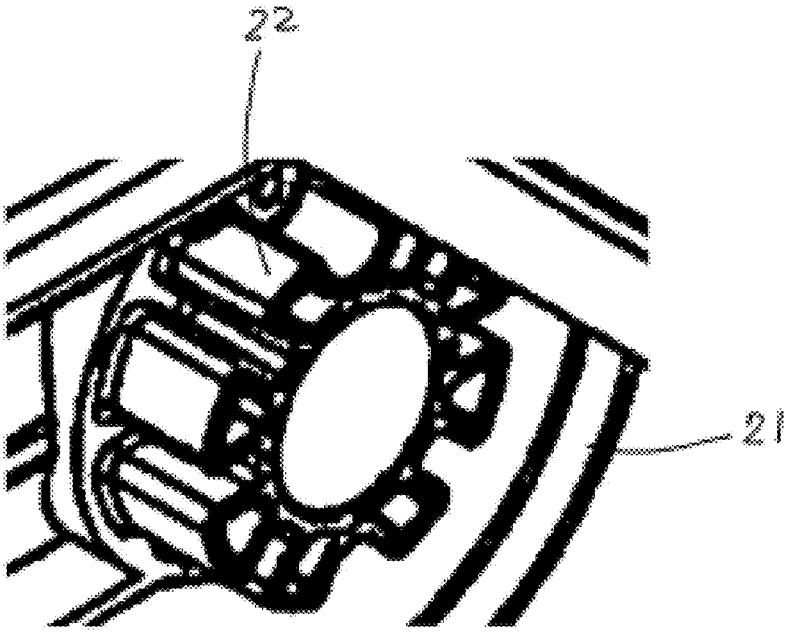
FIG. 35 is a fragmentary view of a bar-support portion shaped for insertion into the bar interior according to one embodiment.

As shown in FIGS. 32-34, in some embodiments, bar 31 is a substantially cylindrical extruded piece. The embodiments shown in FIGS. 32A and 32B illustrate gripper 40 including a first bar-engaging portion 43 and a second bar-engaging portion 44 facing one another with bar 31 sandwiched therebetween. FIG. 33 shows an embodiment in which each of bar-engaging portions 43 and 44 has a semi-cylindrical bar-engaging surface 431 and 441, respectively. Semi-cylindrical bar-engaging portions 43 and 44 together encircle an engaging bar 31.

In some embodiments, bar-engaging surfaces 431 and 441 of gripper 40 and gripping region 32 of bar 31 are configured for a finite number of the orientations. As shown in FIGS. 33 and 36, in some embodiments, gripping region 32 of bar 31 has parallel inter-engaged flutes and grooves 34 which are complementary to flutes and grooves 41 along bar-engaging surfaces 431 and 441 of gripper 40. In some embodiments, these complementary flutes and grooves 34 and 41 also serve as anti-rotational interlocking features between bar 31 and gripper 40 which when interlocked hold light fixture 10 in a selected one of the finite plurality of orientations.

Figure 49:
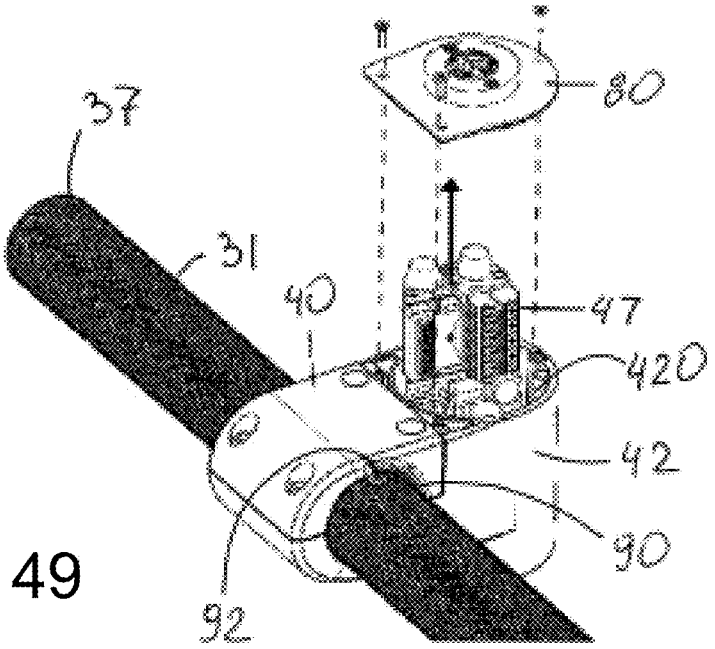
FIG. 49 is a perspective view of the mounting assembly of the light fixture of FIG. 47 with removed cover assembly and showing a terminal block being inserted into a pole-connector enclosure according to one embodiment.
Figure 50:
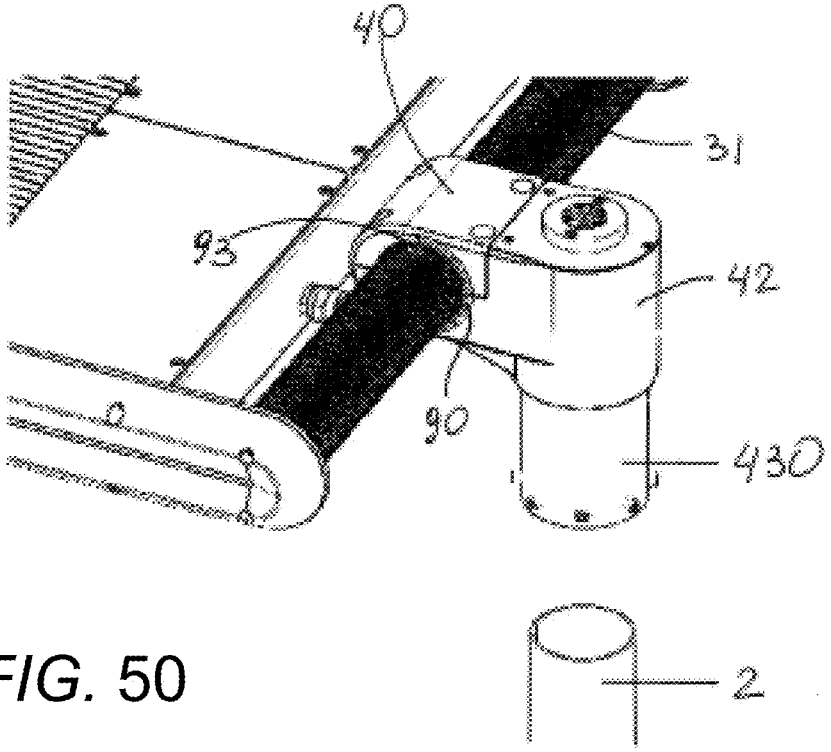
FIG. 50 is a fragmentary perspective view of the LED light fixture in FIG. 47 in a position for installation atop a round tenon according to one embodiment.
Figure 51:
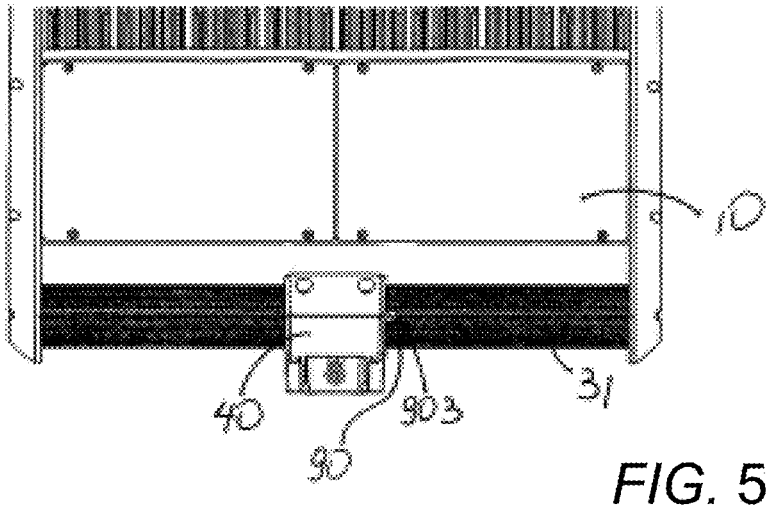
FIG. 51 is a fragmentary top plan view of the LED light fixture of FIG. 47 according to one embodiment.

The embodiments shown in FIGS. 47-52 illustrate mounting assembly 30 including a guide which indicates the angle for each of the orientations of light fixture 10 with respect to the static structure. These figures show the guide in the form of a bracket 90 which may be removably coupled to bar 31. The embodiments shown in FIGS. 51 and 52 illustrate positions 901, 902, 903 and 904 along the bar at which bracket 90 may be secured. FIG. 52 shows these positions in the form of apertures defined by bar 31. In the embodiments shown in FIGS. 51 and 52 the bracket 90 comprises a flange 92 for each of the apertures. Flange 92 defines a hole aligned with the corresponding aperture and receives a fastener therethrough for securing bracket 90 to bar 31. In the embodiments shown in FIGS. 51 and 52, bracket 90 is secured at position 903. In FIGS. 49 and 50, bracket 90 is secured at position 902. As shown in FIGS. 47-50, bracket 90 is shaped to follow outer shape 37 of bar 31 and comprises angle markings 91. In the embodiment shown in FIG. 48, the gripper 40 has a reference line 48 which points to a particular one of angle markings 91 indicating the angle of light fixture 10 with respect to the static structure such as round tenon 2 or square pole 2A.

FIGS. 28 and 33 show first bar-engaging portion 43 including a pole-engaging portion 430 configured for securement with respect to pole 12. Second bar-engagement portion 44 is shown configured for attachment to first bar-engagement portion 43 with bar 31 sandwiched therebetween. FIG. 33 shows that, in some embodiments, first bar-engaging portion 43 defines mounting cavities 431 accepting fasteners 70 which extend through apertures 440 formed through second bar-engagement portion 44.

Figure 31:
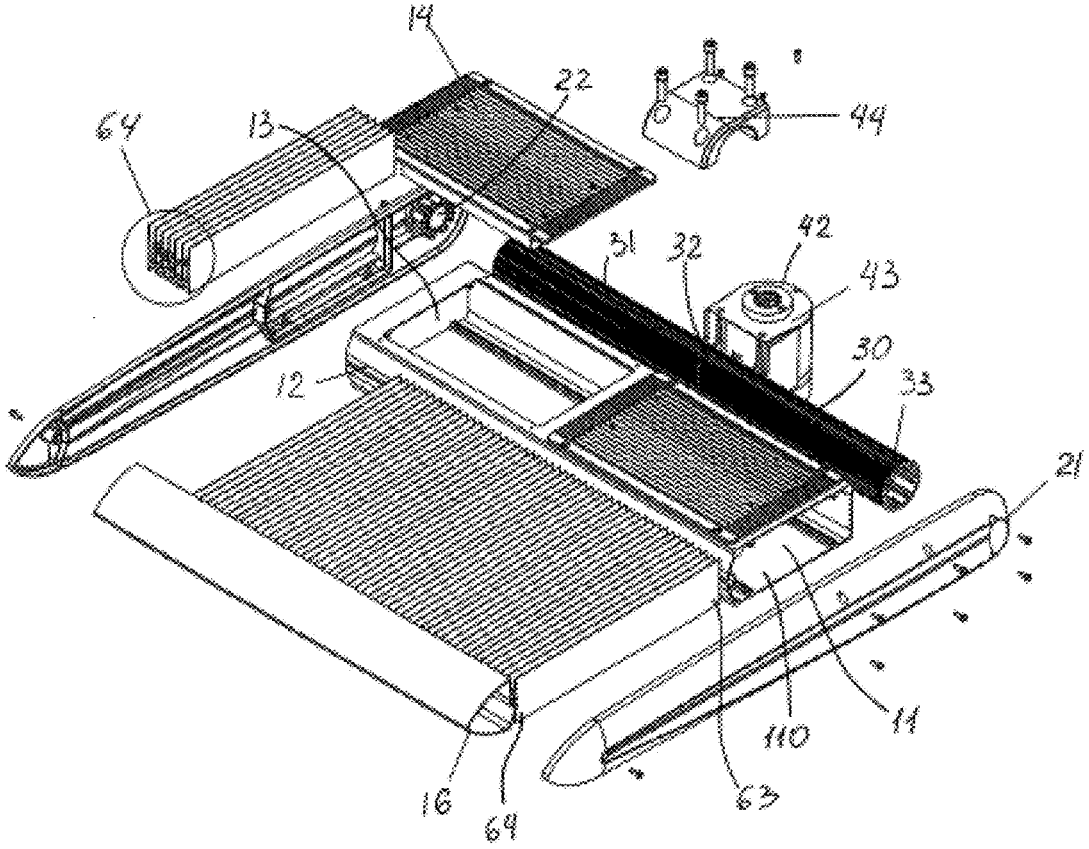
FIG. 31 is an exploded top perspective view of the LED light fixture of FIG. 27.

FIGS. 27-31, 37, and 40 show light fixture 10 further including a closed chamber 11 defined by a driver housing 12 shown in FIG. 31 as an extruded piece. As shown in FIG. 31 chamber 11 has an access opening 13 and a driver door 14 for placement of an LED driver 15 into chamber 11. In the embodiments shown in FIGS. 36 and 41, an electronic LED driver 15 may be enclosed within chamber 11.

Figure 45:
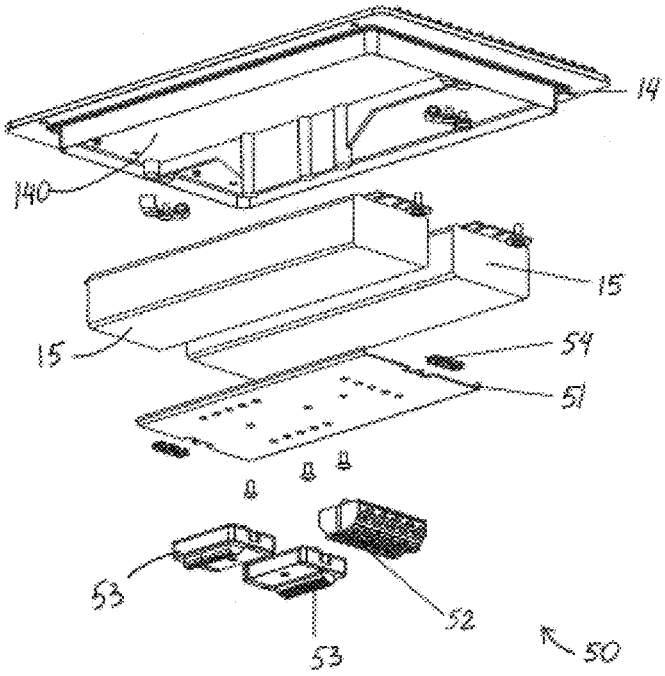
FIG. 45 is a perspective view of an LED driver module according to one embodiment.
Figure 46:
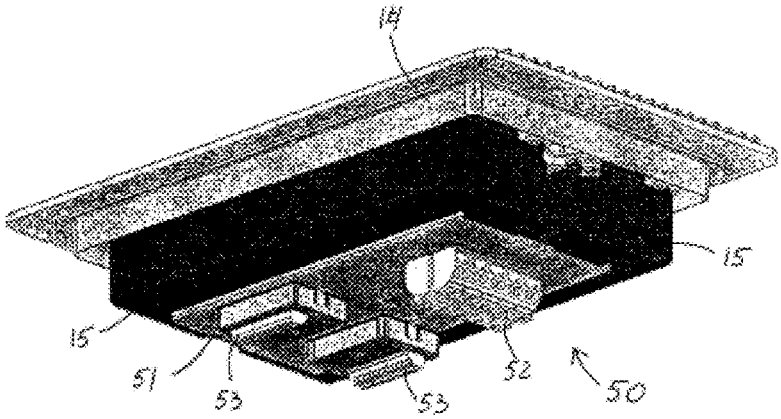
FIG. 46 is an exploded perspective view of the LED driver module according to one embodiment.
Figure 47:
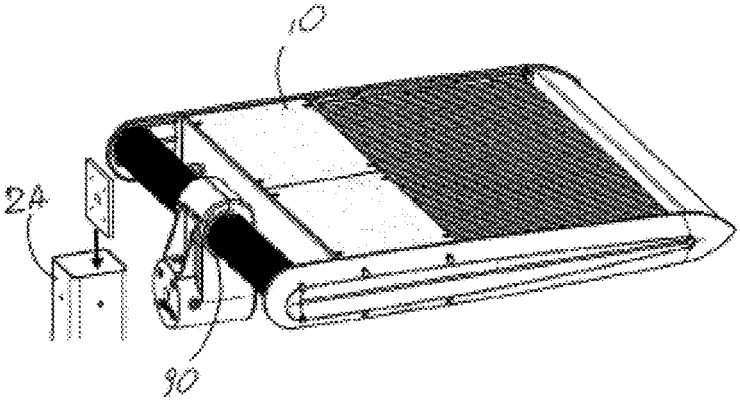
FIG. 47 is a perspective view of the LED light fixture in a position for installation to a square pole, the mounting assembly including a bracket indicating an angle of the light fixture with respect to the pole according to one embodiment.
Figure 48:
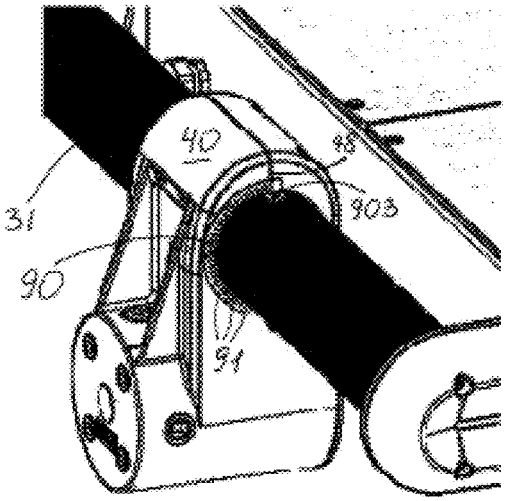
FIG. 48 is an enlarged portion of FIG. 47 showing details of the bracket according to one embodiment.

FIGS. 45 and 46 illustrate a driver module 50 including two LED drivers 15 attached to driver door 14 and secured with a mounting plate 51 which supports a terminal block 52, secondary-surge elements 53 and wire guards 54. Driver door 14 is shown as a cast piece configured to support LED driver module thereagainst. As shown in FIG. 31, driver module 50 is positioned such that driver-supporting surface 140 of driver door 14 is oriented substantially down such that driver 15 is spaced above bottom 110 of chamber 11 and is away from any water that might access chamber 11 and accumulate along its bottom 110. FIG. 31 also shows one embodiment of a mounting arrangement 30 positioned adjacent driver housing 11 with bar 31 extending along driver housing 11 and spaced therefrom.

Figure 53:
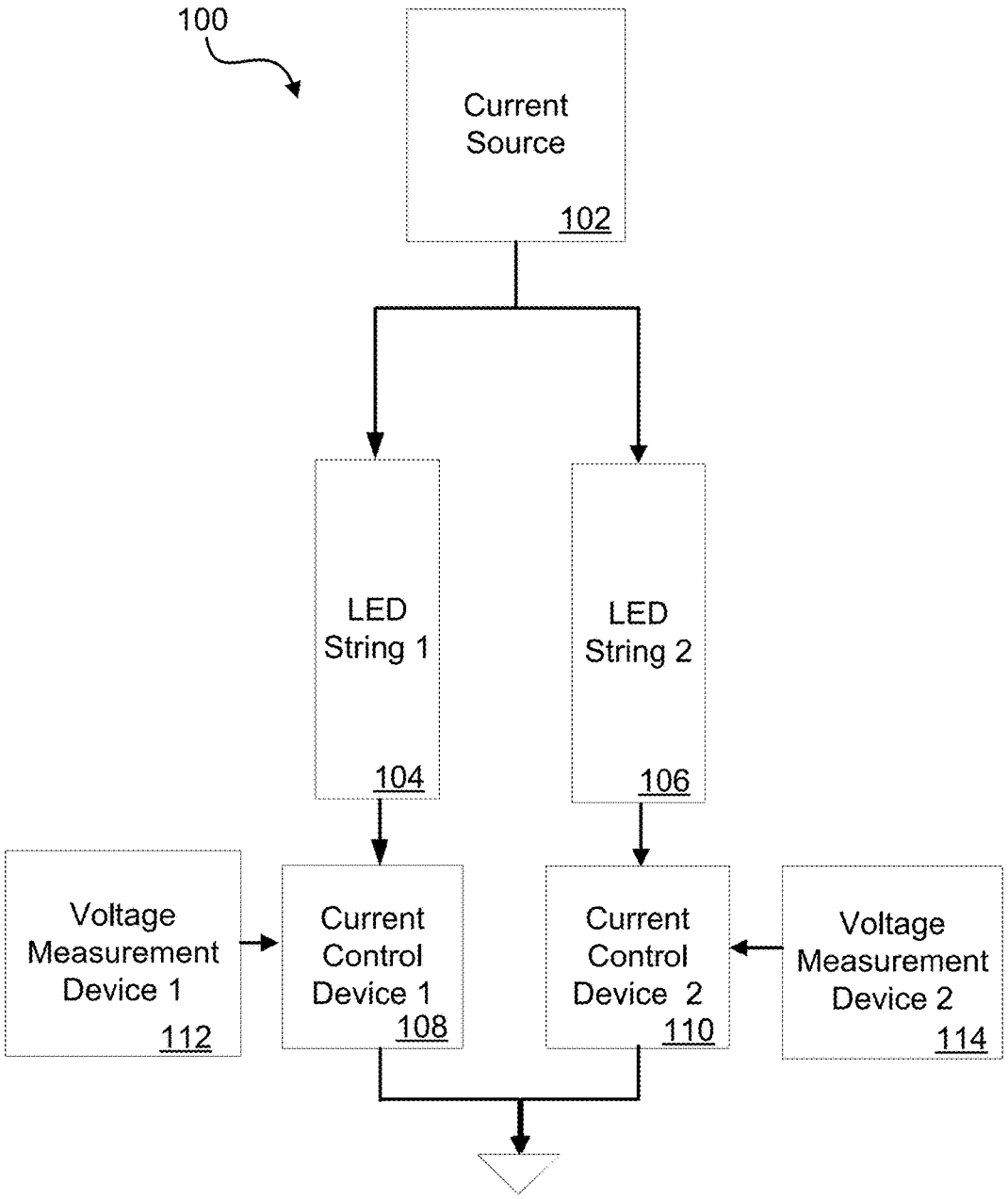
FIG. 53 shows a system for a current sharing driver for light emitting diodes according to one embodiment.

The embodiment shown in FIG. 33 illustrates that first bar-engaging portion 43 may further comprise a pole-connecting section 42 enclosing wiring 46 and electrical elements such as a terminal block 47 and having a weatherproof wire access 45 thereto for electrical connection of light fixture 10. As shown in FIGS. 32-43, pole-connecting section 42 forms an enclosure 420 accessible through an opening 421 with a cover assembly 80 including a cover plate 81 and a gasket 82. Edge 83 defines fastener receiving cavities 84 accepting fasteners 85 which press cover plate 81 against an edge 83 of opening 421 with gasket 82 sandwiched therebetween. Cover plate 81 defines an aperture 810 which is closeable with a lock-closure 86. Illustrative Example of a Current Sharing Driver for High Output, High Color Quality Light FIG. 53 shows an embodiment of a current sharing driver for light emitting diodes 100. As shown in FIG. 53, the system 100 comprises a current source 102, two LED strings 104 and 106, two current control devices 108 and 110, and two voltage measurement devices 112 and 114. One skilled in the art will recognize that in some embodiments the system 100 may comprise additional components, including electrical components such as: resistors, capacitors, diodes, transistors, amplifiers, or other electronic components known in the art.

As shown in FIG. 53, the current source 102 comprises a source of DC current. In some embodiments, this may comprise a rectifier configured to convert AC current to DC current, e.g., a full wave or single wave rectifier along with a capacitor. Alternatively, in some embodiments the current source 102 may comprise a battery, such as a dry or wet cell battery, e.g., a battery found in a traditional or hybrid automobile.

The LED strings 104 and 106 comprise one or more LEDs, for example a plurality of LEDs in series. Each of LED strings 104 and 106 may comprise a plurality of inorganic LEDs, which may comprise semiconductor layers forming p-n junctions and/or organic LEDs (OLEDs), which may comprise organic light emission layers. In some embodiments, light perceived as white or near-white may be generated by a combination of red, green, and blue ("RGB") LEDs. Output color of such a device may be altered by separately adjusting supply of current to the red, green, and blue LEDs.

The current control devices 108 and 110 comprise devices configured to control the current flow through each LED string 104 and 106. In some embodiments, current control devices 108 and 110 may comprise transistors such as a Bipolar Junction Transistor (BJT). In such an embodiment, the BJT may be configured to act as a switch to control current flow, e.g., by connecting the BJT in series with an LED string, such that current must flow from the collector to the emitter of the BJT. In such an embodiment, varying the current applied to the base of the BJT may vary the current allowed to flow through the BJT and thus the amount of current that is allowed to flow through the string of LEDs. In another embodiment, the current control devices 108 and 110 may comprise MOSFETs. In such an embodiment, the MOSFET may be configured to act as a switch to control current flow, e.g., by connecting the MOSFET in series with an LED string such that current must flow from the MOSFET's drain to its source. In such an embodiment, varying the voltage applied to the gate of the MOSFET may vary the current allowed to flow through the MOSFET and thus the amount of current that is allowed to flow through the string of LEDs. In some embodiments, because a MOSFET can be driven using voltage, a MOSFET will require lower power and thus use less energy and reduce the total heat dissipated by the circuit. In other embodiments, current control devices 108 and 110 may comprise other transistors, e.g., junction gate field-effect transistors (JFET) or insulated gate field effect transistors (IGFET).

The voltage measurement devices 112 and 114 comprise devices configured to measure the voltage drop at a point along each LED string. For example, in some embodiments a sensing resistor of a known value may be located either before or after each string of LEDs. By measuring the voltage drop across this resistor, the voltage measurement devices 112 and 114 may be able to determine the current flowing through each string of LEDs, e.g., because V=I*R. Further, in some embodiments, each current control device is configured to measure the voltage at each string of LEDs. In some embodiments, each voltage measurement device is configured to compare the voltage of each string of LEDs and, based on the comparison; output a current/voltage to current control devices 108 and 110. As described above, this current/voltage will cause current control devices 108 and 110 to vary the current allowed to pass through each LED string.

In some embodiments, each of voltage measurement devices 112 and 114 may comprise a circuit comprising both a comparator and an op-amp. As is known in the art, a comparator is a device that compares two voltages or currents and outputs a digital signal indicating which is larger. Ordinarily, a comparator will have two analog input terminals V+ and V−, and one binary digital output. The output of a comparator in ordinary operation is:

Output=high, if V+>V−

Output=low, V+<V−

Similarly, an op-amp can be configured to amplify the difference between two signals. In some embodiments, each of the comparator and the op-amp is configured to receive the voltage from each of the two LED strings. Further, each is configured to compare these voltages and output a signal indicating which voltage is higher.

In one embodiment, the comparator configured to control LED string 104 may receive the voltage associated with LED string 104 at its negative terminal and the voltage associated with LED string 106 at its positive terminal. In such an embodiment, if the voltage of LED string 104 is higher than the voltage of LED string 106, the comparator will set its output to high. Such a setting will cause the current control device 108 to increase current flow. Alternatively, if the voltage of LED string 104 is lower than the voltage of LED string 106, the comparator will set its output to low. Such a setting will cause the current control device 108 to reduce current flow.

In some embodiments, voltage measurement devices 112 and 114 may comprise op-amps configured to measure the voltage after each of current control devices 108 and 110. For example, in some embodiments, sensing resistors of a known value may be located after the output of current control devices 108 and 110. By measuring the voltage drop across these resistors, the op-amps may be able to make further determinations regarding the current flowing through each string of LEDs. For example, in the embodiment described above, wherein the voltage across LED string 104 is higher than the voltage across LED string 106, an op-amp associated with voltage measurement device 112 amplifies the difference, i.e., output=voltage of LED string 104—voltage of LED string 106. If the voltage of LED string 106 becomes lower, the op-amp will increase its output and thus provide a higher driving voltage/current to current control device 108, which increases the current flowing through LED string 104.

In some embodiments, voltage measurement devices 112 and 114 may comprise both op-amps and comparators. In other embodiments, voltage measurement devices 112 and 114 may each comprise only op-amps. An op-amp may be advantageous because generally they are of lower cost than a comparator. However, comparators may be advantageous due to a faster slew rate that can reduce noticeable oscillations in the current found on each string of LEDs.

Embodiments of the present disclosure may allow for current matching, i.e., causing both of LED strings 104 and 106 to have substantially the same current. Other embodiments are configured to allow for current tuning, i.e., causing LED strings 104 and 106 to each have a predetermined current or a predetermined relationship between currents, e.g., in one embodiment, LED string 104 will have 40% of the total current regardless of the total current. These design choices allow a designer to set the level of brightness between each string of LEDs, or the ratio of brightness between each string of LEDs.

Further, in some embodiments, different color strings of LEDs may be used. A designer may use embodiments of the present disclosure to tune the brightness of each string to provide the desired light output and color mixing. For example, the designer may comprise multiple strings of white LEDs kept at a substantially high brightness, but further comprise one string of red LEDs to provide a warmer light output. In such an embodiment, the designer may select sensing resistors configured to cause the string of red LEDs to receive a lower current, and therefore be dimmer than the strings of white LEDs. In such an embodiment, the brightness of the red LEDs may be set to provide the desired warmth of the total light output. Further, in some embodiments one or more the LED strings may comprise different color LEDs, or LEDs with different light output characteristics, e.g., dominant wavelength ("DW"), peak wavelength ("PW"), uniform light output, total luminous flux ("TLF"), and light color rendering index ("CRI"). Embodiments of the present disclosure may be used to control current flow through each string of LEDs to compensate for these factors.

In some embodiments, additional LED strings may be comprised. For example, in one embodiment, a third string of LEDs, a third current control device, and a third voltage measurement device may be comprised. In such an embodiment, the sensing resistors may be selected to provide for current matching between each of the three strings or for a predetermined ratio between the current of each of the three strings. In still other embodiments, additional LED strings, current control devices, and voltage measurement devices may be comprised. In still other embodiments, a plurality of circuits of the type described with regard to FIG. 1 may be comprised in modules to allow for an even greater number of LED strings to be comprised in the light source. In some embodiments, each of these modules may be placed in series to ensure there is uniform current through each module.

In some embodiments, each of the components described with regard to FIG. 1 may be comprised in a specialized form factor LED lamp. In one such embodiment, an LED lamp may be made with a form factor that allows it to replace a standard incandescent bulb, or any of various types of fluorescent lamps. LED lamps often comprise some type of optical element or elements to allow for localized mixing of colors, collimate light, or provide a particular light pattern. Sometimes the optical element also serves as an envelope or enclosure for the electronics and/or the LEDs in a lamp. LED lamps and LED light fixtures can use either transmissive optical elements or reflective optical elements. For example, a so-called "troffer" style ceiling fixture comprises a reflector that serves and an optical element, and in some embodiments may comprise additional optical elements such as glass plates or lenses.

FIGS. 54-62 comprise example embodiments of systems for a current sharing driver for light emitting diodes. The embodiments shown in FIGS. 54-62 each comprise a plurality of strings of LEDs as well as voltage measurement devices and current control devices. A person of ordinary skill in the art will recognize that each of the circuits shown in FIGS. 54-62 may be used in combination with another circuit. For example, the current control system shown in FIG. 54 may be used in combination with components described with regard to FIGS. 5-62. Further a person of ordinary skill will recognize that the number of LEDs on each LED string is a design choice and may be varied such that more or fewer LEDs may be comprised on each string.

Figure 54:
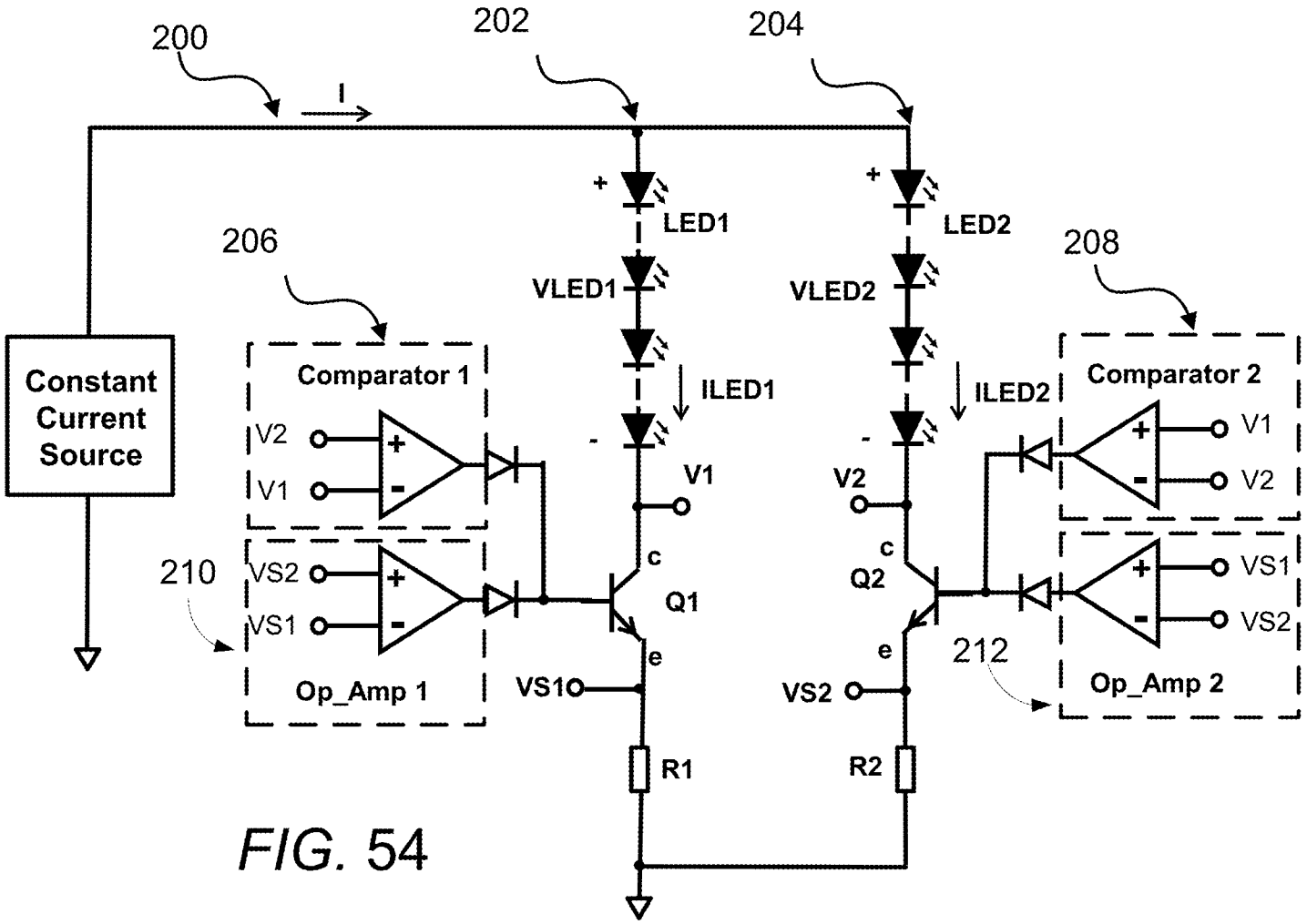
FIG. 54 shows an example system for a current sharing driver for light emitting diodes according to one embodiment.

Turning now to FIG. 54, FIG. 54 shows an example system 200 for a current sharing driver for light emitting diodes according to one embodiment. As shown in FIG. 54, system 200 comprises a current sharing circuit for two LED strings 202 and 204. Each LED string comprises one or more LEDs, for example a string may comprise a plurality of LEDs in series. Circuit 200 comprises comparator 1 (represented by reference number 206) and comparator 2 (represented by reference number 208), op-amp 1 (represented by reference number 210) and op-amp 2 (represented by reference number 212), bipolar transistors Q1 and Q2, and current sensing resistors R1 and R2.

As shown in FIG. 54, comparator 1 (represented by reference number 206) and comparator 2 (represented by reference number 208) compare the voltage V1 and V2 at the collector of one bipolar transistor with the voltage V2 and V1 of the collector of another bipolar transistor. This comparison enables the comparator to determine if one LED string has higher voltage than the other LED string. For example, in one embodiment, comparator 1 compares voltage V1 at the collector of Q1 with voltage V2 at the collector of Q2. If the voltage of the first string of LEDs, VLED1 is higher than voltage of the second string of LEDs, VLED2, V1 will be lower than V2, and comparator 1 will thus set its output to high. Such a setting will set bipolar transistor Q1 to be fully saturated, e.g., fully turned on and therefore increasing current flow. Further, in such an embodiment, the output of comparator 2 is set to LOW since V2 is higher than V1. Such a setting will set bipolar transistor Q2 to off and thus reduce current flow.

As shown in FIG. 54, the op-amp 1 and op-amp 2 are both connected to the emitters of bipolar transistors Q1 and Q2. This enables op-amp 1 and op-amp 2 to measure the difference between the voltage at the emitters of each of Q1 and Q2, shown in FIG. 54 as VS1 and VS2. Based on this measurement, op-amp 1 and op-amp 2 drive the two bipolar transistors Q1 and Q2. In the example above, wherein V2 is higher than V1, op-amp 2 takes the sensed current signal VS1 as a current reference for LED string LED2, and amplifies the error ($\Delta V = VS1 - V52$). If VS2 becomes lower, the output of op-amp 2 becomes higher to provide higher driving current (Ibe2) to the bipolar transistor Q2, and the current flowing through the collector of Q2, i.e., the current of the second string of LEDs (ILED2), will thus increase because ILED2=β*Ibe2, where Ibe2 is the current flowing from the base of Q2 to the emitter of Q2 and β is the current amplification coefficient of Q2. As discussed above, because the brightness of an LED is associated with current flow, in this example, transistor Q2 will increase the brightness of the second string of LEDs.

In another embodiment, if VS2 becomes higher, the output of op-amp 2 becomes lower, providing a lower driving current (Ibe2) to the bipolar transistor Q2 and the current flowing through the collector of Q2, i.e., the current of the second string of LEDs (ILED2) will decrease.

In the embodiment shown in FIG. 54, VS1=ILED*R1; VS2=ILED2*R2, and ILED*R1=ILED2*R2. Therefore, ILED2=ILED1(R1/R2). Thus, if R1 is selected to be the same as R2, then ILED1=ILED2, which means the total current from the constant current source is evenly shared by the two LED strings. In such an embodiment, the two strings will have substantially the same brightness.

In another embodiment, V1 may be higher than V2 if VLED1 is lower than VLED2. In this case, the output of comparator 2 is set to high whereas the output of comparator 1 is set to low and bipolar transistor Q2 is saturated or fully turned on, while the current through the collector and emitter of bipolar transistor Q1 is controlled by the output of op-amp 1. In such an embodiment, op-amp 1 takes the sensed current signal VS2 as the current reference for string LED1. In the same manner described above, the current ILED1 flowing through LED1 is regulated, and ILED1=ILED2*(R2/R1). Therefore, ILED2=ILED2 if R1=R2.

Thus, in the example described above, the comparator and op-amp circuits automatically differentiate which LED string has a higher voltage, and provide an exact current to the LED strings as set by the ratio of the two current sensing resistors R1 and R2.

A person of ordinary skill in the art will recognize that the circuit shown in FIG. 54 may be used in combination with another circuit. For example, the current control system shown in FIG. 54 may be used in combination with components described with regard to FIGS. 55-62.

Figure 55:
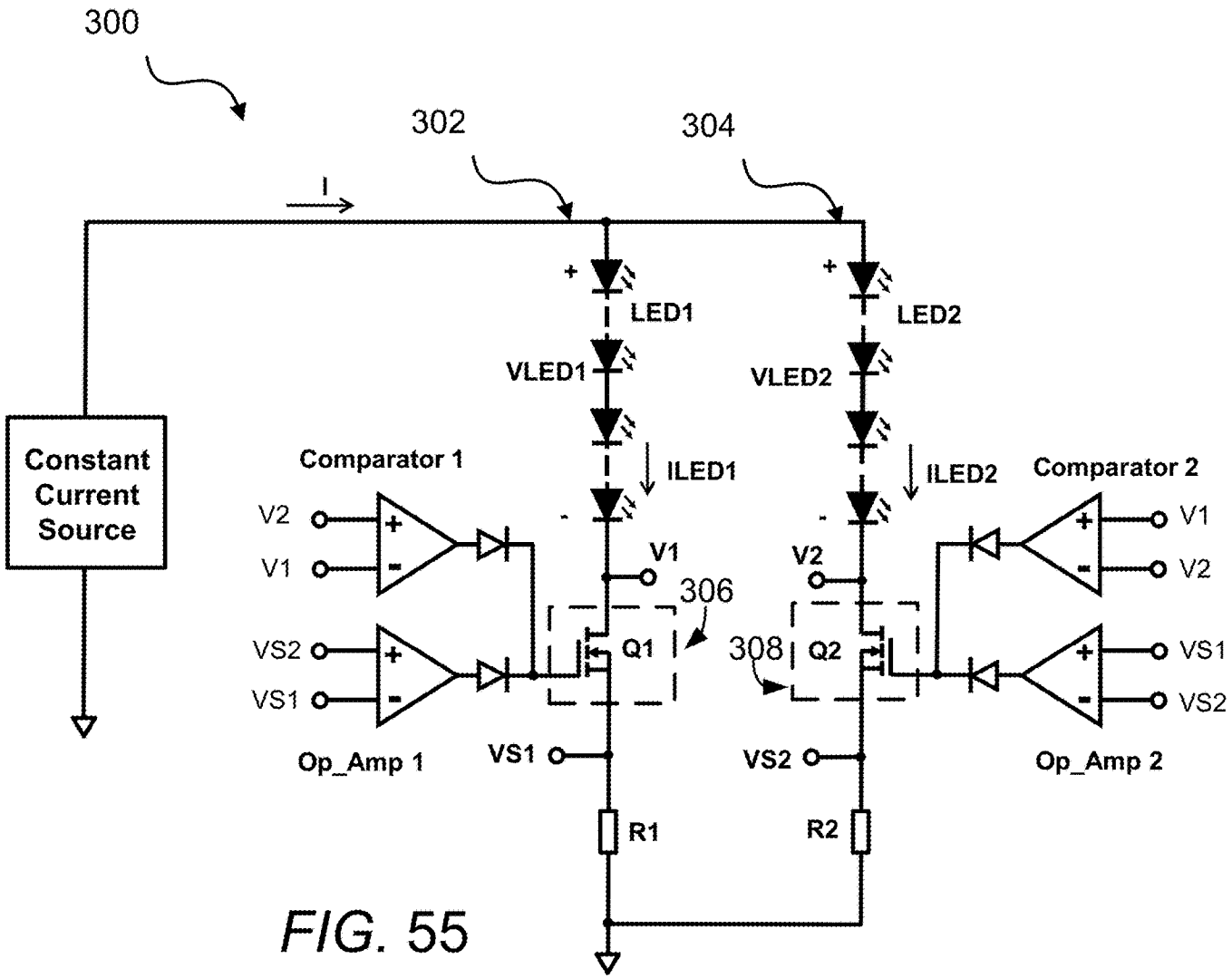
FIG. 55 shows another example system for a current sharing driver for light emitting diodes according to one embodiment.

Turning now to FIG. 55, FIG. 55 shows an example system 300 for a current sharing driver for light emitting diodes according to one embodiment. The system 300 is similar to system 200 described with regard to FIG. 54. However, as shown in FIG. 55, system 300 implements MOSFETs (metal-oxide-semiconductor field-effect transistor) to regulate current in two strings of LEDs 302 and 304. In some embodiments, MOSFETs may be advantageous over bipolar transistors because a MOSFET may be driven with a voltage source instead of current. In some embodiments, this may reduce the power required to drive the op-amp and comparator circuits, thus leading to a more energy efficient system that may operate at a lower temperature.

In system 300, shown in FIG. 55, the current flowing through the drain to source of the MOSFET depends on the amplitude of the driving voltage across the gate to source of the MOSFET. In the linear range, a higher driving voltage results in a higher current, and vice versa. Thus as with system 200 described with regard to FIG. 54, the comparator and op-amp circuits control the MOSFETS to increase or decrease the current flowing through each string of LEDs.

A person of ordinary skill in the art will recognize that the circuit shown in FIG. 55 may be used in combination with another circuit. For example, the current control system shown in FIG. 3 may be used in combination with components described with regard to FIGS. 54 and 56-62.

Figure 56:
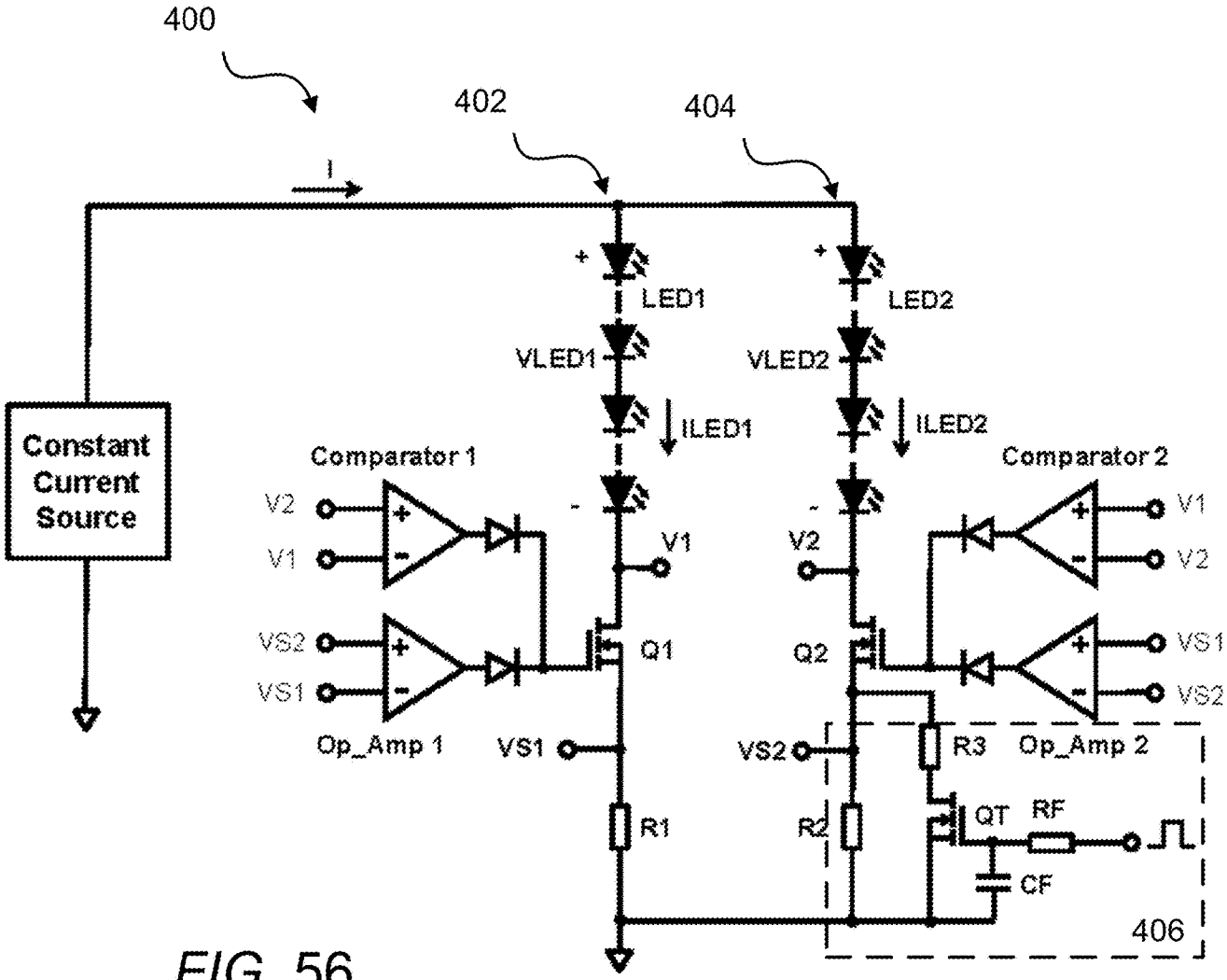
FIG. 56 shows another example system for a current sharing driver for light emitting diodes according to one embodiment.

Turning now to FIG. 56, FIG. 56 shows yet another example system 400 for a current sharing driver for light emitting diodes according to one embodiment. The circuit shown in FIG. 56 comprises a circuit that operates similarly to the circuits described with regard to FIGS. 54 and 55. However, the system 400 further comprises a tuning circuit comprising a pulse generator, shown in this embodiment as a PWM pulse, an RC filter comprising resistor RF and capacitor CF, a MOSFET operating as a switch QT, and a resistor R3. Each of these components is shown within the dashed box identified by reference no. 406.

The PWM pulse can be a control signal from an external control unit or an on-board micro-controller. With this tuning circuit, the impedance of the control switch QT can be varied. For example, in the embodiment shown in FIG. 56, the PWM circuit varies whether current is allowed to flow through QT. This controls whether resistor R3 is in parallel with resistor R2. When QT is fully turned on, resistor R3 is in parallel with R2 thus reducing the total current-sensing resistance. When QT is open, resistor R3 is not in parallel with R2, thus increasing the total resistance. The impedance of QT depends on the voltage level at its gate terminal which is set by the duty cycle and amplitude of the PWM pulse. In this way, the current and the light intensity of string LED2 (identified by reference no. 404) can be adjusted. In some embodiments, this may be used for color mixing. For example, if string LED 1 (identified by reference no. 402) is a BSY (blue-shifted-yellow) string and string LED 2 is a RED color string, the current of each string may be set such that the color temperature of the total light output is tuned to the desired value.

A person of ordinary skill in the art will recognize that the circuit shown in FIG. 56 may be used in combination with another circuit. For example, the current control system shown in FIG. 56 may be used in combination with components described with regard to FIGS. 54-55 and 57-62.

Figure 57:
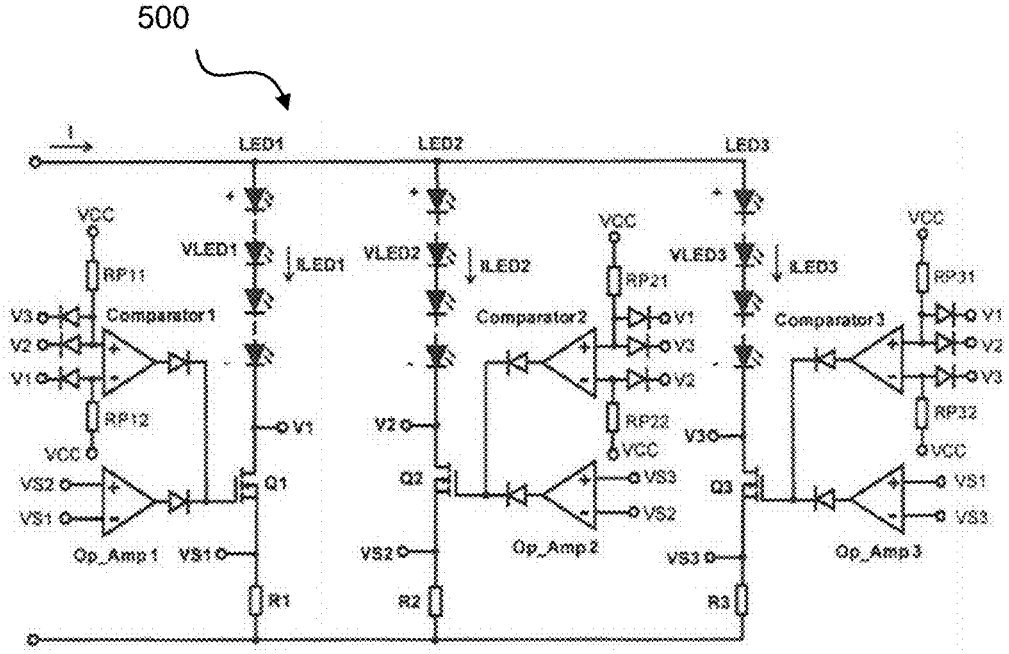
FIG. 57 shows another example system for a current sharing driver for light emitting diodes according to one embodiment.

Turning now to FIG. 57, FIG. 57 shows yet another example system 500 for a current sharing driver for light emitting diodes according to one embodiment. As shown in FIG. 57, the system 500 is similar to system 300 described with regard to FIG. 55. However, the circuit shown in FIG. 57 comprises a third string of LEDs, LED3. As shown in FIG. 55, each of the three LED strings is coupled to a MOSFET (Q1, Q2, and Q3), a current sensing resistor (R1, R2, and R3), a comparator (comparator 1, comparator 2, and comparator 3), and an op-amp (op_amp 1, op_amp 2, and op_amp 3).

In circuit 500, each component other than the three comparators operates in substantially the same way as described above with regard to FIGS. 54-56. As shown in FIG. 57, each comparator is configured to measure the voltage across each string. Specifically, comparator 1, configured to control MOSFET Q1 and thus vary the current flowing through LED1, compares the voltage of LED1 to the voltage of LED2 and LED3. As shown in FIG. 57, the voltage from string LED1 (V1) along with a pull-up (VCC) and resistor RP12 is connected to the negative terminal of comparator 1 via a diode. The positive terminal of comparator 1 is connected to two diodes connected to V2 and V3 respectively and a pull-up (VCC) and resistor RP11. In this embodiment, if V1 is lower than the lower of V2 and V3, the output of comparator 1 is set to high, and Q1 is fully turned on. However, if V1 is higher than the lower value of V2 and V3, the output of comparator 1 is set to low, thus causing Q1 to restrict current flow. Further, in the embodiment shown in FIG. 57, op-amp 1 amplifies the error between voltage at VS1 and VS2, and maintains VS1=VS2 by adjusting the drive voltage at the gate terminal of MOSFET Q1.

As shown in FIG. 57, the other two strings, LED2 and LED3 operate similarly, e.g., comparator 2, configured to control MOSFET Q2 coupled in series with LED string 2, is connected to V2 and a pull-up and resistor RP22 at its negative terminal and V1 and V3 plus a pull-up and resistor RP21 at its positive terminal. Similarly, comparator 3 configured to control MOSFET Q3 coupled in series with LED string 3 is connected to V3 and a pull-up and resistor RP32 at its negative terminal and V1 and V2 plus a pull-up and resistor RP31 at its positive terminal. The other two opamps, op_amp 2 and op_amp 3 have a similar operation as described above and maintain VS2=VS3, and VS3=VS1. Therefore, VS1=VS2=VS3, i.e., ILEDPR1=ILED2*R2=ILED3*R3. The current flowing through each LED string is determined by the equation below.

$$ILED1=((R2*R3)/\Delta)*I$$

$$ILED2=((R1*R3)/\Delta)*I$$

$$ILED3=((R1*R2)/\Delta)*I$$

Where:

I=the total input current; and $\Delta$=R1*R2+R2*R3+R1*R3.

One of ordinary skill in the art will recognize that if R1=R2=R3, then ILED1=ILED2=ILED3. Thus, by setting each resistor to an equal value, each LED string may have substantially the same brightness. Alternatively, the resistor values may be varied in order to vary the brightness of each string. In some embodiments, this may be employed for color or lighting compensation. For example, in some embodiments, one or more of the LED strings may comprise different color LEDs, or LEDs with different light output characteristics, e.g., dominant wavelength ("DW"), peak wavelength ("PW"), uniform light output, total luminous flux ("TLF"), and light color rendering index ("CRI"). In some embodiments a designer may select values of resistors R1, R2, and R3 in order to compensate for these differences or provide a higher overall light quality. For example, in one embodiment, one of the LED strings may comprise LEDs of a different color than the other two strings. In such an embodiment, resistors R1, R2, and R3 may be selected such that this different color string has a different current level and thus a different brightness than the other two strings. This may be used to, for example, change the warmth of the light output or control the color of the light.

A person of ordinary skill in the art will recognize that the circuit shown in FIG. 57 may be used in combination with another circuit. For example, the current control system shown in FIG. 57 may be used in combination with components described with regard to FIGS. 54-56 and 58-62.

Figure 58:
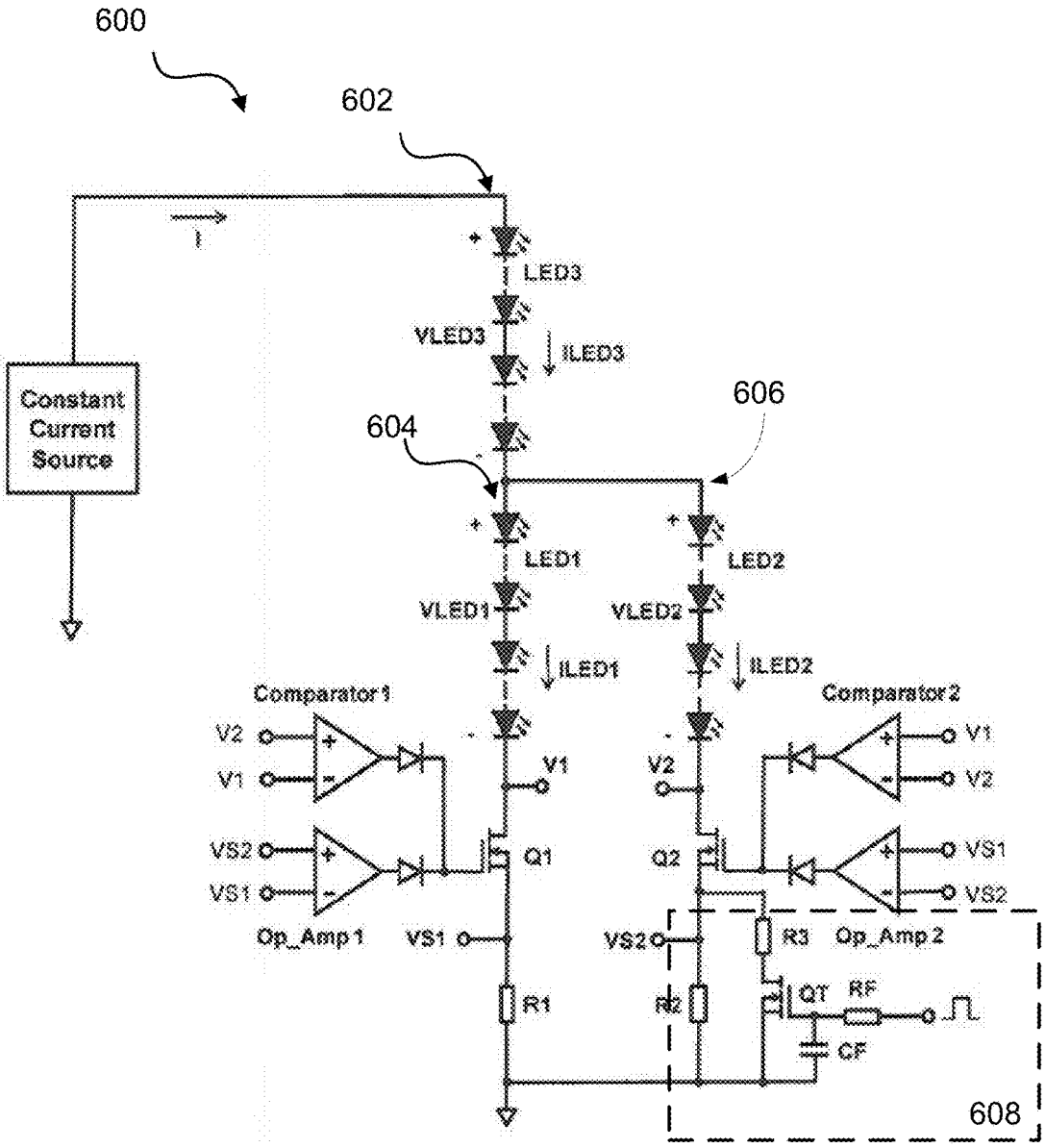
FIG. 58 shows another example system for a current sharing driver for light emitting diodes according to one embodiment.

Turning now to FIG. 58, FIG. 58 shows yet another example system 600 for a current sharing driver for light emitting diodes according to one embodiment. The system 600 operates similarly to system 400 described with regard to FIG. 56. However, system 600 further comprises a third string of LEDs, LED3 (identified by reference no. 602), which is connected directly to the current source. In such an embodiment, the current provided to LED3, ILED3, maintains a constant value. However, the two remaining strings LED1 (identified by reference no. 604) and LED2 (identified by reference no. 606) are connected in parallel with each other but in series with LED3. Thus, the sum of the currents to LED1 and LED2 will equal the current supplied to LED3, i.e., ILED3=ILED1+ILED2. Thus, in some embodiments, the LED string LED3 may be substantially brighter than both LED1 and LED2.

In some embodiments, the designer may set the value of resistors R1 and R2 to set a balance between the current through LED strings LED1 and LED2. This will also set the brightness of each of these strings. A designer may set this brightness in order to compensate for color or other factors associated with the LEDs in each string.

Further, in the embodiment shown in FIG. 58, as with circuit 400 described with regard to FIG. 56, a pulse generating circuit, such as a PWM pulse is used to tune the impedance of the control switch QT. The components of this pulse generating circuit is shown within the dashed box identified by reference no. 608. This enables the current and the light intensity of string LED2 to be adjusted. In some embodiments, this variance in intensity may be useful for color mixing. For example, if LED1 is a BSY (blue-shifted-yellow) string and LED2 is a RED color string, the color temperature of the light fixture can be tuned to the desired value, for example, by increasing or decreasing the current flow to each string.

A person of ordinary skill in the art will recognize that the circuit shown in FIG. 58 may be used in combination with another circuit. For example, the current control system shown in FIG. 58 may be used in combination with components described with regard to FIGS. 54-57 and 59-62.

Figure 59:
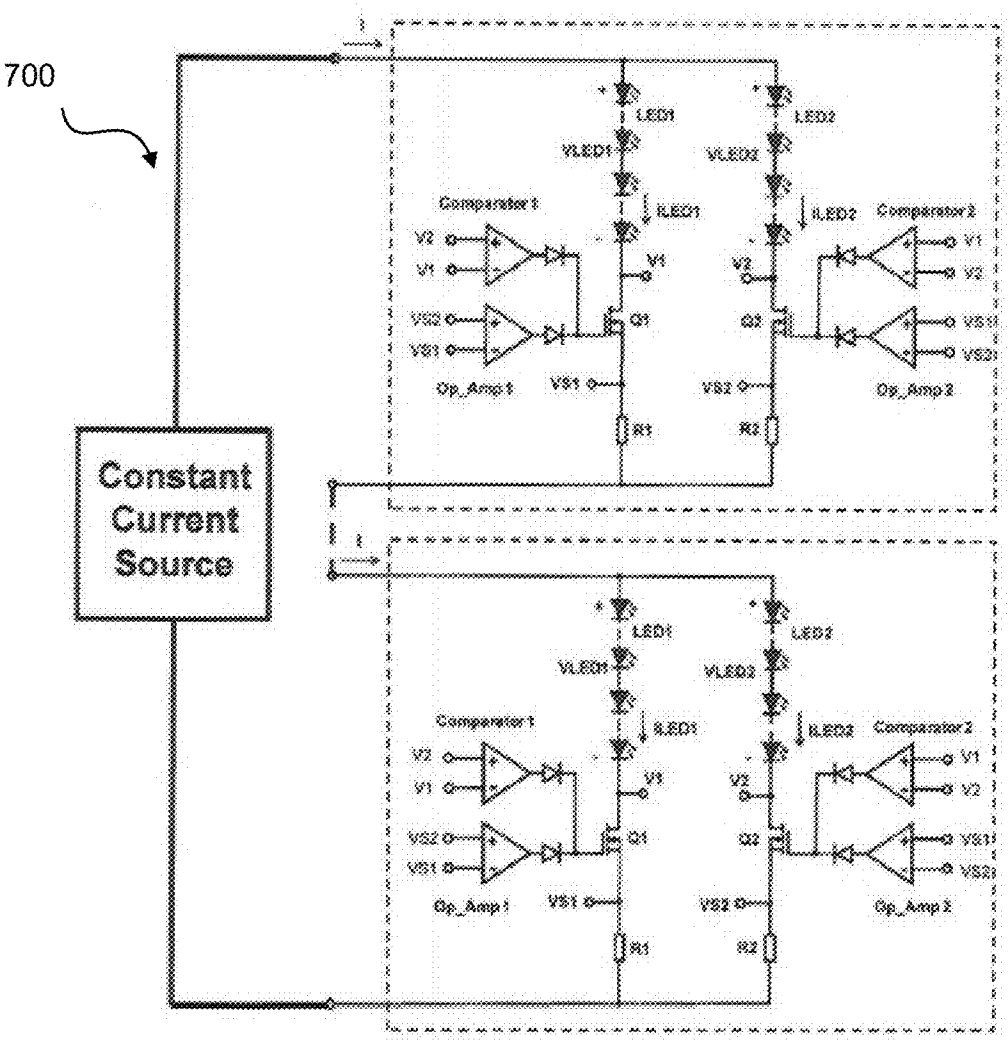
FIG. 59 shows another example system for a current sharing driver for light emitting diodes according to one embodiment.

Turning now to FIG. 59, FIG. 59 shows yet another example system 700 for a current sharing driver for light emitting diodes according to one embodiment. As shown in FIG. 59, a plurality of current balancing circuits such as those described above with regard to FIGS. 53-58 are placed in series. In some embodiments, each module may contain two or more LED strings and a current sharing circuit. The embodiment shown in FIG. 59 allows a plurality of modules to be combined to obtain higher overall power and lumen output.

Each module shown in FIG. 59 comprises a current sharing driver circuit of the type described above with regard to FIGS. 54 and 55. As described above, a designer may adjust the value of sensing resistors in order to set the current balance between each string of LEDs in the module. In some embodiments, the designer may select resistors to adjust brightness such that it can create a more pleasing (e.g., warmer) light or to compensate for other factors associated with the each LED, string of LEDs, or module of LEDs.

Further, in some embodiments, other types of current balancing circuits, such as those described throughout this application may be comprised in a module form. Further, in some embodiments, a plurality of modules such as those shown in FIG. 59 may be grouped into a module, which may then be combined with other similar modules allowing an even larger number of modules to be combined to obtain higher overall power and lumen output.

A person of ordinary skill in the art will recognize that the circuit shown in FIG. 59 may be used in combination with another circuit. For example, the current control system shown in FIG. 59 may be used in combination with components described with regard to FIGS. 54-58 and 60-62.

Figure 60:
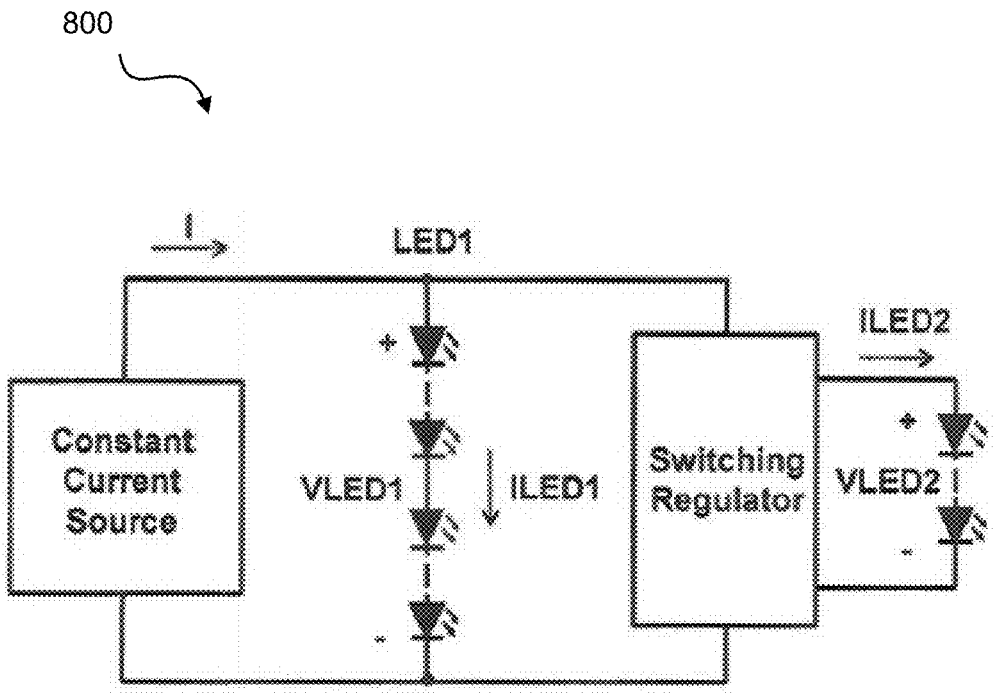
FIG. 60 shows another example system for a current sharing driver for light emitting diodes according to one embodiment.

Turning now to FIG. 60, FIG. 60 shows yet another example system 800 for a current sharing driver for light emitting diodes according to one embodiment. The embodiment shown in FIG. 8 differs from the other embodiments described above in that instead of a current sharing circuit with linear current regulators, a switching regulator is used. In some embodiments, a switching regulator, such as one or more of a boost, buck, or chop regulator, may rapidly switch a series device on and off. For example, as shown in FIG. 60, the switching regulator may rapidly switch the LEDs in LED string LED2 on and off in order to regulate the current flowing through that string.

In the embodiment shown in FIG. 60, the current flowing through the LED string LED2 is regulated by the switching regulator. Further, because the LED string LED1 is in parallel with the switching regulator, the switching regulator also controls the current flowing through LED1. In some embodiments, this design may be used to vary the brightness through each string of LEDs to improve the overall quality of light or compensate for other factors associated with each LED or string of LEDs, as discussed above.

In some embodiments, a benefit of using a switching regulator may be lower power loss. In some embodiments, this can improve the overall efficiency of the circuit, and reduce the amount of heat generated by the power loss. In some embodiments, this advantage may still be present even if the voltage difference between LED1 and LED2 is relatively high.

A person of ordinary skill in the art will recognize that the circuit shown in FIG. 60 may be used in combination with another circuit. For example, the current control system shown in FIG. 60 may be used in combination with components described with regard to FIGS. 54-59 and 61-62.

Figure 61:
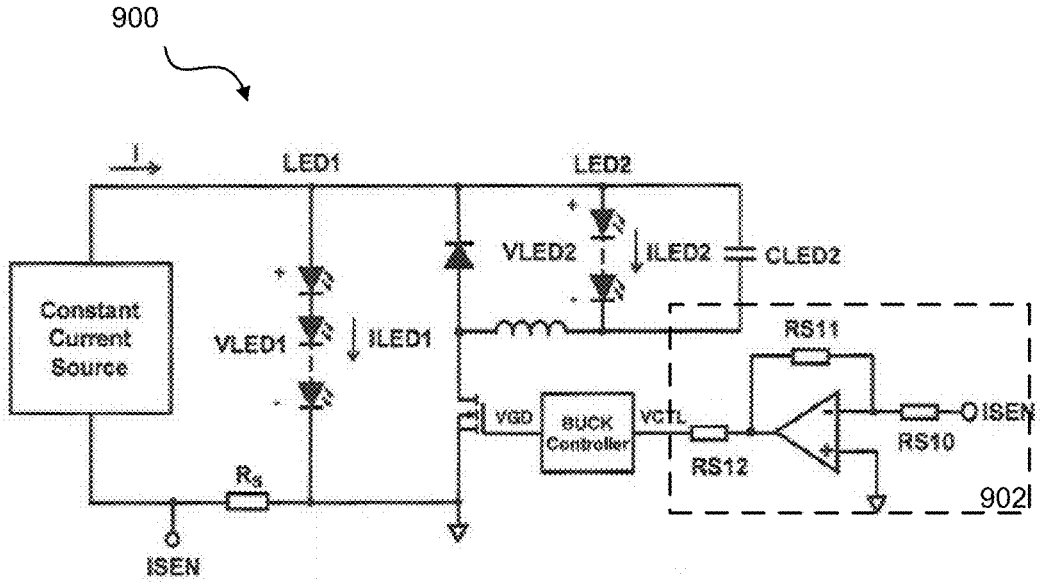
FIG. 61 shows another example system for a current sharing driver for light emitting diodes according to one embodiment.

Turning now to FIG. 61, FIG. 61 shows yet another example system 900 for a current sharing driver for light emitting diodes according to one embodiment. The embodiment shown in FIG. 61, further comprises a buck switching regulator or any other type of switching regulator and dimming control.

In the embodiment shown in FIG. 61, the total current from the constant current source is sensed by resistor RS to generate a sense voltage. This sense voltage is then amplified by an operation amplifier circuit 902 with a gain equal to the value of RS11/RS10. The output of the operational amplifier, i.e., the amplified voltage VCTL is then passed into a switching regulator, shown in this example as a buck controller, which controls the current flowing through a MOSFET configured to control the current through LED2, ILED2. In the embodiment shown in FIG. 61, the higher the constant current I, the higher the control voltage VCTL, and thus the higher LED current ILED2.

In the embodiment shown in FIG. 61, the ratio for the current between each LED string, ILED1/ILED2, is kept constant, even when the current from constant current source I is reduced, e.g., during dimming. In some embodiment, this enables the circuit 900 to maintain the same overall color temperature even when the brightness of each string of LEDs is reduced.

A person of ordinary skill in the art will recognize that the circuit shown in FIG. 61 may be used in combination with another circuit. For example, the current control system shown in FIG. 61 may be used in combination with components described with regard to FIGS. 53-60 and 62.

Figure 62:
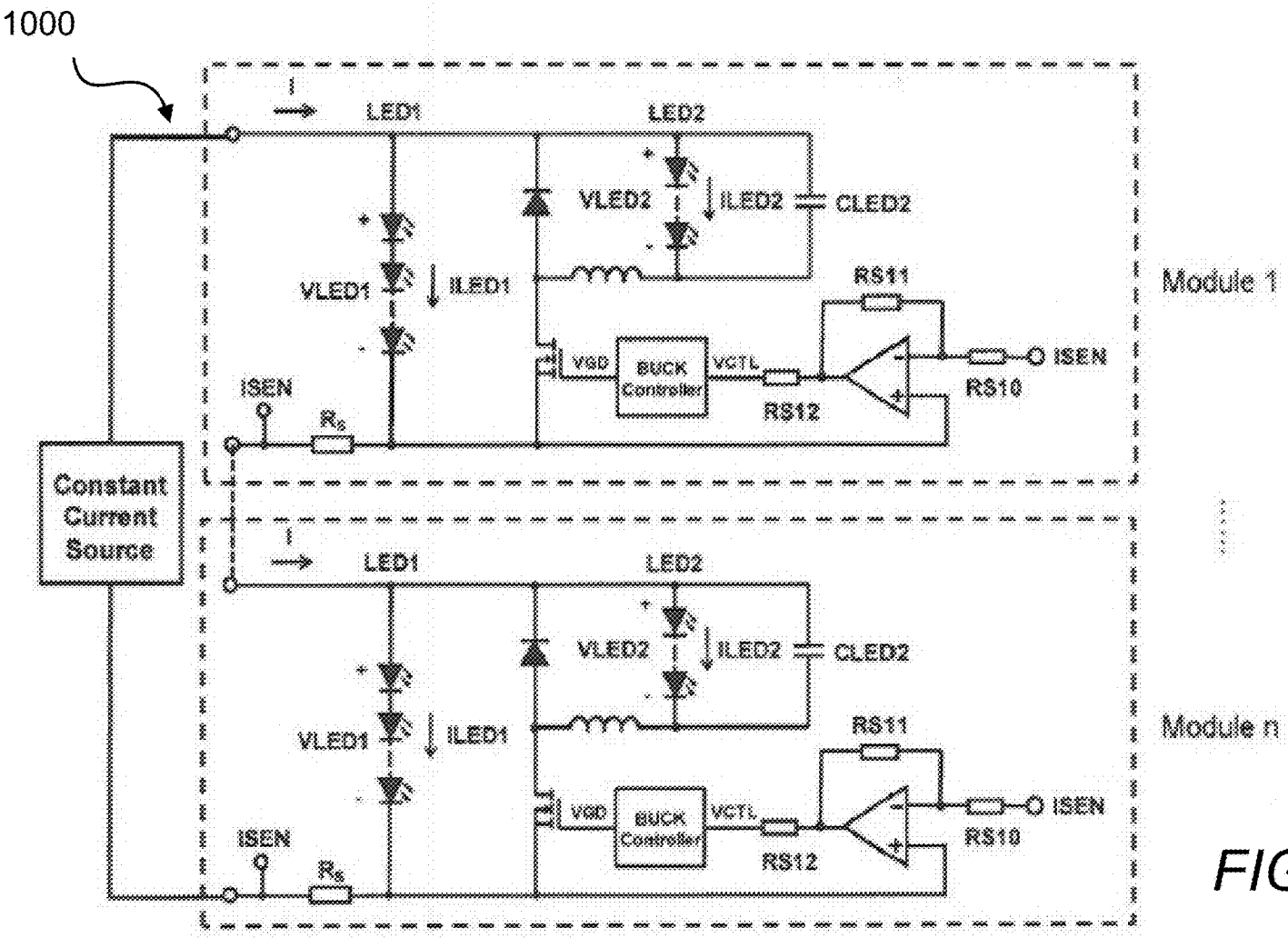
FIG. 62 shows another example system for a current sharing driver for light emitting diodes according to one embodiment.

Turning now to FIG. 62, FIG. 62 shows yet another example system 1000 for a current sharing driver for light emitting diodes according to one embodiment. The embodiment shown in FIG. 62 comprises a modular system comprising a plurality of current sharing drivers for light emitting diode circuits similar to those described above with regard to FIG. 61. This modular approach allows a plurality of modules to be combined to obtain higher overall power and lumen output. In some embodiments, a modular approach allows the total voltage across each module to be very low. Further, in some embodiments a modular approach allows for a high switching frequency, e.g., 500 kHz, to shrink the size of the switching regulators.

A person of ordinary skill in the art will recognize that the circuit shown in FIG. 62 may be used in combination with another circuit. For example, the current control system shown in FIG. 62 may be used in combination with components described with regard to FIGS. 54-61.

Advantages of Systems and Methods for High Output, High Color Quality Light

There are numerous advantages of the current sharing circuit of present disclosure.

The present disclosure provides efficient ways for addressing thermal challenges and extracting increased amounts of light from the LEDs of LED light fixtures. One such way, as described above, is increasing the surface area of the printed circuit board without changing the configuration of the LED array thereon. This takes advantage of the extra circuit-board material for heat-transfer purposes.

In some embodiments, the disclosed low-profile configuration of the light fixture permits installation against the structure with a relatively small aperture formed in structure surface 1 for electrical connections. This is beneficial in installations for outdoor canopies such as those used at gasoline stations. In particular, the small connection aperture minimizes access of water to the fixture. Another benefit provided by the light fixture according to the present disclosure is that all major components are accessible for servicing from the light-emitting front of the fixture, under the canopy.

Further, some embodiments of the present disclosure provide more flexibility when choosing LED strings. For example, embodiments of the present disclosure enable the designer to select different LEDs with different characteristics. In some embodiments, this enables the designer to comprise different numbers of LEDs in each string.

Further, embodiments of the present disclosure enable additional LED strings to be placed in the same package. Because these LED strings can be placed in parallel, the total voltage drop of the circuit can be reduced. This can allow the designer to build an LED circuit with a greater number of LEDs, and therefore a higher overall light output. Furthermore, as discussed above, an even larger number of LEDs may be incorporated by using a modular approach with a plurality of current sharing drivers of the types discussed above.

Embodiments described above also allow the designer to adjust brightness to create a more pleasing (e.g., warmer light) or to compensate for other factors associated with the each LED, string of LEDs, or module of LEDs. For example, in some embodiments the resistors may be selected to compensate for different light output characteristics, e.g., dominant wavelength ("DW"), peak wavelength ("PW"), uniform light output, total luminous flux ("TLF"), and light color rendering index ("CRI"). In some embodiments, this enables a broader range of LEDs to be used, reducing production cost, because marginal LEDs that would previously have been discarded may be used. Further, the current level can be set to maximize the life of each LED or string of LEDs.

Embodiments of the present disclosure may enable an LED to comprise advantageous light output characteristics. For example, in some embodiments, the cumulative light output of embodiments of the present disclosure may comprise an intensity of greater than or equal to 10,000 lumens. Further, in some embodiments, the cumulative light output may comprise a color temperature of greater than or equal to 4000° K. In some embodiments, the cumulative light output may comprise a Color Rendering Index ("CRI") of at least 90. In some embodiments, the CRI may be 94 or greater. In some embodiments, the above characteristics may be achieved with a drive current of at least 700 mA. In some embodiments, the drive current may comprise 1,000 mA. In some embodiments, the cumulative light output comprises an intensity of greater than or equal to 13,000 lumens. In some embodiments, the chromaticity comprises within 0.2-0.225 u' and 0.49-0.51 v'. Further in some embodiments, the total radiant flux is within the range of 30,900-41,600 mW.

Further, embodiments of the present disclosure may enable higher efficiency light, for example, in some embodiments the lumen efficiency may comprise at least 98 lumens per Watt. In some embodiments, the lumen efficiency may comprise at least 105 lumens per Watt.

The table below shows non-limiting example characteristics of LED lighting fixtures according to the embodiments disclosed herein.

| Input Wattage/ W | Input current/ mA AC | 1976 Chromaticity u' | 1976 Chromaticity v' | General CRI/ Mean | Color Temp/ ° K | LED Intensity/ Lm Mean | Total Radiant Flux/ mW | Lm/ W |
|---|---|---|---|---|---|---|---|---|
| 93.42 | 781.7 | 0.2248 | 0.5003 | 93.92 | 4034 | 10265.00 | 30,920.0 | 109.88 |
| 119.66 | 1000.8 | 0.209 | 0.49 | 90.03 | 4945 | 12921.00 | 40,050.0 | 107.98 |
| 132.9 | 1112.5 | 0.2223 | 0.4978 | 94.32 | 4177 | 13124.00 | 40,190.0 | 98.75 |
| 132.07 | 1106 | 0.2231 | 0.4976 | 94.79 | 4147 | 13113.00 | 40,270.0 | 99.29 |
| 134.17 | 1123.9 | 0.2242 | 0.4979 | 95.01 | 4101 | 13512.00 | 41,590.0 | 100.71 |
| 132.64 | 1110.6 | 0.2209 | 0.4975 | 94.11 | 4239 | 13442.00 | 41,270.0 | 101.34 |

Embodiments of the present disclosure may enable an LED to comprise advantageous light output characteristics. For example, in some embodiments, the cumulative light output of embodiments of the present disclosure may comprise an intensity of at least 10,000 lumens and a lumen efficiency of at least 100 lumens per watt. Further in some embodiments, the cumulative light output may comprise a color temperature of greater than or equal to 4000° K and a Color Rendering Index ("CRI") of at least 70. In some embodiments, the cumulative light output comprises a color temperature of greater than or equal to 5000° K and a CRI of at least 90. In some embodiments, the drive current comprises at least 1000 mA and the cumulative light output comprises an intensity of greater than or equal to 13,000 lumens. In other embodiments, the cumulative light output comprises an intensity of greater than or equal to 25,000 lumens. In other embodiments, the LED light fixture is configured to operate based on a drive current comprising at least 700 mA and the cumulative light output comprises an intensity of greater than or equal to 20,000 lumens The table below shows non-limiting example characteristics of LED lighting fixtures according to the embodiments disclosed herein, in which the light temperature comprises at least 4000° K and the Color Rendering Index ("CRI") comprises at least 70.

| Input current/mA AC | Input Wattage/W | LED Intensity/Lm Mean |
|---|---|---|
| 700 | 267 | 24,608 |
| 700 | 533 | 49,248 |
| 1000 | 421 | 33,045 |
| 1000 | 831 | 66,132 |
| 700 | 267 | 27,276 |
| 700 | 533 | 54,588 |
| 1000 | 421 | 36,628 |
| 1000 | 831 | 73,303 |
| 700 | 267 | 24,312 |
| 700 | 533 | 48,654 |
| 1000 | 421 | 32,647 |
| 1000 | 831 | 65,336 |
| 700 | 267 | 26,684 |
| 700 | 533 | 53,401 |
| 1000 | 421 | 35,832 |
| 1000 | 831 | 71,710 |

The table below shows non-limiting example characteristics of LED lighting fixtures according to the embodiments disclosed herein, in which the light temperature comprises at least 5700° K and the CRI comprises at least 70.

| Input current/mA AC | Input Wattage/W | LED Intensity/Lm Mean |
|---|---|---|
| 700 | 267 | 25,555 |
| 700 | 533 | 51,142 |
| 1000 | 421 | 34,316 |
| 1000 | 831 | 68,676 |
| 700 | 267 | 28,326 |
| 700 | 533 | 56,687 |
| 1000 | 421 | 38,037 |
| 1000 | 831 | 76,123 |
| 700 | 267 | 25,247 |
| 700 | 533 | 50,525 |
| 1000 | 421 | 33,903 |
| 1000 | 831 | 67,849 |
| 700 | 267 | 27,710 |
| 700 | 533 | 55,455 |
| 1000 | 421 | 37,210 |
| 1000 | 831 | 74,468 |

The table below shows non-limiting example characteristics of LED lighting fixtures according to the embodiments disclosed herein, in which the light temperature comprises at least 5000° K and the CRI comprises at least 90.

| Input current/mA AC | Input Wattage/W | LED Intensity/Lm Mean |
|---|---|---|
| 700 | 267 | 21,611 |
| 700 | 533 | 43,250 |
| 1000 | 421 | 29,021 |
| 1000 | 831 | 58,079 |
| 700 | 267 | 19,497 |
| 700 | 533 | 39,019 |
| 1000 | 421 | 26,182 |
| 1000 | 831 | 52,397 |
| 700 | 267 | 19,262 |
| 700 | 533 | 38,549 |
| 1000 | 421 | 25,867 |
| 1000 | 831 | 51,766 |
| 700 | 267 | 21,142 |
| 700 | 533 | 42,310 |
| 1000 | 421 | 28,390 |
| 1000 | 831 | 56,816 |

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering comprised herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

As used herein in referring to portions of the devices of this disclosure, the terms "upward," "upwardly," "upper," "downward," "downwardly," "lower," "upper," "top," "bottom" and other like terms assume that the light fixture is in its usual position of use and do not limit the invention to any particular orientation.

In descriptions of this disclosure, including in the claims below, the terms "comprising," "including" and "having" (each in their various forms) and the term "with" are each to be understood as being open-ended, rather than limiting, terms.

What is claimed:

1. A light fixture comprising:

a plurality of LEDs configured to output a cumulative light output, *the plurality of LEDs comprising two or more strings of LEDs, at least two of the two or more strings of LEDs comprising different color LEDs, the two or more strings of LEDs comprising a first string of LEDs and a second string of LEDs connected in parallel with the first string of LEDs*;

a *first* current control device *connected in series with the first string of LEDs and* configured to control a drive current provided to the plurality of LEDs, wherein the drive current comprises at least 700 mA; [and]

*a second current control device connected in series with the second string of LEDs and configured to control the drive current provided to the plurality of LEDs;*

*a first voltage measurement device coupled to the first string of LEDs and the second string of LEDs, the first voltage measurement device coupled to the first current control device and configured to control the first current control device; and*

*a second voltage measurement device coupled to the first string of LEDs and the second string of LEDs, the second voltage measurement device coupled to the second current control device and configured to control the second current control device;* wherein the cumulative light output comprises an intensity of greater than or equal to 10,000 lumens and a [color temperature of greater than or equal to 4000° K] *color rendering index (CRI) of at least 94.*

[2. The light fixture of claim 1, wherein the a plurality of LEDs comprise two or more strings of LEDs.]

[3. The light fixture of claim 2, wherein at least two of the two or more strings of LEDs comprise different color LEDs.]

4. The light fixture of claim [3] *1*, wherein at least one of the strings comprises a Blue Shifted Yellow String and at least one of the strings comprises a Red String.

5. The light fixture of claim [3] *1*, wherein each of the strings comprises a Blue Shifted Yellow String with a different color temperature.

[6. The light fixture of claim 3, wherein the two or more strings of LEDs comprise a first string of LEDs and a second string of LEDs connected in parallel with the first string of LEDs, and wherein the light fixture further comprises:

a first current control device connected in series with the first string of LEDs;

a second current control device connected in series with the second string of LEDs;

a first voltage measurement device coupled to the first string of LEDs and the second string of LEDs, the first voltage measurement device coupled to the first current control device and configured to control the first current control device; and a second voltage measurement device coupled to the first string of LEDs and the second string of LEDs, the second voltage measurement device coupled to the second current control device and configured to control the second current control device.]

7. The light fixture of claim [6] *1*, wherein each of the first and second current control devices comprise: a Bipolar Junction Transistor (BJT); a MOSFET; a junction gate field-effect transistor (JFET); or an insulated gate field effect transistor (IGFET).

8. The light fixture of claim 7, wherein each of the first and second voltage measurement devices comprise: a comparator and an op-amp.

9. The light fixture of claim [6] *1*, further comprising a third string of LEDs connected in series with the first and second string of LEDs.

10. The light fixture of claim [6] *1*, further comprising:

a pulse generator;

an RC circuit coupled to the pulse generator; and a third current control device coupled to the RC circuit, the third current control device configured to vary the voltage measured by the second voltage measurement device.

11. The light fixture of claim 1, further comprising:

a plurality of heat-sink-mounted LED array modules, each module engaging an LED-adjacent surface of a heat-sink base for transfer of heat from the module;

a heat-sink heat-dissipating surface extending away from the modules;

at least one venting aperture through the heat-sink base to provide air ingress to the heat-dissipating surfaces adjacent to the aperture.

12. The light fixture of claim 1, further comprising:

a housing and an LED assembly secured with respect thereto and open to permit air/water-flow over the LED assembly, the LED assembly comprising:

an LED-array;

an extruded heat sink that has a base and heat-transfer surfaces extending from the base, wherein the heat-transfer surfaces are surfaces of a plurality of fins extending away from the base in a first direction, the fins including first and second fins along the opposite edges of the base, the first and second edge-adjacent fins also extending from the base in a second direction opposite to the first direction.

13. A light fixture comprising:

a plurality of LEDs configured to output a cumulative light output at an efficiency, *the plurality of LEDs comprising two or more strings of LEDs, the two or more strings of LEDs comprising a first string of LEDs and a second string of LEDs connected in parallel with the first string of LEDs*;

a *first* current control device *connected in series with the first string of LEDs and* configured to control a drive current provided to the plurality of LEDs, wherein the drive current comprises at least 700 mA; [and]

*a second current control device connected in series with the second string of LEDs and configured to control the drive current provided to the plurality of LEDs;*

*a first voltage measurement device coupled to the first string of LEDs and the second string of LEDs, the first voltage measurement device coupled to the first current control device and configured to control the first current control device; and*

*a second voltage measurement device coupled to the first string of LEDs and the second string of LEDs, the second voltage measurement device coupled to the second current control device and configured to control the second current control device;* wherein the cumulative light output comprises an intensity of greater than or equal to 10,000 lumens and a [color temperature of greater than or equal to 4000° K] *color rendering index (CRI) of at least 90.*

[14. The light fixture of claim 13, wherein the a plurality of LEDs comprise two or more strings of LEDs.]

[15. The light fixture of claim 14, wherein the two or more strings of LEDs comprise a first string of LEDs and a second string of LEDs connected in parallel with the first string of LEDs, and wherein the light fixture further comprises:

a first current control device connected in series with the first string of LEDs;

a second current control device connected in series with the second string of LEDs;

a first voltage measurement device coupled to the first string of LEDs and the second string of LEDs, the first voltage measurement device coupled to the first current control device and configured to control the first current control device; and a second voltage measurement device coupled to the first string of LEDs and the second string of LEDs, the second voltage measurement device coupled to the second current control device and configured to control the second current control device.]

16. The light fixture of claim [15] *13*, wherein each of the first and second current control devices comprise: a Bipolar Junction Transistor (BJT); a MOSFET; a junction gate field-effect transistor (JFET); or an insulated gate field effect transistor (IGFET).

17. The light fixture of claim 16, wherein each of the first and second voltage measurement devices comprise: a comparator and an op-amp.

18. The light fixture of claim [15] *13*, further comprising a third string of LEDs connected in series with the first and second string of LEDs.

19. The light fixture of claim [15] *13*, further comprising:

a pulse generator;

an RC circuit coupled to the pulse generator; and a third current control device coupled to the RC circuit, the third current control device configured to vary the voltage measured by the second voltage measurement device.

20. The light fixture of claim 13, further comprising:

a plurality of heat-sink-mounted LED array modules, each module engaging an LED-adjacent surface of a heat-sink base for transfer of heat from the module;

a heat-sink heat-dissipating surfaces extending away from the modules;

at least one venting aperture through the heat-sink base to provide air ingress to the heat-dissipating surfaces adjacent to the aperture.

21. The light fixture of claim 13, further comprising:

a housing and an LED assembly secured with respect thereto and open to permit air/water-flow over the LED assembly, the LED assembly comprising:

an LED-array;

an extruded heat sink that has a base and heat-transfer surface extending from the base, wherein the heat-transfer surfaces are surfaces of a plurality of fins extending away from the base in a first direction, the fins including first and second fins along the opposite edges of the base, the first and second edge-adjacent fins also extending from the base in a second direction opposite to the first direction.

22. The light fixture of claim 1, wherein the cumulative light output comprises an intensity from 10,000 lumens to 74,468 lumens.

23. The light fixture of claim 1, wherein the light fixture is configured to operate based on a drive current comprising a current from 700 mA to 1000 mA.

24. The light fixture of claim 1, wherein the cumulative light output comprises a total radiant flux from 30,900 mW to 41,600 mW.

25. The light fixture of claim 1, wherein the cumulative light output comprises a color temperature from 4000° K to 5000° K.

26. The light fixture of claim 1, wherein the cumulative light output comprises an intensity from 10,000 lumens to 74,468 lumens, and wherein the light fixture is configured to operate based on a drive current comprising a current from 700 mA to 1000 mA.

27. The light fixture of claim 13, wherein, the cumulative light output comprises an intensity from 10,000 lumens to 74,468 lumens.

28. The light fixture of claim 13, wherein the light fixture is configured to operate based on a drive current comprising a current from 700 mA to 1000 mA.

29. The light fixture of claim 13, wherein the cumulative light output comprises a total radiant flux from 30,900 mW to 41,600 mW.

30. The light fixture of claim 13, wherein the cumulative light output comprises a color temperature from 4000° K to 5000° K.

31. The light fixture of claim 13, wherein the cumulative light output comprises an intensity from 10,000 lumens to 74,468 lumens, and wherein the light fixture is configured to operate based on a drive current comprising a current from 700 mA to 1000 mA.

*32. A light fixture comprising:*

*a plurality of LEDs that provide a cumulative light output comprising an intensity of greater than or equal to 10,000 lumens and a color rendering index (CRI) of at least 94, the plurality of LEDs comprising two or more strings of LEDs, the two or more strings of LEDs comprising a first string of LEDs and a second string of LEDs connected in parallel with the first string of LEDs;*

*a first current control device connected in series with the first string of LEDs that provides a drive current comprising at least 700 mA to the plurality of LEDs;*

*a second current control device connected in series with the second string of LEDs and configured to control the drive current provided to the plurality of LEDs;*

*a first voltage measurement device coupled to the first string of LEDs and the second string of LEDs, the first voltage measurement device coupled to the first current control device and configured to control the first current control device; and*

*a second voltage measurement device coupled to the first string of LEDs and the second string of LEDs, the second voltage measurement device coupled to the second current control device and configured to control the second current control device.*

*33. The light fixture of claim 32, wherein the cumulative light output comprises an intensity from 10,000 lumens to 74,468 lumens.*

*34. The light fixture of claim 32, wherein the drive current comprises from 700 mA to 1000 mA.*

*35. The light fixture of claim 32, wherein the cumulative light output comprises a total radiant flux from 30,900 mW to 41,600 mW.*

*36. The light fixture of claim 32, wherein the cumulative light output comprises a color temperature of greater than or equal to 4000° K.*

*37. The light fixture of claim 32, wherein the cumulative light output comprises a color temperature of greater than or equal to 5000° K.*

*38. The light fixture of claim 32, wherein the cumulative light output comprises an intensity from 10,000 lumens to 74,468 lumens, and the drive current comprises a current from 700 mA to 1000 mA.*

*39. A light fixture comprising:*

*a plurality of LEDs configured to output a cumulative light output, the plurality of LEDs comprising two or more strings of LEDs, the two or more strings of LEDs comprising a first string of LEDs and a second string of LEDs connected in parallel with the first string of LEDs;*

*a first current control device connected in series with the first string of LEDs and configured to control a drive current provided to the plurality of LEDs, wherein the drive current comprises at least 700 mA;*

*a second current control device connected in series with the second string of LEDs and configured to control the drive current provided to the plurality of LEDs;*

*a first voltage measurement device coupled to the first string of LEDs and the second string of LEDs, the first voltage measurement device coupled to the first current control device and configured to control the first current control device; and*

*a second voltage measurement device coupled to the first string of LEDs and the second string of LEDs, the second voltage measurement device coupled to the second current control device and configured to control the second current control device, wherein the cumulative light output comprises an intensity of greater than or equal to 10,000 lumens and a color rendering index (CRI) of at least 90.*

*40. The light fixture of claim 39, wherein at least two of the two or more strings of LEDs comprise different color LEDs.*

*41. The light fixture of claim 40, wherein at least one of the strings comprises a Blue Shifted Yellow String and at least one of the strings comprises a Red String.*

*42. The light fixture of claim 40, wherein each of the strings comprises a Blue Shifted Yellow String with a different color temperature.*

*43. The light fixture of claim 39, wherein each of the first and second current control devices comprise: a Bipolar Junction Transistor (BJT); a MOSFET; a junction gate field-effect transistor (JFET); or an insulated gate field effect transistor (IGFET).*

*44. The light fixture of claim 43, wherein each of the first and second voltage measurement devices comprise: a comparator and an op-amp.*

*45. The light fixture of claim 39, further comprising a third string of LEDs connected in series with the first and second string of LEDs.*

*46. The light fixture of claim 39, further comprising:*

*a pulse generator;*

*an RC circuit coupled to the pulse generator; and*

*a third current control device coupled to the RC circuit, the third current control device configured to vary the voltage measured by the second voltage measurement device.*

*47. The light fixture of claim 39, further comprising:*

*a plurality of heat-sink-mounted LED array modules, each module engaging an LED-adjacent surface of a heat-sink base for transfer of heat from the module;*

*a heat-sink heat-dissipating surface extending away from the modules;*

*at least one venting aperture through the heat-sink base to provide air ingress to the heat-dissipating surfaces adjacent to the aperture.*

*48. The light fixture of claim 39, further comprising:*

*a housing and an LED assembly secured with respect thereto and open to permit air/water-flow over the LED assembly, the LED assembly comprising:*

*an LED-array;*

*an extruded heat sink that has a base and heat-transfer surfaces extending from the base, wherein the heat-transfer surfaces are surfaces of a plurality of fins extending away from the base in a first direction, the fins including first and second fins along the opposite edges of the base, the first and second edge-adjacent fins also extending from the base in a second direction opposite to the first direction.*

*49. The light fixture of claim 39, wherein the cumulative light output comprises an intensity from 10,000 lumens to 74,468 lumens.*

*50. The light fixture of claim 39, wherein the light fixture is configured to operate based on a drive current comprising a current from 700 mA to 1000 mA.*

*51. The light fixture of claim 39, wherein the cumulative light output comprises a total radiant flux from 30,900 mW to 41,600 mW.*

*52. The light fixture of claim 39, wherein the cumulative light output comprises a color temperature from 4000° K to 5000° K.*

*53. The light fixture of claim 39, wherein the cumulative light output comprises an intensity from 10,000 lumens to 74,468 lumens, and wherein the light fixture is configured to operate based on a drive current comprising a current from 700 mA to 1000 mA.*

*54. A light fixture comprising:*

*a plurality of LEDs configured to output a cumulative light output at an efficiency, the plurality of LEDs comprising two or more strings of LEDs, the two or more strings of LEDs comprising a first string of LEDs and a second string of LEDs connected in parallel with the first string of LEDs;*

*a first current control device connected in series with the first string of LEDs and configured to control a drive current provided to the plurality of LEDs, wherein the drive current comprises at least 700 mA;*

*a second current control device connected in series with the second string of LEDs and configured to control the drive current provided to the plurality of LEDs;*

*a first voltage measurement device coupled to the first string of LEDs and the second string of LEDs, the first voltage measurement device coupled to the first current control device and configured to control the first current control device; and*

*a second voltage measurement device coupled to the first string of LEDs and the second string of LEDs, the second voltage measurement device coupled to the second current control device and configured to control the second current control device, wherein the cumulative light output comprises an intensity of greater than or equal to 10,000 lumens and a color rendering index (CRI) of at least 90.*

*55. The light fixture of claim 54, wherein each of the first and second current control devices comprise: a Bipolar Junction Transistor (BJT); a MOSFET; a junction gate field-effect transistor (JFET); or an insulated gate field effect transistor (IGFET).*

*56. The light fixture of claim 55, wherein each of the first and second voltage measurement devices comprise: a comparator and an op-amp.*

*57. The light fixture of claim 54, further comprising a third string of LEDs connected in series with the first and second string of LEDs.*

*58. The light fixture of claim 54, further comprising:*

*a pulse generator;*

*an RC circuit coupled to the pulse generator; and*

*a third current control device coupled to the RC circuit, the third current control device configured to vary the voltage measured by the second voltage measurement device.*

*59. The light fixture of claim 54, further comprising:*

*a plurality of heat-sink-mounted LED array modules, each module engaging an LED-adjacent surface of a heat-sink base for transfer of heat from the module;*

*a heat-sink heat-dissipating surfaces extending away from the modules;*

*at least one venting aperture through the heat-sink base to provide air ingress to the heat-dissipating surfaces adjacent to the aperture.*

*60. The light fixture of claim 54, further comprising:*

*a housing and an LED assembly secured with respect thereto and open to permit air/water-flow over the LED assembly, the LED assembly comprising:*

*an LED-array;*

*an extruded heat sink that has a base and heat-transfer surface extending from the base, wherein the heat-transfer surfaces are surfaces of a plurality of fins extending away from the base in a first direction, the fins including first and second fins along the opposite edges of the base, the first and second edge-adjacent fins also extending from the base in a second direction opposite to the first direction.*

*61. The light fixture of claim 54, wherein, the cumulative light output comprises an intensity from 10,000 lumens to 74,468 lumens.*

*62. The light fixture of claim 54, wherein the light fixture is configured to operate based on a drive current comprising a current from 700 mA to 1000 mA.*

*63. The light fixture of claim 54, wherein the cumulative light output comprises a total radiant flux from 30,900 mW to 41,600 mW.*

*64. The light fixture of claim 54, wherein the cumulative light output comprises a color temperature from 4000° K to 5000° K.*

*65. The light fixture of claim 54, wherein the cumulative light output comprises an intensity from 10,000 lumens to 74,468 lumens, and wherein the light fixture is configured to operate based on a drive current comprising a current from 700 mA to 1000 mA.*

*66. A light fixture comprising:*

*a plurality of LEDs that provide a cumulative light output comprising an intensity of greater than or equal to 10,000 lumens and a color rendering index (CRI) of at least 90, the plurality of LEDs comprising two or more strings of LEDs, the two or more strings of LEDs comprising a first string of LEDs and a second string of LEDs connected in parallel with the first string of LEDs;*

*a current source that provides a drive current comprising at least 700 mA to the plurality of LEDs;*

*a first current control device connected in series with the first string of LEDs;*

*a second current control device connected in series with the second string of LEDs;*

*a first voltage measurement device coupled to the first string of LEDs and the second string of LEDs, the first voltage measurement device coupled to the first current control device and configured to control the first current control device; and*

*a second voltage measurement device coupled to the first string of LEDs and the second string of LEDs, the second voltage measurement device coupled to the second current control device and configured to control the second current control device.*

*67. The light fixture of claim 66, wherein the cumulative light output comprises an intensity from 10,000 lumens to 74,468 lumens.*

*68. The light fixture of claim 66, wherein the drive current comprises from 700 mA to 1000 mA.*

*69. The light fixture of claim 66, wherein the cumulative light output comprises a total radiant flux from 30,900 mW to 41,600 mW.*

*70. The light fixture of claim 66, wherein the cumulative light output comprises a color temperature of greater than or equal to 4000° K.*

*71. The light fixture of claim 66, wherein the cumulative light output comprises a color temperature of greater than or equal to 5000° K.*

*72. The light fixture of claim 66, wherein the cumulative light output comprises an intensity from 10,000 lumens to 74,468 lumens, and the drive current comprises a current from 700 mA to 1000 mA.*

* * * * *